United States Patent [19]

Duffield et al.

[11] Patent Number: 5,970,498
[45] Date of Patent: Oct. 19, 1999

[54] OBJECT ORIENTED FRAMEWORK MECHANISM FOR METERING OBJECTS

[75] Inventors: Dana Mark Duffield; Eric Leonard Fosdick; William Craig Rapp, all of Rochester, Minn.

[73] Assignee: International Business Machines Corporation, Armonk, N.Y.

[21] Appl. No.: 08/761,459

[22] Filed: Dec. 6, 1996

[51] Int. Cl.[6] ........................................ G06F 17/30
[52] U.S. Cl. .................... 707/104; 707/102; 707/103
[58] Field of Search .................................. 395/701–704, 395/683, 685, 183.14, 183.22; 707/100, 103, 4–5, 6, 102, 104; 345/333–334, 335, 326

[56] References Cited

U.S. PATENT DOCUMENTS

| | | | |
|---|---|---|---|
| 4,943,932 | 7/1990 | Lark et al. | 706/60 |
| 5,057,996 | 10/1991 | Cutler et al. | 395/676 |
| 5,101,364 | 3/1992 | Davenport et al. | 345/328 |
| 5,119,475 | 6/1992 | Smith et al. | 345/353 |
| 5,181,162 | 1/1993 | Smith et al. | 707/530 |
| 5,195,172 | 3/1993 | Elad et al. | 706/62 |
| 5,226,161 | 7/1993 | Khoyi et al. | 395/683 |
| 5,247,693 | 9/1993 | Bristol | 395/705 |
| 5,249,270 | 9/1993 | Stewart et al. | 395/200.52 |
| 5,257,384 | 10/1993 | Farrand et al. | 395/285 |
| 5,261,080 | 11/1993 | Khoyi et al. | 395/500 |
| 5,274,572 | 12/1993 | O'Neill et al. | 702/57 |
| 5,276,775 | 1/1994 | Meng | 706/51 |
| 5,287,447 | 2/1994 | Miller et al. | 345/342 |
| 5,293,470 | 3/1994 | Birch et al. | 345/435 |
| 5,297,283 | 3/1994 | Kelly, Jr. et al. | |
| 5,315,703 | 5/1994 | Matheny et al. | 345/507 |
| 5,367,633 | 11/1994 | Matheny et al. | 345/514 |
| 5,369,766 | 11/1994 | Nakano et al. | |
| 5,379,430 | 1/1995 | Nguyen | 707/3 |
| 5,388,264 | 2/1995 | Tobias, II et al. | 707/103 |
| 5,390,325 | 2/1995 | Miller | |
| 5,396,626 | 3/1995 | Nguyen | 395/701 |
| 5,398,336 | 3/1995 | Tantry et al. | 707/103 |
| 5,664,180 | 9/1997 | Halpert et al. | 395/613 |
| 5,745,675 | 4/1998 | Herbig et al. | 395/183.14 |
| 5,768,505 | 6/1998 | Gilchrist et al. | 395/200.31 |
| 5,778,378 | 7/1998 | Rubin | 707/103 |
| 5,787,425 | 7/1998 | Bigus | 707/6 |

OTHER PUBLICATIONS

Text of IBM Technical Disclosure Bulletin, vol. 37, DeBinder et al., Feb. 1994, "Results Folder Framework", pp. 431–432.

Text of IBM Technical Disclosure Bulletin, vol. 36, Coskun, N., Jun. 1993, "Persistent Framework Independent Record/Playback Framework", pp. 261–264.

Text of IBM Technical Disclosure Bulletin, Baker et al., Oct. 1991, "Model View Schema", pp. 321–322.

Text of IBM Technical Disclosure Bulletin, Baker et al., Oct. 1991, "Office Container Class", pp. 309–310.

Text of IBM Technical Disclosure Bulletin, Cavendish et al., Jul. 1991, "Icon Pane Class", pp. 118–119.

Text of IBM Technical Disclosure Bulletin, Baker et al., Jun. 1991, "Distribution List Class", p. 159.

(List continued on next page.)

*Primary Examiner*—James P. Trammell
*Assistant Examiner*—Cuong H. Nguyen
*Attorney, Agent, or Firm*—Martin & Associates, L.L.C.; Derek P. Martin

[57] ABSTRACT

An object oriented framework mechanism provides a straightforward and convenient way to implement metering within an object-oriented computer program for any type of program that needs to be metered. The object metering framework includes core function and extensible function. Core classes and core class relationships define the core function of the framework mechanism. The extensible function is defined by extensible classes that can be extended by a programmer to implement a desired metering environment. The framework provides consistent programmer interfaces over a wide variety of different metering environments, which greatly enhances programmer efficiency and which makes the resultant code much easier to maintain.

71 Claims, 41 Drawing Sheets

OTHER PUBLICATIONS

Text of IBM Technical Disclosure Bulletin, Cavendish et al., Jun. 1991, "Object–Oriented Documentation Tool", pp. 50–51.

Text of IBM Technical Disclosure Bulletin, Allard et al., Feb. 1990, "Object–Oriented Programming in C—the Linnaeus System", pp. 437–439.

Text of IBM Technical Disclosure Bulletin, vol. 38, No. 1, Jan. 1995, pp. 411–414, J. Knapman, "Generating Specific Server Programs in Distributed Object–Oriented Customer Information Control System".

Text of IBM Technical Disclosure Bulletin, vol. 37, No. 12, Dec. 1994, pp. 19–20, Al–Karmi et al., "Events Set for Event Tracing in Distributred Object–Oriented Systems".

Text of IBM Technical Disclosure Bulletin, vol. 37, No. 12, Dec. 1994, pp. 375–378, Acker et al., "Automatically Generating Formatted Documentation for Object–Oriented Class Libraries".

Text of IBM Technical Disclosure Bulletin, vol. 37, No. 11, Nov. 1994, pp. 71–72, Behrs et al., "Device Support Framework to Support ISO DPA 10175 and POSIX 1387.4".

Text of IBM Technical Disclosure Bulletin, vol. 37, No. 7, Jul. 1994, pp. 145–146, Banda et al., "Exception Management Algorithm for Multi–Threaded Method Invocation".

Text of IBM Technical Disclosure Bulletin, vol. 37, No. 6B, Jun. 1994, pp. 553–556, Gest et al., "Portable Object–Oriented Event Manager".

Abstract for WIPO Patent Application No. WO 95/04966, F.T. Nguyen, Feb. 16, 1995, "Automatic Management of Components in Object–Oriented System".

Abstract for U.S. Patent No. 5,388,264 Milne et al., Feb. 7, 1995, "Object–Oriented Framework System for Enabling Multimedia Presentation with Routing and Editing of MIDI Information".

Abstract for WIPO Patent Application No. WO 94/23364, Heninger et al., Oct. 13, 1994, "Framework Processing Appartus for Application Software".

Abstract for U.S. Patent No. 5,369,766, Heninger et al., Nov. 29, 1994, "Object Oriented Application Processing Apparatus".

Abstract for WIPO Patent Application No. WO 9422081, Sep. 29, 1994, "Hardware–Independent Interface for Interrupt Processing", G. O. Norman et al.

Abstract for WIPO Patent Application No. 94/19752, Anderson et al., Sep. 1, 1994, "Concurrent Framework Processing Apparatus for Two or More Users".

Abstract for WIPO Patent Application No. 94/19751, Anderson et al., Sep. 1, 1994, "Concurrent Framework Processing Apparatus for Application Users".

Abstract for WIPO Patent Application No. 94/19740, Goldsmith et al., Sep. 1, 1994, "Framework Processor of Object–Oriented Application".

Abstract from WIPO Patent Application No. WO 94/15286, Goldsmith, et al., Jul. 7, 1994, "Object–Oriented Framework for Object Operating System".

Abstract for WIPO Patent Application No. 94/15282, Anderson et al., Jul. 7,1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D.R. Anderson et al.

Abstract for U.S. Patent No. 5, 119, 475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract fpr WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M.A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–042, Coleman et al., 1995, "An End–to–End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993, "The Cost of Genericity: Experiment With Constraint–Based Representations of Time–Tables".

Inspec Abstract No. C9501–6140D–005, S. Vinoski, 1994, "Mapping CORBA IDL Into C++".

Inspec Abstract No. C9501–7330–007, Salminen et al., 1994, "Modelling Trees Using an Object–Oriented Scheme".

Inspec Abstract No. C9412–6110B–221, Berghel et al., 1992, "An Object–Oriented Concurrency Mechanism for Extensibility and Reuse of Synchronization Components".

Inspec Abstract No. B9412–6210Q–016, from Oingzhong et al., 1992, "An Object–Oriented Model for Intelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Resue".

Inspec Abstract No. C9411–6130B–108, from Mili et al., 1992, "Building a Graphical Interface for a Resue–Oriented CASE Tool".

Inspec Abstract No. C9411–7100–029, from C. Le Pape, 1994, "Implementation of Resource Constraints in ILOG Schedule: A Library for the Development of Constraint–Based Scheduling Systems".

Inspec Abstract No. C9411–6115–035, from Mili et al., 1991, "SoftClass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., "An Experimental Study of Using Resuable Software Design Frameworks to Achieve Software Reuse".

Inspec Abstract No. C9408–7420–021, from Pirklbauer et al., 1994, "Object–Oriented Process Control Software".

Inspec Abstract No. C9408–6110J–011, from Gyu–Chung et al., 1993, "System Methodologies of Object–Oriented Programs".

Inspec Abstract No. C9407–7420D–045, from Desai et al., "Controller Structure Definition Via Intelligent Process Control".

Inspec Abstract No. C9407–6140D–014, from Satoh et al., 1994, Semantics for a Real–Time Object–Oriented Programming Language.

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Object–Oriented User Interfaces" from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045. from Rosiene et al., 1995, "A Data Modeling Framework for Queueing Network Models".

Inspec Abstract No. B9503–8110B–023, from Mautref, et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130g–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributed Applications".

Inspec Abstract No. C9412–7330–186, from Righter et al., 1994, "An Object–Oriented Characterization of Spatial Ecosystem Information".

Inspec Abstract No. C9412–6160J–025 from J. Livari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environments Using MViews".

Inspec Abstract No. 4664213, "Maintaining Information about Persistent Replicated Objects in a Distributed System", 1993 IEEE Conference on Distributed Computing Systems.

Inspec Abstract No. C9406–6110J–029, "A Comparison of Object–Oriented Analysis and Design Methods", Proceedings of C ++ World 1993.

Inspec Abstract No. C9406–0310F–011, 1993, "Cost–Benefit Analysis of Object–Oriented Technology".

Inspec Abstract No. C9406–6110J–007, from J.D. Grimes, 1993, "Objects 101–An Implementation View", Proceedings of COMPCON 1994.

Inspec Abstract No. 4647921, from Uhorchak et al., 1993, "An Object–Oriented Class Library for Creating Engineering Graphs Using PHIGS".

Inspec Abstract No. 4642214, from Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object– Oriented System".

Inspec Abstract No. 4618974, from Bowers, 1993, "Some Principles for the Encapsulation of the Behaviour of Aggregate Objects".

Inspec Abstract No. 461931, from Islan et al., 1993, "Uniform Co–Scheduling Using Object–Oriented Desgin Techniques".

Inspec Abstract No. 4613481, from Thieme et al., 1993, "Schema Integration in Object–Oriented Databases".

Inspec Abstract No. 4603430, from G. Booch, 1994, "Designing and Application Framework".

Inspec Abstract No. 4596323, from Frank et al., 1993, "An Integrated Environment for Designing Object–Oriented Enterprise Models".

Inspec Abstract No. 4593721, Periyasamy et al., 1993, "A Formal Framework for Design and Verification of Robotic Agents".

Inspec Abstract No. 458839, from L. Fisher, 1992, "Constructing a Class Library for Microsoft Windows".

Inspec Abstract No. 4588834, from G. Olander, 1992, "Chembench: Redesign of a Large Commerical Application Using Object–Oriented Techniques".

Inspec Abstract No. 4566447, from J. Rossazza, 1992, "An Object–Centered Fuzzy Representation".

Inspec Abstract No. 4565630, from Karpovich et al., 1993, "A Parallel Object–Oriented Framework for Stencil Algorithms".

Inspec Abstract No. 4618974, from Bowers, 1993, "Some Principles for the Encapsulation of the Behaviour of Aggregate Objects".

Inspec Abstract No. 461931, from Islan et al., 1993, "Uniform Co–Scheduling Using Object–Oriented Design Techniques".

Inspec Abstract No. 4613481, from Thieme et al., 1993, "Schema Integration in Object–Oriented Databases".

Inspec Abstract No. 4603430, from G. Booch, 1994, "Designing an Application Framework".
Inspec Abstract No. 4596323, from Frank et al., 1993, "An Integrated Environment for Designing Ojbect–Oriented Enterprise Models".
Inspec Abstract No. 4593721, Periyasamy et al., 1993, "A Formal Framework for Design and Verification of Robotic Agents".
Inspec Abstract No. 4588839, from L. Fisher, 1992, "Constructing a Class Library for Microsoft Windows".
Inspec Abstract No. 4588834, from G. Olander, 1992, "Chembench: Redesign of a Large Commercial Application Using Object–Oriented Techniques".
Inspec Abstract No. 4566447, from J. Rossazza, 1992, "An Object–Centered Fuzzy Representation".
Inspec Abstract No. 4565630, from Karpovich et al., 1993, "A Paralel Object–Oriented Framework for Stencil Algorithms".
Inspec Abstract No. C9402–6150G–002, from Bruegge et al., 1993, "A Framework for Dynamic Program Analyzers".
Inspec Abstract No. 4550414, from Parrish et al., 1993, "Automated Flow Graph–Based Testing of Object–Oriented Software Modules".
Inspec Abstract No. 4540729, from Bailes et al., "The Ecology of Class Refinement".
Inspec Abstract No. 4534334, from Campbell et al., 1991, "A Technique for Documenting the Framework of an Object– Oriented System".
Inspec Abstract No. 4534330, from Istavrinos et al., 1992, "Experiences with an Object–Oriented Mapper for Coherent Distributed Shared Memory".
Inspec Abstract No. 4528985, from Beneventano et al., 1993, "Taxonomic Reasoning with Cycles in LOGIDATA+".
Inspec Abstract No. 4525743, from Hakimzadeh et al., 1993, "Instance Variable Access Locking for Object–Oriented Databases".
Inspec Abstract No. 4512593, from H. Sakai, 1993, "A Method for Contract Design and Delegation in Object Behavior Modeling".
Inspec Abstract No. B9310–6210L–099, "Templates, Types and Classes in Open Distributed Processing", 1993.
Inspec Abstract No. 4459325, from Kesim et al., 1992, "on the Evolution of Objects in a Logic Programming Framework".
Inspec Abstract No. 4447153, from Klein et al., 1992, "An Object–Oriented Framework for Curves and Surfaces".
Inspec Abstract No. 4426852, from Benveniste et al., 1992, "Concurrent Programming Notations in the Object–Oriented Language Arche".
Inspec Abstract No. 4425343, from Demurjian et al., 1993, "Programming Versus Databases in Object–Oriented Paradigm".
Inspec Abstract No. 4417604, from Kraiem et al., 1992, "Mapping of Conceptual Specifications Into Object–Oriented Programs".
Inspec Abstract No. 4417563, from E. Maim, 1992, "Recognizing Objects from Constraints".
Inspec Abstract No. 4411998, from Yi Deng et al., 1992, "Unifying Multi–Paradigms in Software System Design".
Inspec Abstract No. 4408394, from Allen et al., 1992, "GEM: Global Event Management in CAD Frameworks".
Inspec Abstract No. 4400350, from Y. Shoham, 1993, "Agent–Oriented Programming".
Inspec Abstract No. 4395549, from Hogstrom et al., 1992, "Portability and Data Structure in Scientific Computing–Object–Oriented Design of Utility Routines in Fortran".
Inspec Abstract No. 4391388, from Thomas et al., 1992, "A Generic Object–Oriented Concurrency Mechanism for Extensibility and Reuse of Synchronization Components".
Inspec Abstract No. 4387201, from Chu et al., 1992, "A Pattern Based Approach of Integrating Data and Knowledge to Support Cooperative Query Answering".
Inspec Abstract No. 4366189, from Holt et al., 1992, "A Framework for Using Formal Methods in Object–Oriented Software Development".
Inspec Abstract No. 4356300, from Bertino et al., 1993, "Path–Index: An Approach to the Efficient Execution of Object–Oriented Queries".
Inspec Abstract No. 4341376, from Bertino et al., 1992, "Optimization of Object–Oriented Queries Using Path Indices".
Inspec Abstract No. 4331060, from Lau et al., 1992, "An Object–Oriented Class Library for Scalable Parallel Heruistic Search".
Inspec Abstract No. 4318465, from P. Madany, 1992, "Object–Oriented Framework for File Systems".
Inspec Abstract No. 4302722, from Eggenschwiler et al., 1992, "ET++SwapsManager: Using Object Technology in the Financial Engineering Domain".
Inspec Abstract No. 4298324, from S. Nichol, 1992, "Extending Turbo Vision".
Inspec Abstract No. 4297404, from Tanaka et al., 1992, "Two–Level Schemata and Generalized Links for Hypertext Database Models".
Inspec Abstract No. 4287814, from Natarajan et al., 1992, "Issues in Building Dynamic Real–Time Systems".
Inspec Abstract No. 4281362, from Marshall et al., 1992, "Using VDM within an Object–Oriented Framework".
Inspec Abstract No. 4275707, from Tsukamoto et al., 1991, "DOT: A Term Representation Using DOT Algebra for Knowledge–Bases".
Inspec Abstract No. 4275698, from Van den bussche et al., 1991, "Evaluation and Optimization of Complex Object Selections".
Inspec Abstract No. 4275693, from Giannotti et al., 1991, "Non–Determinism in Deductive Databases".
Inspec Abstract No. 4270361, from Artale et al., 1991, "Introducing Knowledge Representation Techniques in Databased Models".
Inspec Abstract No. 4270125, from Becker et al., 1991, "Reusable Object–Oriented Specifications for Decision Support Systems".
Inspec Abstract No. 4258492, from M. Ball, 1992, "Inside Templates: Implementing C ++Strategies".
Inspec Abstract No. 4258051, from Rundensteiner et al., 1992, "Set Operations in Object–Based Data Models".
Inspec Abstract No. 4244023, from George et al., 1991, "An Object–Oriented Data Model to Represent Uncertainity in Coupled Artificial Intelligence–Database Systems".
Inspec Abstract No. 4234438, from Madany et al., 1991, "Organizing and Typing Persistent Objects Within an Object– Oriented Framework".
Inspec Abstract No. 4152687, from M. Wolczko, 1992, "Encapsulation, Delegation and Inheritance in Object–Oriented Languages".
Inspec Abstract No. 4117514, from Wuwongse et al., 1991, "An Object–Oriented Approach to Model Management".

Inspec Abstract No. C94204–6110J–017, "Choices, Frameworks and Refinement", R.H. Campbell et al., 1991.

Inspec Abstract No. 4090970, from P. Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experience with the ET++Application Framework".

Inspec Abstract No. 4060084, from Muller et al., 1990, "ODICE: Object–Oriented Hardware Description in CAD Environment".

Inspec Abstract No. 4050569, from Di Giovanni et al., 1990, "HOOD Nets".

Inspec Abstract No. C91072815, from Holtkamp et al., 1990, "DEMOM–A Description Based Media Object Data Model".

Inspec Abstract No. C91072016, from A. Lane, 1991, "/DOS/C++–Application Frameworks".

Inspec Abstract No. C91072574, from Hemery et al., "An Analysis of Communication and Multiprogramming in the Helios Operating System".

Inspec Abstract No. C91064787, from Madany et al., 1989, "A Class Hierarchy for Building Stream–Oriented File Systems".

Inspec Abstract No. C91064580, from Gamma et al., 1989, "Integration of a Programming Environment into ET++–A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specifications in LOTOS and Z, or My Cat Really is Object–Oriented!".

Inspec Abstract No. C91053475, from Queinnec et al., 1988, "An Open Ended Data Representation Model for EU–LISP".

Inspec Abstract No. C91053151, from E. Cusak, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Famework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90034818, from Q. Chen, 1988, "Extending the Object–Oriented Paradigm for Supporting Complex Objects".

Inspec Abstract No. C90030609, from Forde et al., 1990, "Object–Oriented Finite Element Analysis".

Inspec Abstract No. C90007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al., 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Express Parallelism".

Inspec Abstract No. C89014870, from R. King, 1988, "Semantic and Object–Oriented Database Support for Software Environments".

Inspec Abstract No. 89003142, from Tenna et al., 1986, "A System for Generating Language–Oriented Editors".

Inspec Abstract No. C88013915, from Woelk et al., 1987, "Multimedia Information Management in an Object–Oriented Database System".

Inspec Abstract No. C8807447, from P. Allen, 1987, "A Framework for Implementing Multisensor Robotic Tasks".

Inspec Abstract No. C87007043, from Whitted et al., 1986, "Exploiting Classes in Modeling and Displat Software".

Inspec Abstract No. C86039588, from K. Fukunaga, 1985; "PROMPTER: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

Abstract for WIPO Patent Application No. 94/19740, Goldsmith et al., Sept. 1, 1994, "Framework Processor of Object–Oriented Application".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9503–6140D–045, Satoh et al.,1995, "Process Algebra Semantics for a Real Time Object Oriented Programming Language".

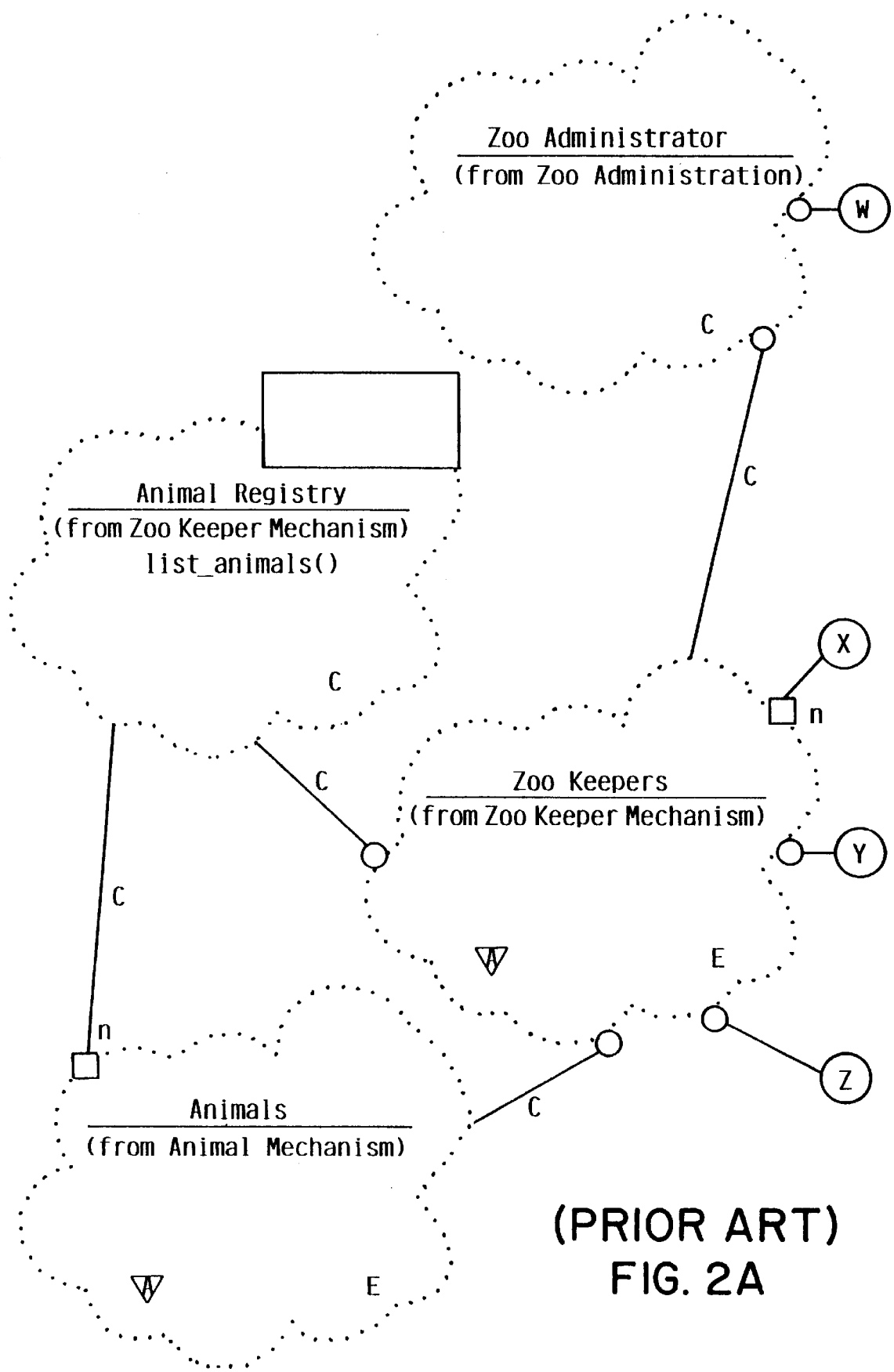
(PRIOR ART) FIG. 2A

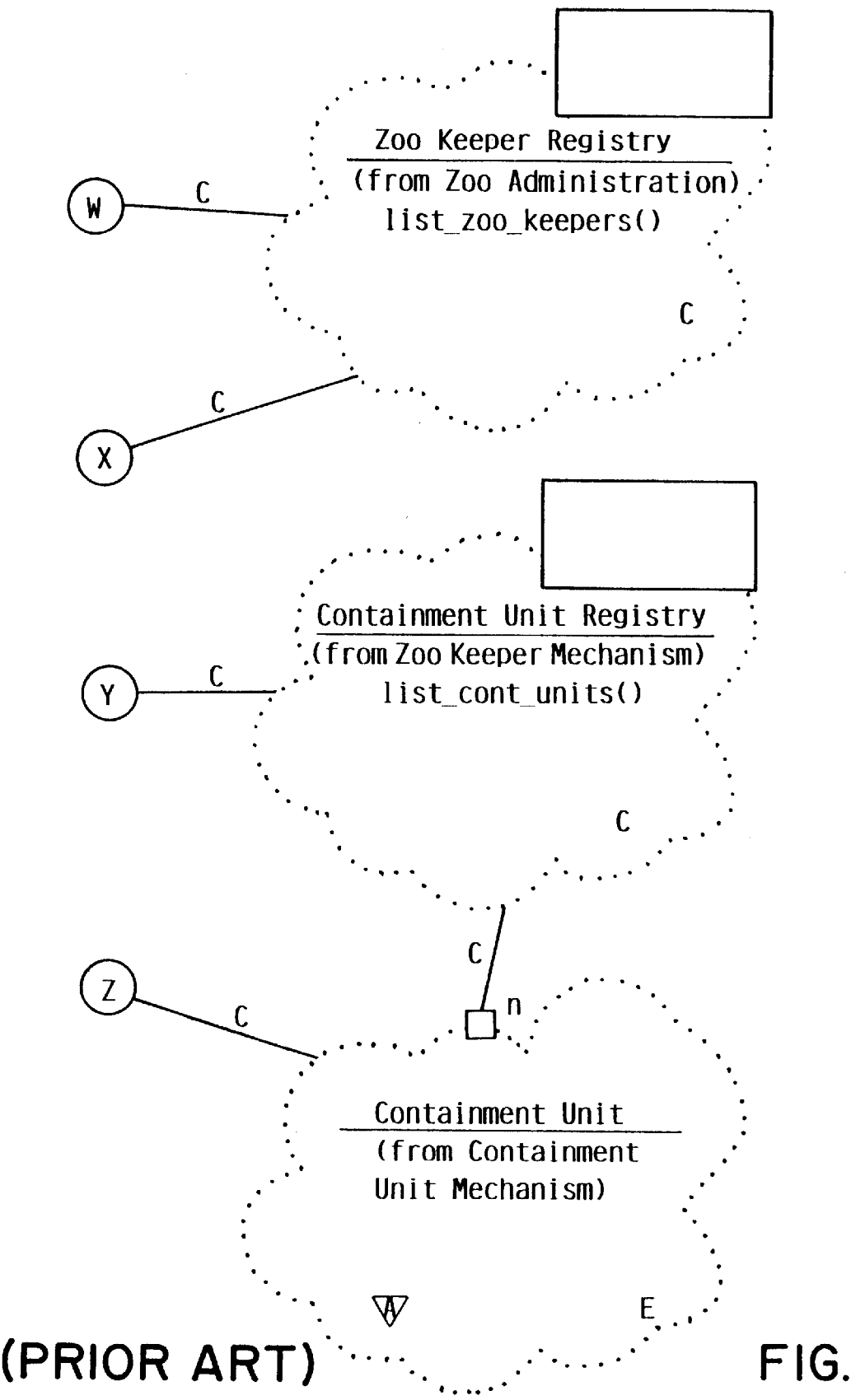
(PRIOR ART) FIG. 2B

Zoo Administrator
(from Zoo Administration)

5_minute_timer()
add/delete_animal()
add/delete_containment_unit()
add/delete_zoo_keeper()
start_zoo_admin()

C (PRIOR ART)
FIG. 3

Containment Unit
(from Containment
Unit Mechanism)
adjust_temp()

(PRIOR ART)
FIG. 6

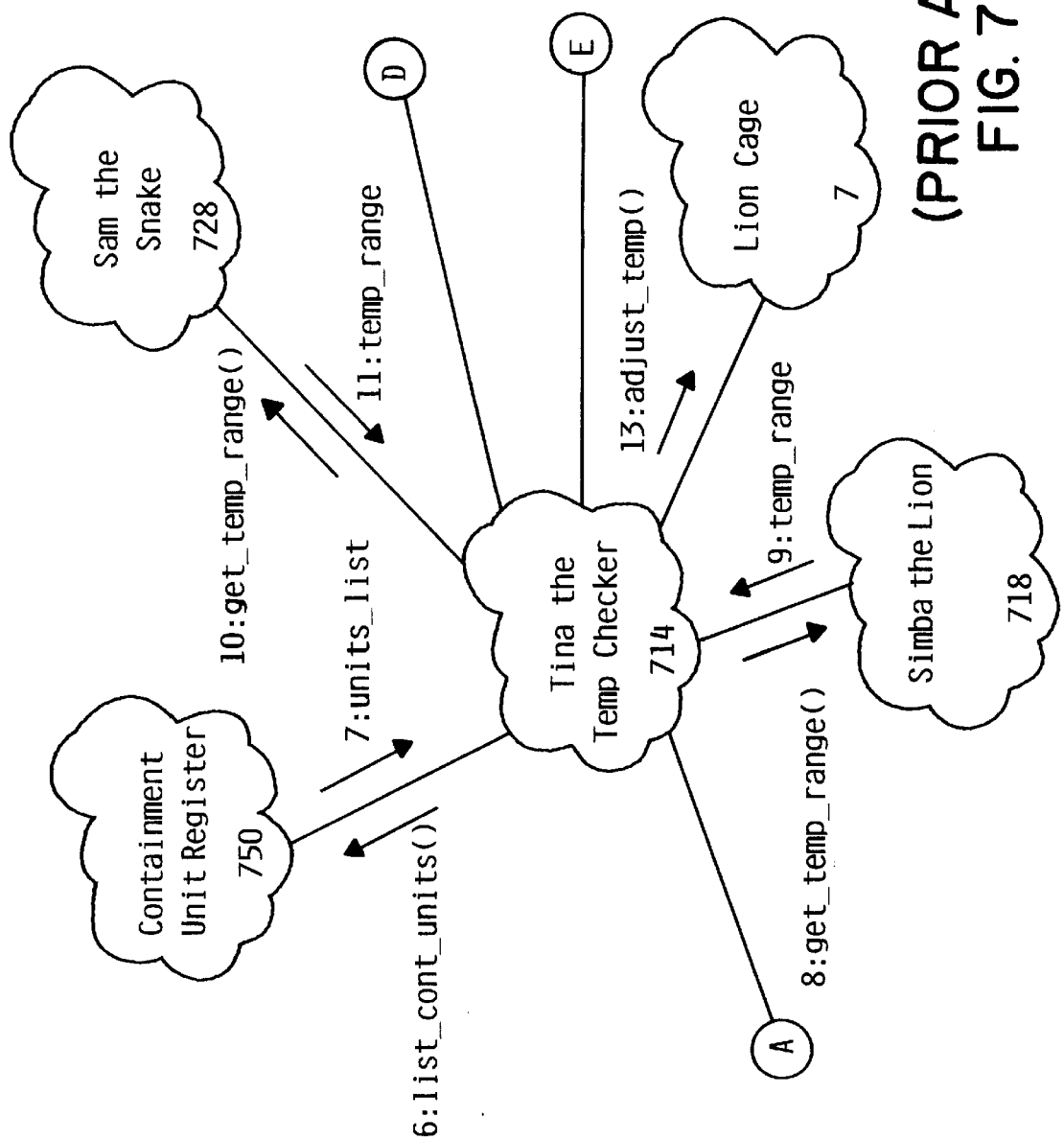

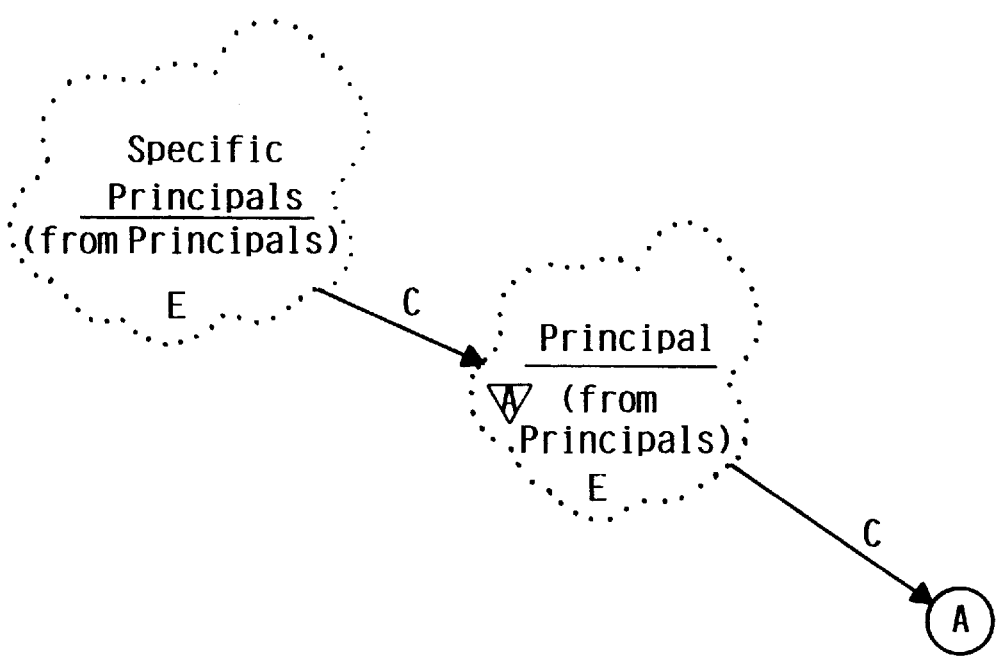
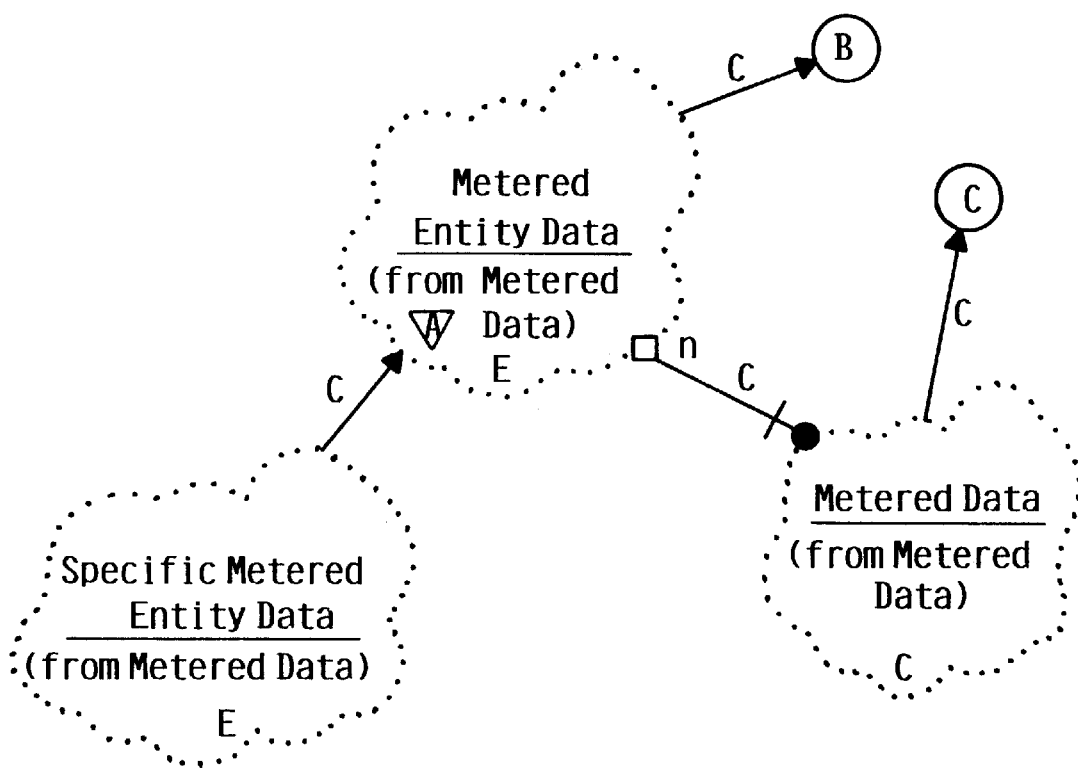
FIG. 11A

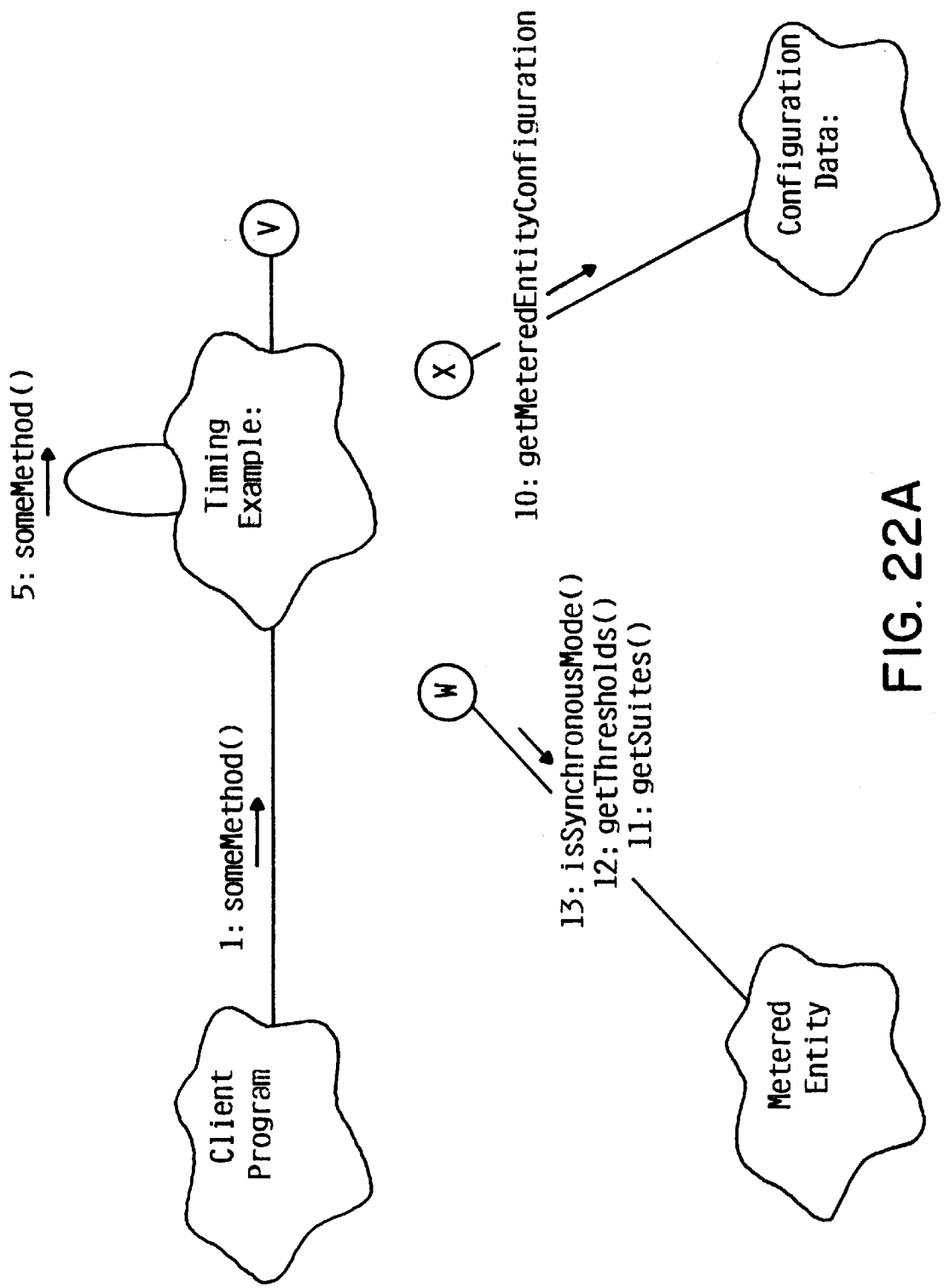

OBJECT ORIENTED FRAMEWORK MECHANISM FOR METERING OBJECTS

FIELD OF THE INVENTION

The present invention relates in general to the data processing field. More specifically, the present invention relates to the field of Object Oriented framework mechanisms.

BACKGROUND OF THE INVENTION

The development of the EDVAC computer system of 1948 is often cited as the beginning of the computer era. Since that time, computer systems have evolved into extremely sophisticated devices that are used in a host of different applications. In the early days of computers, software was bundled with hardware and the two were sold together. However, in more recent times, software became available separate from any hardware, which could then be installed and used on a compatible computer system.

When computer software is "sold", ownership of the software is typically not transferred to the buyer, but the buyer is licensed to use the software subject to certain terms and conditions that are contained in the license agreement that accompanies the software. With the growing popularity of computer networks, many people may now have access to run a particular software program that is available on the network. Some software licenses allow a relatively large number of users, but restrict the number of simultaneous users to a much smaller number. In such an environment, the execution of the software must be monitored to assure that the use of the computer software on the network does not violate the license agreement. Any monitoring of a computer program as it runs is referred to herein as metering.

Other situations also arise that require metering computer software as it runs. One such situation is for benchmarking the performance of a computer program to determine how often the different portions of the program are executed and to measure overall system performance. There are numerous different situations where the metering of a computer program is desirable.

In the past, computers have been programmed with metering software. Metering software has typically been custom-developed according to the specific needs of a particular program that needs to be metered. While the specific metering requirements of different computer programs may differ considerably, many of the metering functions are similar across different programs. However, the differences in prior art metering software has precluded reusing very much metering code from one computer program to the next. Each different computer program typically has its own custom, dedicated way of performing the desired metering that is not easily adapted to any new or different computer program.

With the development of Object Oriented (OO) programming techniques, computer programs consist of a collection of objects that each contain data and associated operations or methods for operating on the data. In an object oriented environment, metering implies measuring certain parameters on objects that have methods that are invoked while a computer program executes. However, even in an OO programming environment, the details of the desired metering function must be programmed to fit a desired metering environment. Without a mechanism that can be readily customized and extended to meter a computer program in a particular metering environment, the time required to program and maintain metering software will be excessively long and expensive.

SUMMARY OF THE INVENTION

According to the present invention, an object oriented framework mechanism for metering objects provides an infrastructure that embodies the steps necessary to meter a computer program and a mechanism to extend the framework to fit a particular metering environment. Certain core functions are provided by the framework, which interact with extensible functions provided by the framework user. The architecture of the framework allows a programmer to determine the conditions and parameters that apply to the metering environment with an interface that is consistent regardless of the specific combination of parameters specified in the metering environment. The extensible functions allow new metering environments to be easily implemented using the framework. The framework thus allows a common programming interface for metering objects using the framework, which may be easily customized to include new or changed parameters. The framework greatly simplifies the programmer's job of developing code to meter an object-oriented computer program by providing a common programming interface, and by providing established classes that may be easily extended to implement the desired metering environment.

The framework mechanism of the present invention was designed and constructed using object-oriented technology. Those who are unfamiliar with object-oriented technology, or with object-oriented framework mechanisms, should read the object-oriented overview section of the Description of the Preferred Embodiments.

BRIEF DESCRIPTION OF THE DRAWINGS

FIGS. 2 through 6 are class diagrams for the example framework mechanism of FIG. 1;

DESCRIPTION OF THE PREFERRED EMBODIMENTS

Overview—Object-Oriented Technology

Figure 1:
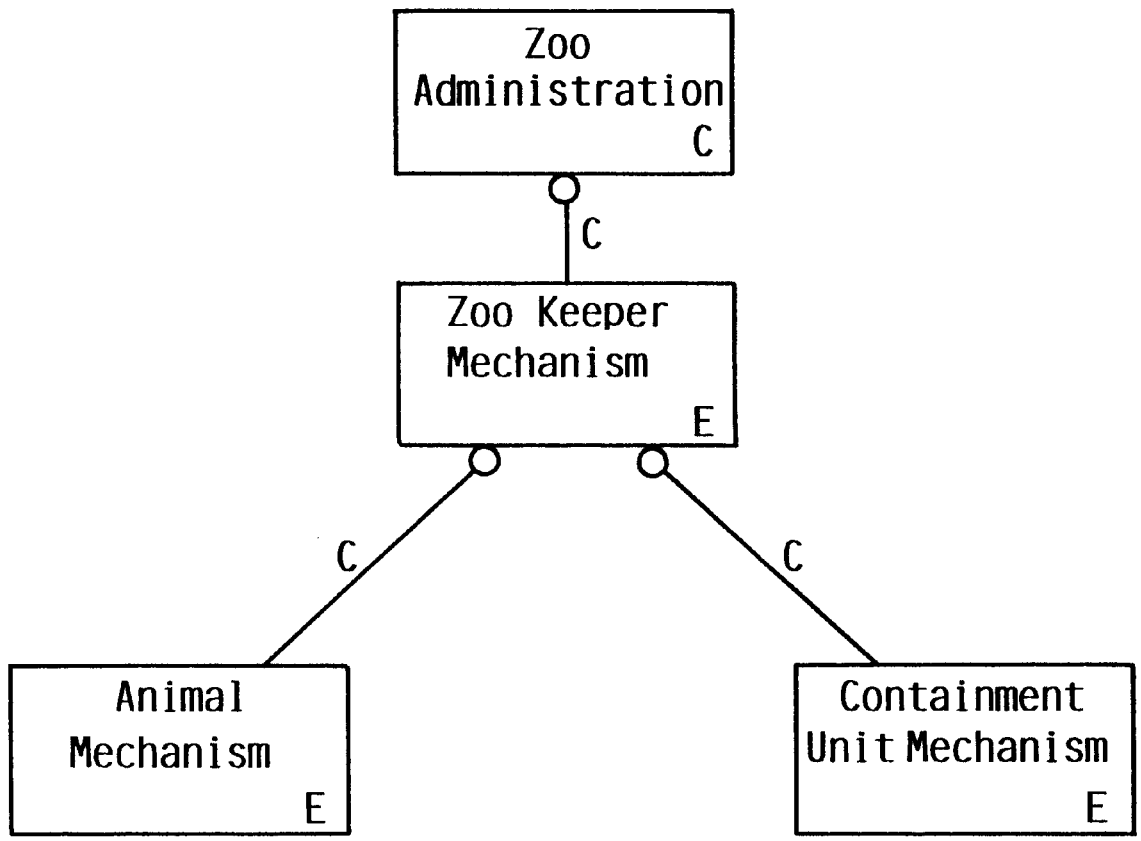
FIG. 1 is a category diagram of an example framework mechanism.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology versus Procedural Technology Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF is Designed

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification (pages 43–49). Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, please refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation of the zoo keeper mechanism. Note also that our framework designer designed the zoo administration mechanism to be a core function of ZAF, which means that it has been designed such that it will not be subject to potential customization and extension. The C in the category box denotes this fact. Please note further that the uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and/or extension by the framework consumer to address future care and feeding requirements. This fact is denoted by the E in the zoo keeper mechanism category box.

Our framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

FIG. 2 is an OO class diagram that shows the fundamental classes that our framework designer has designed for ZAF. Each class representation includes its relationship to the mechanisms shown on FIG. 1. For example, we can see that the zoo keepers class is denoted as being from Zoo Keeper Mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

Please note again that the relationships between the classes have been designed as core function of ZAF such that they are not available for ultimate modification by ZAF's consumers.

The zoo administrator class is the definition of the object that is responsible for the overall control of ZAP. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administrator class has been designed to have a uses relationship with the zoo keeper registry. Our framework designer has designed the zoo administrator and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

FIG. 3 shows a lower level view of the zoo administrator class. Since objects of type zoo administrator have responsibility for overall control of ZAF, the zoo administrator class has been designed to include operations that perform tasks oriented towards zoo administration. The class definition includes the following five operations: 5_minute_timer( ), add_animal( ), add_containment_unit( ), add_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. Once started, our framework designer has designed the start_zoo_admin( ) operation to initiate the 5_minute_timer( ) operation. Every five minutes, the 5_minute_timer( ) operation instructs the zoo keeper objects to go out and check on the animals. The add/delete_zoo_keeper operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal( ) operation is responsible for interacting with users to define additional zoo animal classes and objects and to remove classes and objects that are no longer needed. Again, it is quite natural for a zoo to need to add and remove animals. The add/delete_containment_unit( )

operation is responsible for the definition of new containment unit classes and objects and for removal of classes and/or objects that are no longer necessary. Again, our framework designer has designed ZAF in a way that provides this flexibility by designing the animal and containment unit mechanisms as extensible functions.

Referring back to FIG. 2, the zoo keepers class definition has a uses relationship with the animal registry, animals, containment unit registry, and containment units classes. Since the value of ZAF is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

While the classes and categories within ZAF have been described as either core functions or extensible functions, it is important to note that the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (i.e., the overall framework function imposed by the structure and functional requirements of the framework). For example, the animals class has been designed as extensible function of ZAF so that ZAF can be customized to accommodate different types of animals. However, the ability to customize the extensible animals class does not imply that the nature of the customization can violate the basic structure imposed by the core function of ZAF (e.g., by customizing the animal class to the extent that it can no longer be reasonably said to represent a type of animal).

Figure 4:
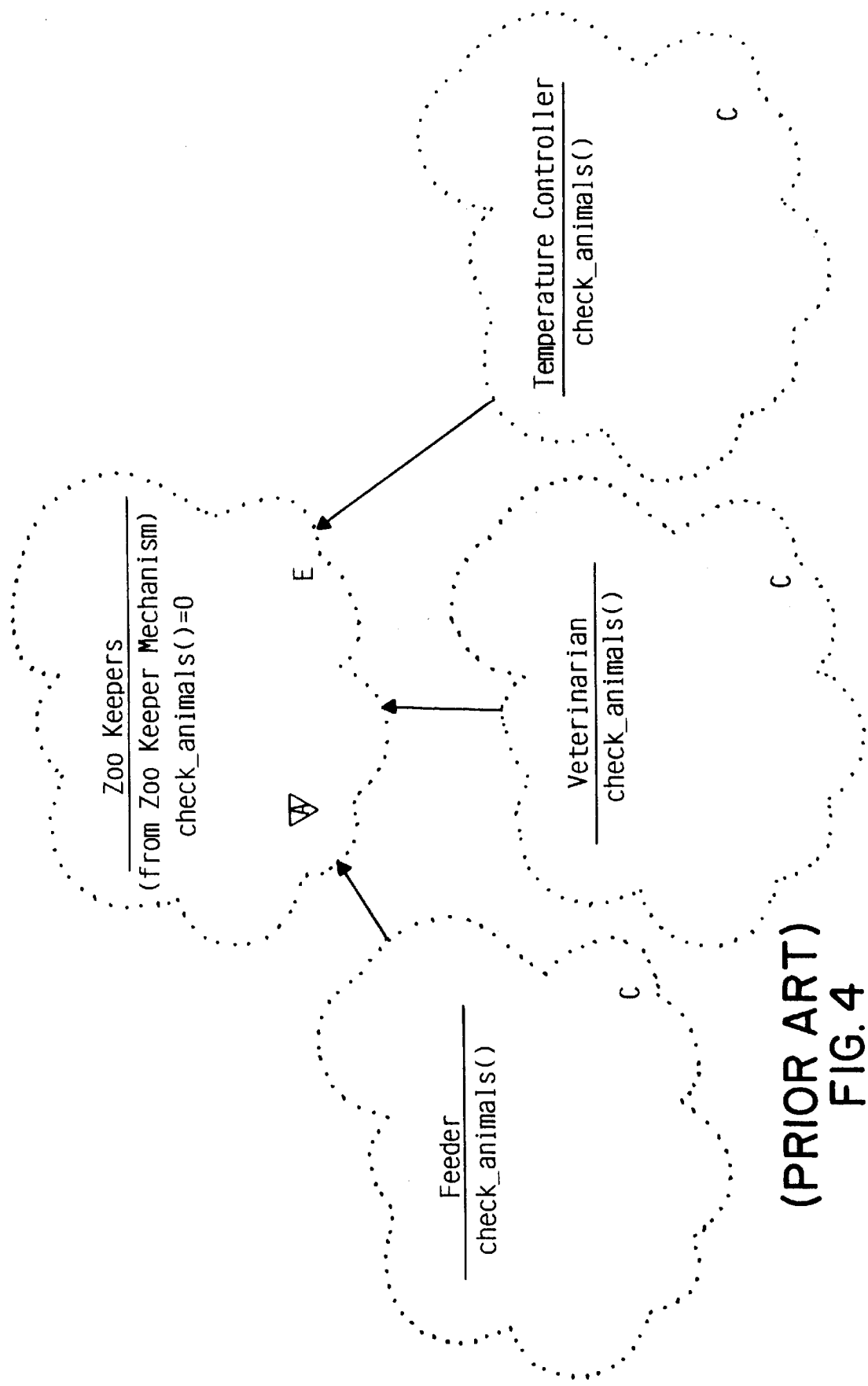

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (like the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact the action is actually performed. In other words, client objects need only understand that certain objects perform certain functions, not how those functions are actually carried out. This is one way in which a properly designed framework can be readily customized and extended to satisfy future requirements.

Figure 5:
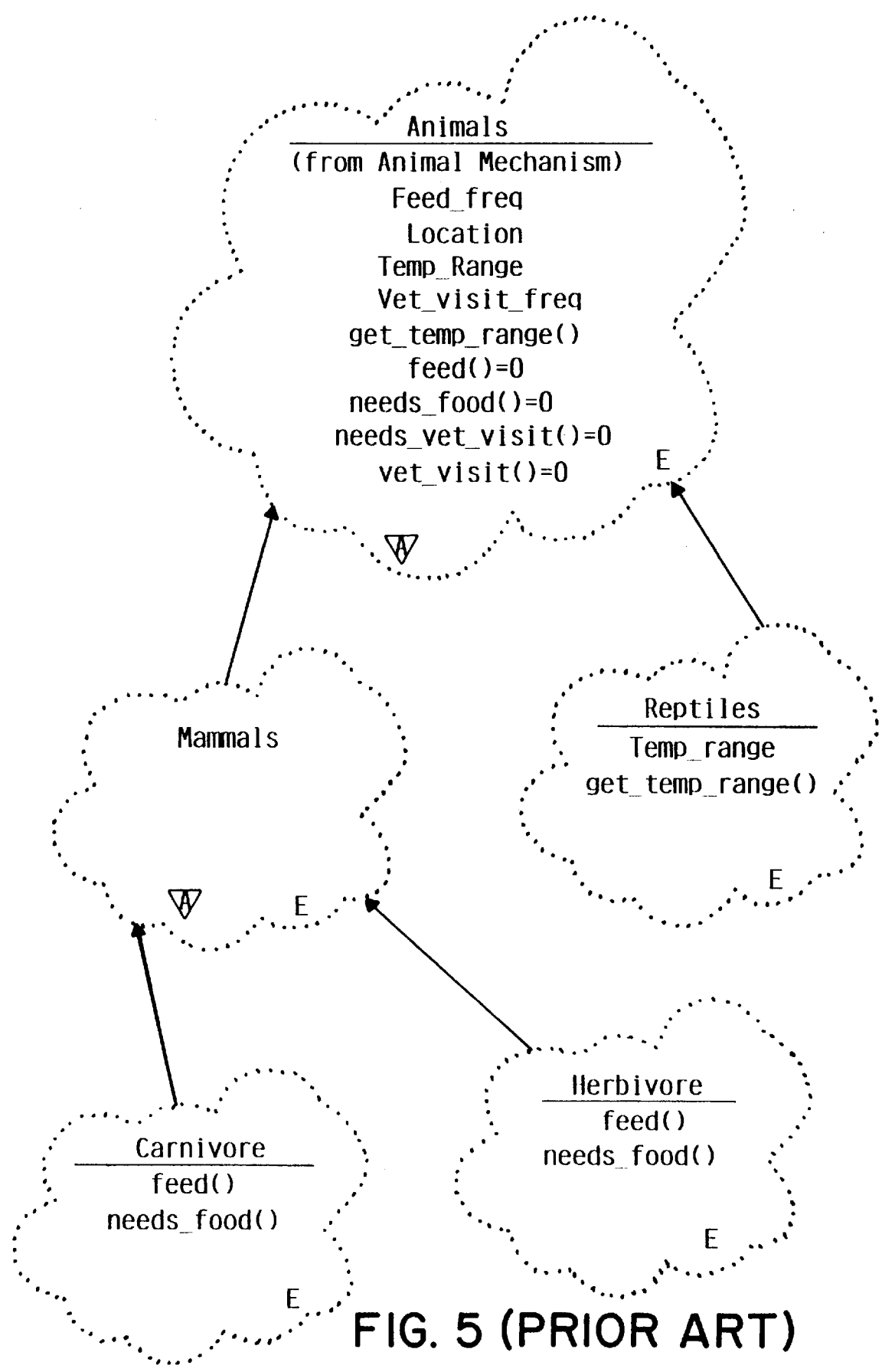

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility. As shown, the example animal class definition includes data definitions feed_freq, location, and temp_range and operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed( ) operation has been left up to the subclasses, subclasses carnivore and herbivore each have their own definition of the feed( ) operation. Again, this is a good design choice because meat eating carnivores are going to have different needs than their plant eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

FIG. 6 is a class diagram showing a lower level view of the containment unit class. The containment unit class contains virtual operation definition adjust_temp( ). The adjust_temp definition defines both the interface and mechanism used to actually adjust the temperature in the containment units of the zoo (i.e., via heating and cooling mechanisms which are not shown).

How the ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7A:
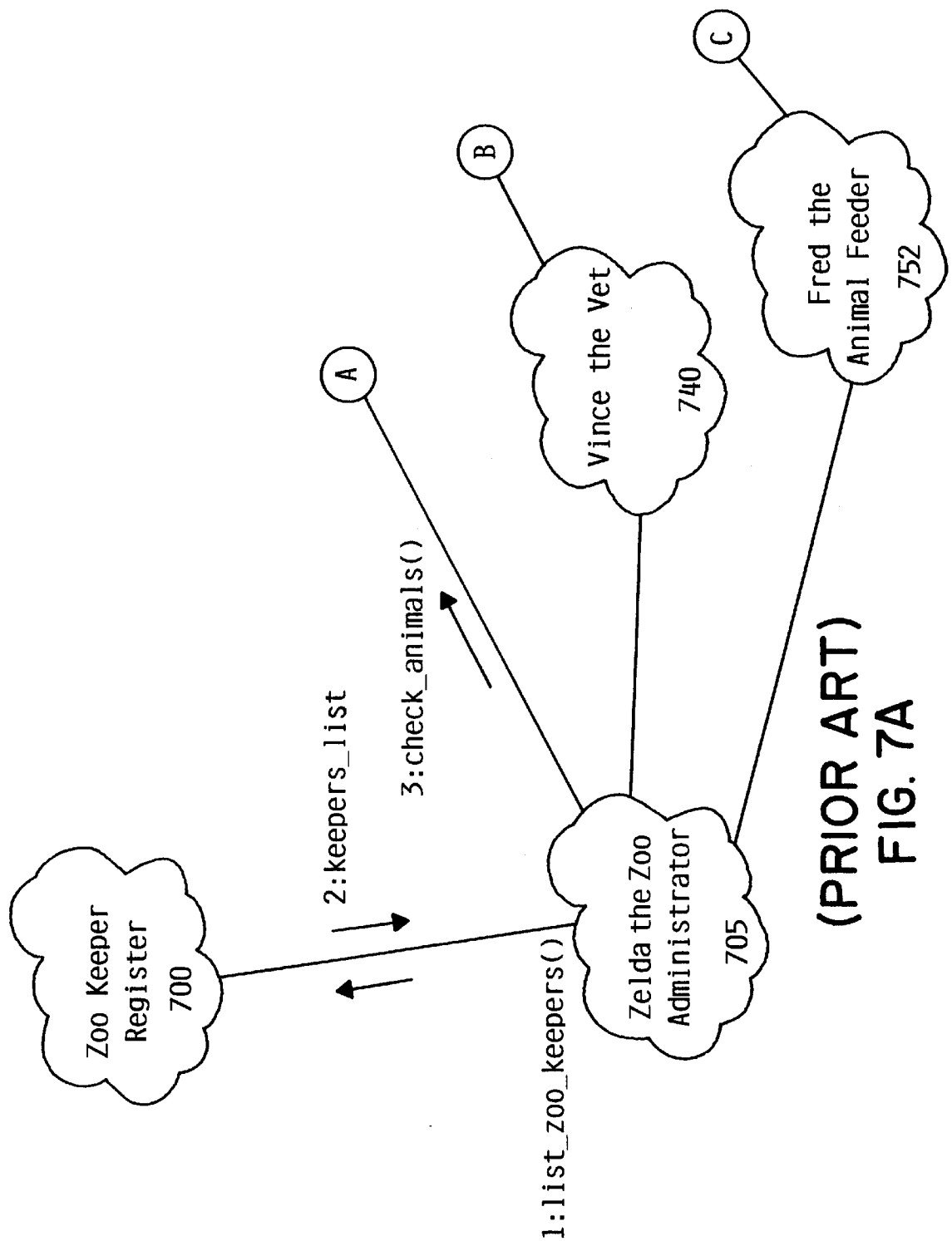
FIG. 7 is an object diagram for the example framework mechanism of FIGS. 1 through 6.
Figure 7C:
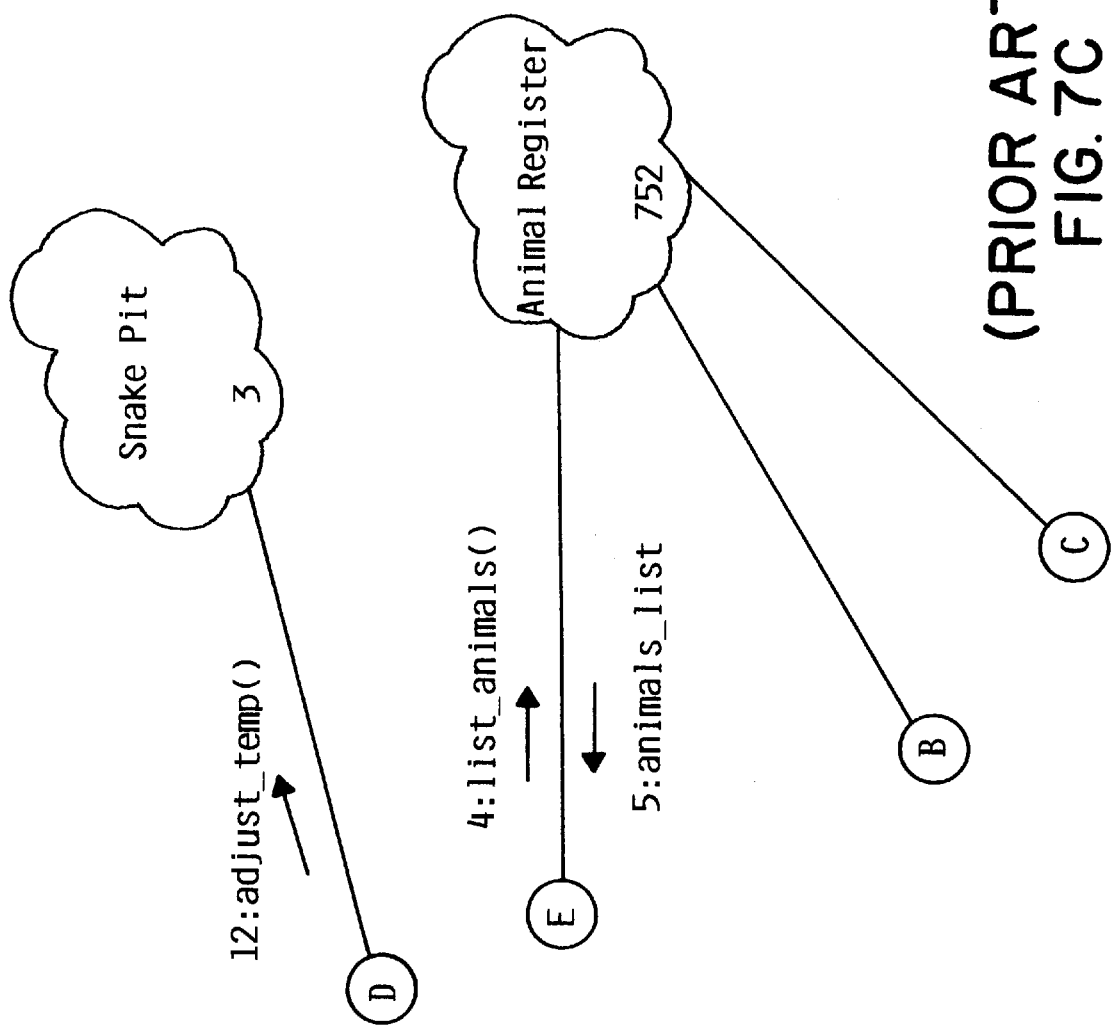

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 705] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check_animals( ) operation of each zoo keeper object [only the call to Tina the Temp. Checker is shown—step 3]. Please note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust temp( ) operations is polymorphic. In other words, the check_animals( ) operation of object Tina does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF mechanism is an extremely simplistic framework mechanism that has been presented here to help novice readers understand some basic framework concepts so as to best appreciate the benefits and advantages of the present invention. These benefits and advantages will become more clear upon reference to the following Detailed Description.

DETAILED DESCRIPTION

Figure 8:
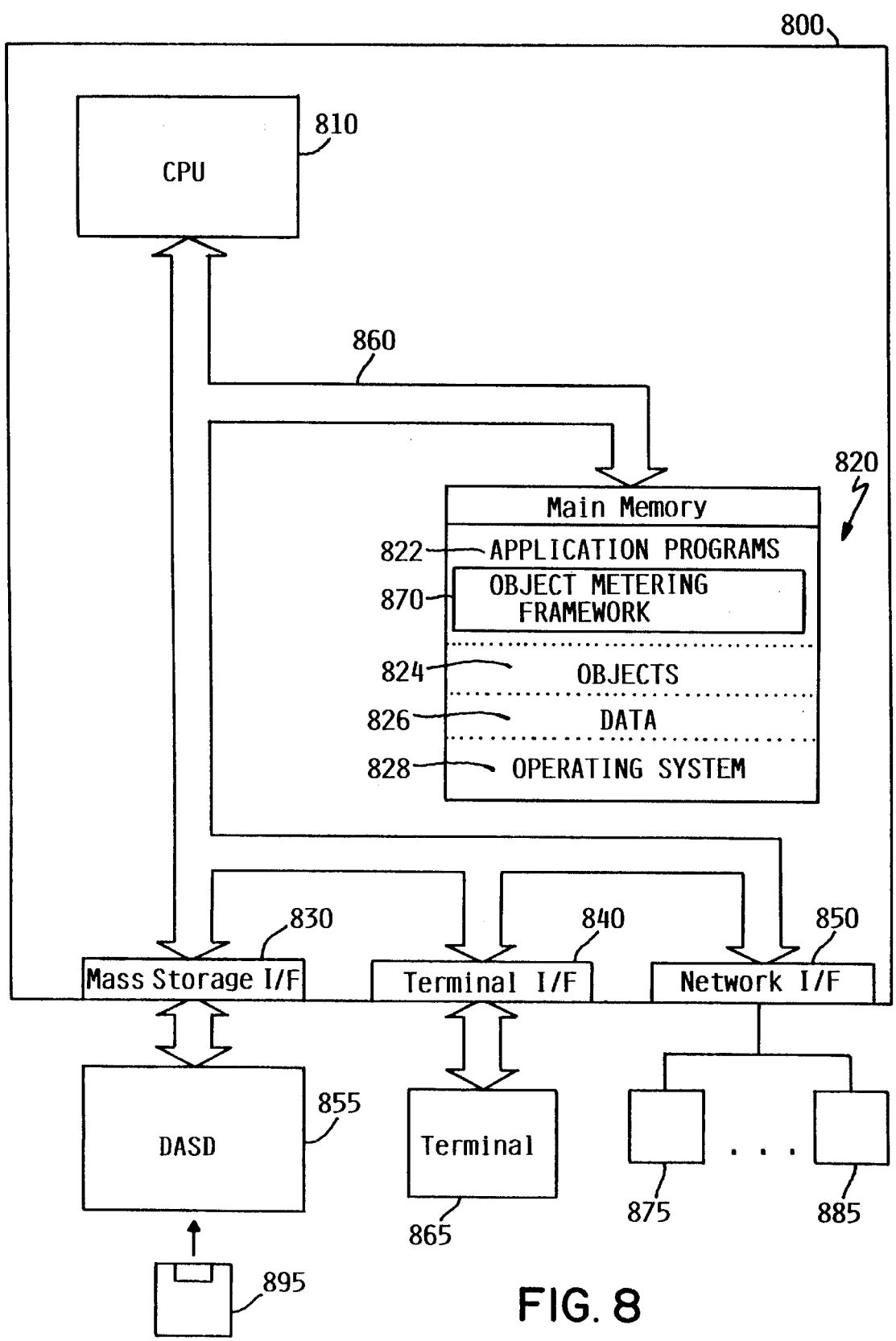
FIG. 8 is a block diagram of the computer system used in the preferred embodiment.

FIG. 8 shows a block diagram of a computer system 800 in accordance with the present invention. The computer system of the preferred embodiment is a computer system such as an AIX platform. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 8, computer system 800 comprises main or central processing unit (CPU) 810 connected to main memory 820, mass storage interface 830, terminal interface 840, and network interface 850. These system components are interconnected through the use of a system bus 860. Mass storage interface 830 is used to connect mass storage devices (such as DASD device 855) to computer system 800. One specific type of DASD device is a floppy disk drive, which may store data to and read data from a floppy diskette 895.

Main memory 820 contains application programs 822, objects 824, data 826, and an operating system 828. Computer system 800 utilizes well known virtual addressing mechanisms that allow the programs of computer system 800 to behave as if they only have access to a large, single storage entity (referred to herein as computer system memory) instead of access to multiple, smaller storage entities such as main memory 820 and DASD device 855. Therefore, while application programs 822, objects 824, and operating system 828 are shown to reside in main memory 820, those skilled in the art will recognize that these programs are not necessarily all completely contained in main memory 820 at the same time. Note that the term "computer system memory" is used herein to generically refer to the entire virtual memory of computer system 800.

Operating system 828 is a suitable multitasking operating system such as AIX; however, those skilled in the art will appreciate that the spirit and scope of the present invention is not limited to any one operating system. Operating system 828 preferably supports an object oriented programming environment such as that provided, for example, by the C++ programming language. One or more application programs 822 provide a programming environment for computer system 800, and include an object metering framework mechanism 870, which is preferably an object oriented framework mechanism. Framework mechanism 870 contains instructions capable of being executed on CPU 810 and may exist anywhere in the virtual memory space of computer 800.

Although computer system 800 is shown to contain only a single main CPU and a single system bus, those skilled in the art will appreciate that the present invention may be practiced using a computer system that has multiple CPUs and/or multiple buses, whether contained in a single unit or distributed across a distributed processing computer system. In addition, the interfaces that are used in the preferred embodiment each include separate, fully programmed microprocessors that are used to off-load compute-intensive processing from CPU 810. However, those skilled in the art will appreciate that the present invention applies equally to computer systems that simply use I/O adapters to perform similar functions.

Terminal interface 840 is used to directly connect one or more terminals 865 to computer system 800. These terminals 865, which may be non-intelligent or fully programmable workstations, are used to allow system administrators and users to communicate with computer system 800.

Network interface 850 is used to connect other computer systems and/or workstations (e.g., 875 and 885 in FIG. 8) to computer system 800 in networked fashion. The present invention applies equally no matter how computer system 800 may be connected to other computer systems and/or workstations, regardless of whether the connection to the network is made using present-day analog and/or digital techniques or via some networking mechanism of the future. It is also important to point out that the presence of network interface 850 within computer system 800 means that computer system 800 may engage in cooperative processing with one or more other computer systems or workstations. Of course, this in turn means that the programs shown in main memory 820 need not necessarily all reside on computer system 800. For example, one or more application programs 822 may reside on another system and engage in cooperative processing with one or more programs that reside on computer system 800. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the present invention is capable of being distributed as a program product via floppy disk (e.g., 895 of FIG. 8), CD ROM, or other form of recordable media, or via any type of electronic transmission mechanism.

Object Metering Framework Mechanism of the Present Invention

The object metering framework mechanism disclosed herein provides an architecture for metering the usage of objects in a computer program. Extending the framework to meter objects in a specific environment defines a "metering environment." For example, extending the framework to meter the usage of objects by one or more users creates a metering environment that is tailored to that specific task.

By providing framework mechanism 870 within computer system 800 to meter the usage of objects, a uniform interface for metering objects in any computer program is provided. Framework mechanism 870 may replace all of the proprietary systems for metering objects that are currently used. This would allow a common programmer interface for virtually any program that requires object metering. This common interface would greatly ease the burden of programming and maintaining custom object metering systems. Thus, one of the primary benefits of the framework disclosed herein is the capability to meter objects using a simple, easy to use interface defined by the framework.

Figure 9:
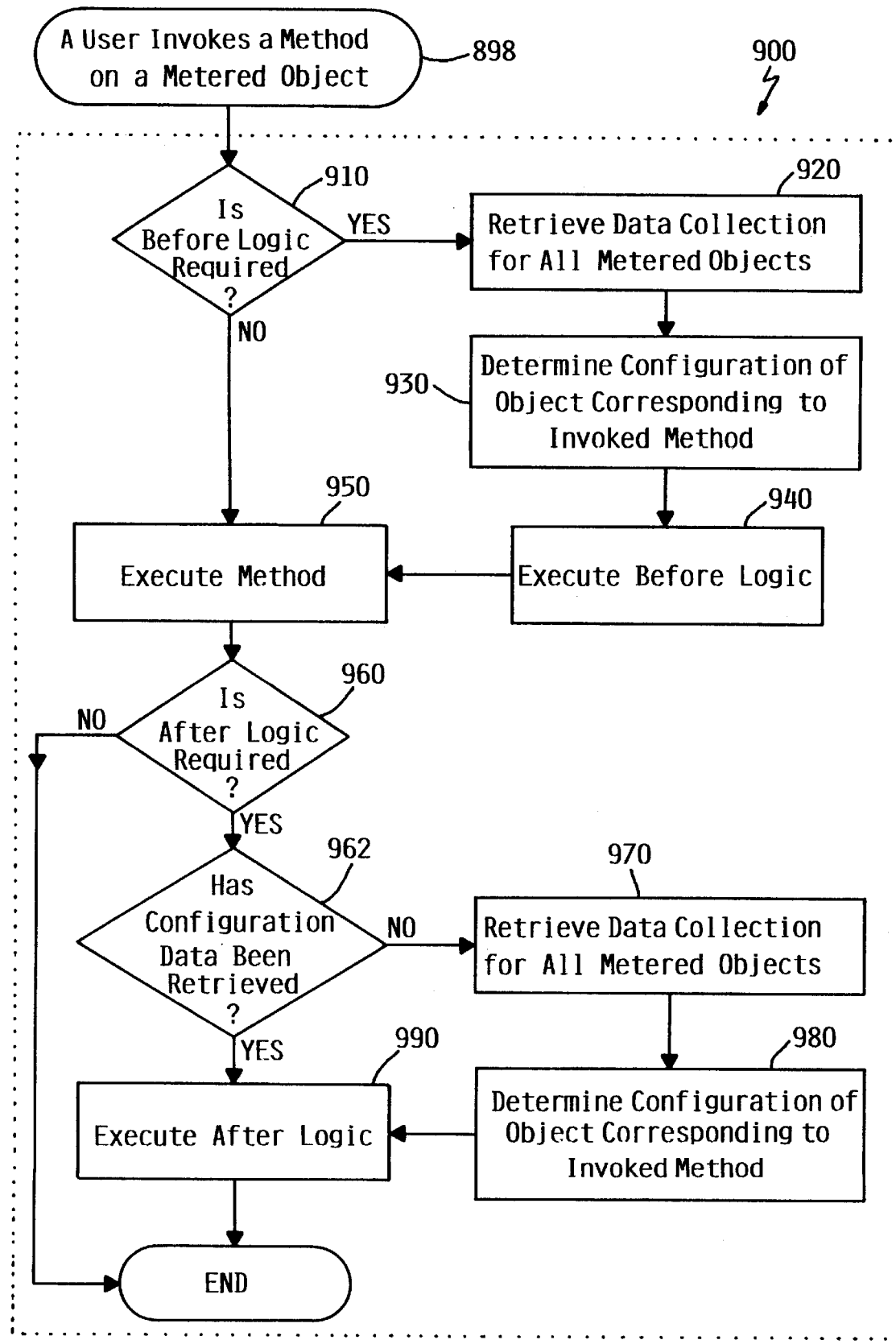
FIG. 9 is a flow diagram showing steps in accordance with the preferred embodiment to perform core functions of the framework mechanism.

Referring to FIG. 9, an object metering framework in accordance with the preferred embodiment performs steps that comprise a method 900 for metering objects. The framework is invoked whenever a method on a metered object is invoked (step 898). Once the method is invoked, the first step is to determine if any preprocessing (i.e., "before logic") is required before executing the method (step 910). If before logic is required (step 910=YES), a data collection is retrieved for all metered objects (step 920). The data collection contains all the metering data pertaining to the metered objects. Next, the configuration of the object corresponding to the invoked method is determined (step 930). The configuration may include information such as whether or not the object is a member of a suite, the applicable thresholds for use, the methods that are to be metered, and whether or not the metered data for the object is stored in a fixed location or is distributed across several locations. Once the configuration data has been determined (step 930), the appropriate before logic is executed (step 940). One example of suitable before logic is to start a timer when the timing of a method is to be metered. Note that before logic may include the updating of metered data for the object. Once any required before logic is executed, the invoked method is executed (step 950).

After the invoked method is executed (step 950), a determination is made whether or not there is any required postprocessing (i.e., "after logic" that must be executed) (step 960). If there is no required after logic (step 960=NO), method 900 ends. If there is after logic that must be performed (step 960=YES), method 900 first checks to see if configuration data for the invoked method has already been retrieved (step 962). If before logic was executed for the invoked method, the configuration data was previously retrieved in steps 920 and 930, and need not be retrieved again. If configuration data was not previously retrieved (step 962=NO), the data collection is retrieved (step 970) and the configuration is determined (step 980). Next, the after logic is executed (step 990).

Updating the metered data for an invoked method may occur during the execution of the before logic (step 940) or during the execution of the after logic (step 980). In the preferred embodiment, the updating of metered data is performed as part of the after logic so that access to the method may be granted without substantial overhead and delay, with the metering functions occurring in parallel with or after the execution of the invoked method by the after logic. The specific steps involved with updating the metered data depend on the type of metering being performed. For example, if usage of an object is being metered, the metered data is incremented to reflect another use of the object. If the users of an object are being metered, the user that called the method would be added to the list of users if this is the first time the user called a method on the object, or would increment the count of a user that had previously called a method on the object. If the timing of the called method is being metered, a timer would be started during the before logic (step 940) before invoking the method, and would be stopped during the after logic (step 990). The execution time for the method would then be stored as part of the after logic (step 990). As shown by the examples discussed above, the framework 870 may be extended by a programmer to define any number of different object metering environments.

The steps in method 900 are shown to be sequential, but may be performed in parallel in a multi-threaded system. In fact, a significant advantage that framework 870 provides when compared to prior art metering systems is that the method and the metering functions may be performed simultaneously, thereby reducing the overhead required to perform the metering function. A multi-threaded system may execute the invoked method with one thread and may perform the metering functions in another thread. Many prior art metering systems perform the metering functions before granting access to execute the method. This is one solution for preventing users that would exceed the number of users allowed by the license agreement from accessing the method. However, another solution that may be implemented using the object metering framework 870 is to grant access to the desired method each time the framework is invoked after checking a simple status register. If the status register indicates the method can be accessed, the method is executed, and the metering functions are performed either in parallel or after the method is executed. If the metering function determines that incrementing the number of users results in a number of users equal to the maximum number allowed by the license agreement, the metering function updates the status register to indicate that the method may not be accessed. In this manner the object metering may be performed in a multi-threaded system without the overhead associated with prior art metering systems, which typically determine the type of metering needed and perform extensive checks before granting access to the method.

The fact that the preferred embodiment of the framework is object oriented allows the user of the framework to easily define the needed functions by subclassing from the classes defined within the framework using known object oriented programming environments, such as C++. The preferred embodiment of the present invention is an object oriented object metering framework. While many different designs and implementations are possible, one suitable example of an object oriented object metering framework is disclosed below to illustrate the broad concepts of the present invention.

Class Definitions

Figure 10:
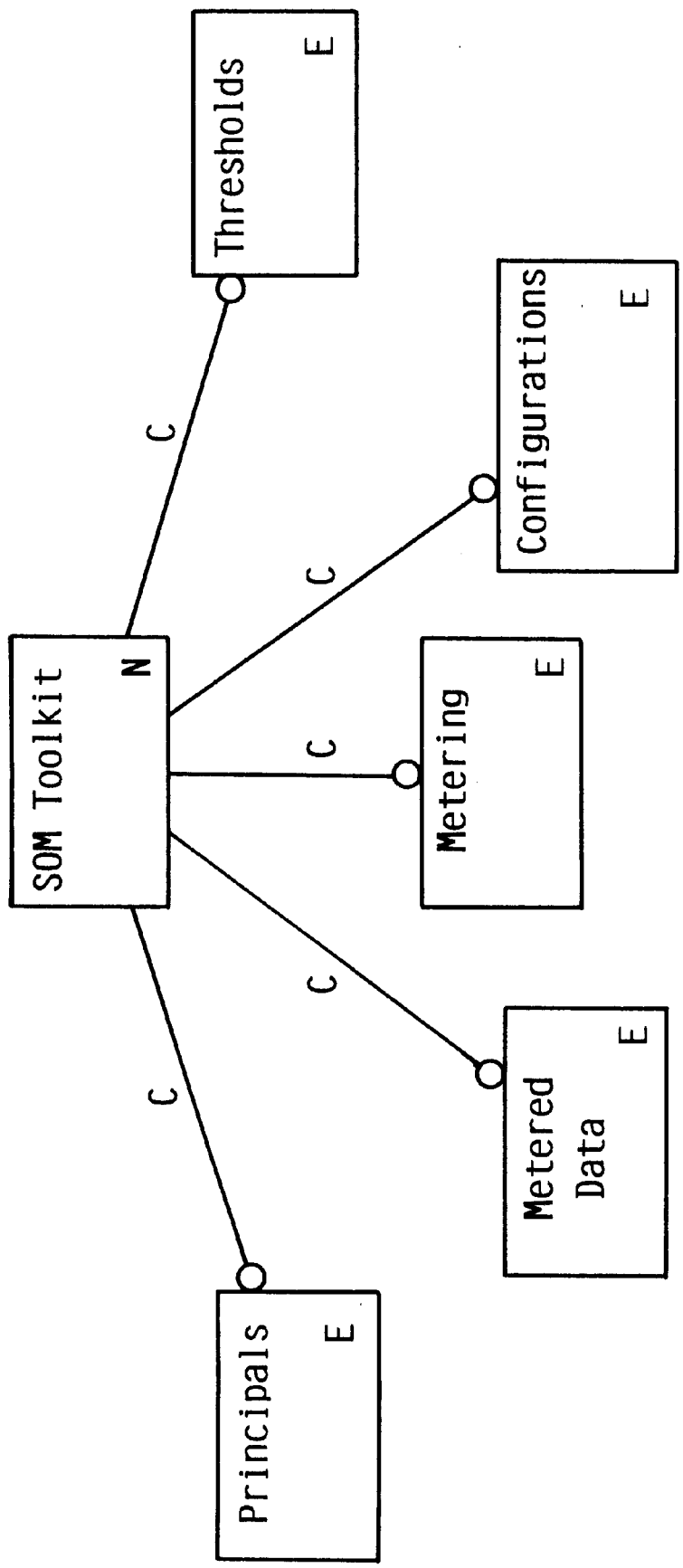
FIG. 10 is a category diagram of a framework mechanism constructed in accordance with the teachings of the preferred embodiment.

FIG. 10 is a category diagram of the object metering framework mechanism 870 in accordance with the preferred embodiment. Those skilled in the art will appreciate that the categories illustrated in FIG. 10 represent collections of object oriented programming (OOP) classes that encapsulate data attributes and behaviors (or methods). Objects instantiated as members of these classes are stored in the main memory 820 of computer system 800. These classes may be implemented, for example, in a computer system operating environment that supports the C++ programming language.

The classes have been divided into six categories: SOM Toolkit, Principals, Metered Data, Metering, Configurations, and Thresholds. All but the SOM Toolkit are extensible categories (as indicated by the "E" label), meaning that users may extend the classes in these categories by defining and implementing classes that are subclasses of framework-defined classes. The SOM Toolkit is not strictly necessary to an implementation of a framework in accordance with the invention (as indicated by the "N" label), but is included here in the preferred embodiment for the convenience it provides in providing persistence, defined metaclasses, and methods for subclasses of these classes. Some of the benefits SOM provides is persistence and metaclasses. The Principals, Metered Data, Metering, Configurations, and Thresholds categories each have a using relationship with the SOM Toolkit, indicating that classes within these categories may invoke the methods provided by the SOM Toolkit. Note that the relationships between categories are core relationships (as indicated by the "C" label), meaning that the framework user cannot modify these relationships.

Figure 11B:
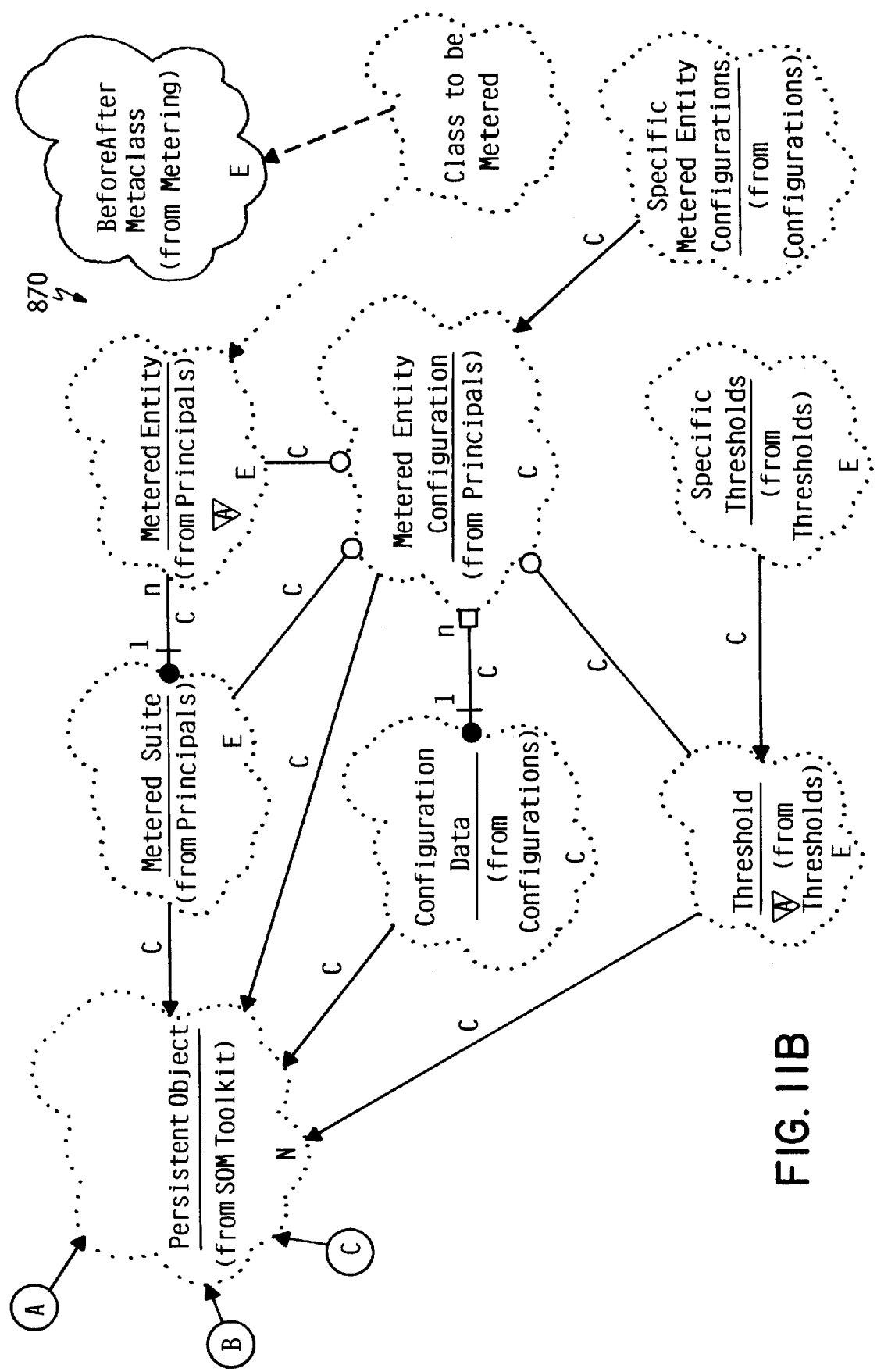
FIGS. 11–17 are class diagrams of a framework mechanism constructed in accordance with the teachings of the preferred embodiment.

FIG. 11 is a top level class diagram of metering framework 870. The SOM Toolkit category includes a PersistentObject class, and a BeforeAfter metaclass. The Principal class, SpecificPrincipals class, MeteredSuite class, and MeteredEntity class are all members of the Principals category. Classes that are members of the MeteredData category include: MeteredData, MeteredEntityData, and SpecificMeteredEntityData. The BeforeAfter metaclass is a member of the Metering category. Classes that are members of the Configurations category include: ConfigurationData, MeteredEntityConfiguration, and SpecificMeteredEntityConfigurations. The Thresholds category includes the Threshold class and the SpecificThresholds class. The methods provided in each class are not shown in FIG. 11, but are shown in subsequent figures.

FIG. 11 illustrates the relationships between the classes in the framework. The MeteredData class, the ConfigurationData class, and the MeteredEntityConfiguration class are core classes of the framework. The rest of the classes are extensible classes, while the relationships between the classes are part of the core function of the framework. The various classes of FIG. 11 with "specific" in their name represent any number of classes that are subclasses as required to define any number of object metering environments.

The framework as illustrated in FIG. 11 is extremely flexible and powerful. A programmer may define any number of metering configurations or environments by appropriate subclassing from the defined classes of the framework. In fact, the framework of FIG. 11 must be subclassed to perform a desired metering function. While FIG. 11 illustrates the framework of the present invention in broad terms, the details of the preferred embodiment are best understood with reference to the class diagrams of FIGS. 12–17, which illustrate subclasses that perform several specific metering functions. Note, however, that the specific metering functions defined in the preferred embodiments are exemplary of the types of metering functions that may be implemented by appropriate subclassing, and the framework mechanism expressly encompasses any and all suitable subclasses for metering any desired parameter relating to objects in a computer program.

Figure 12:
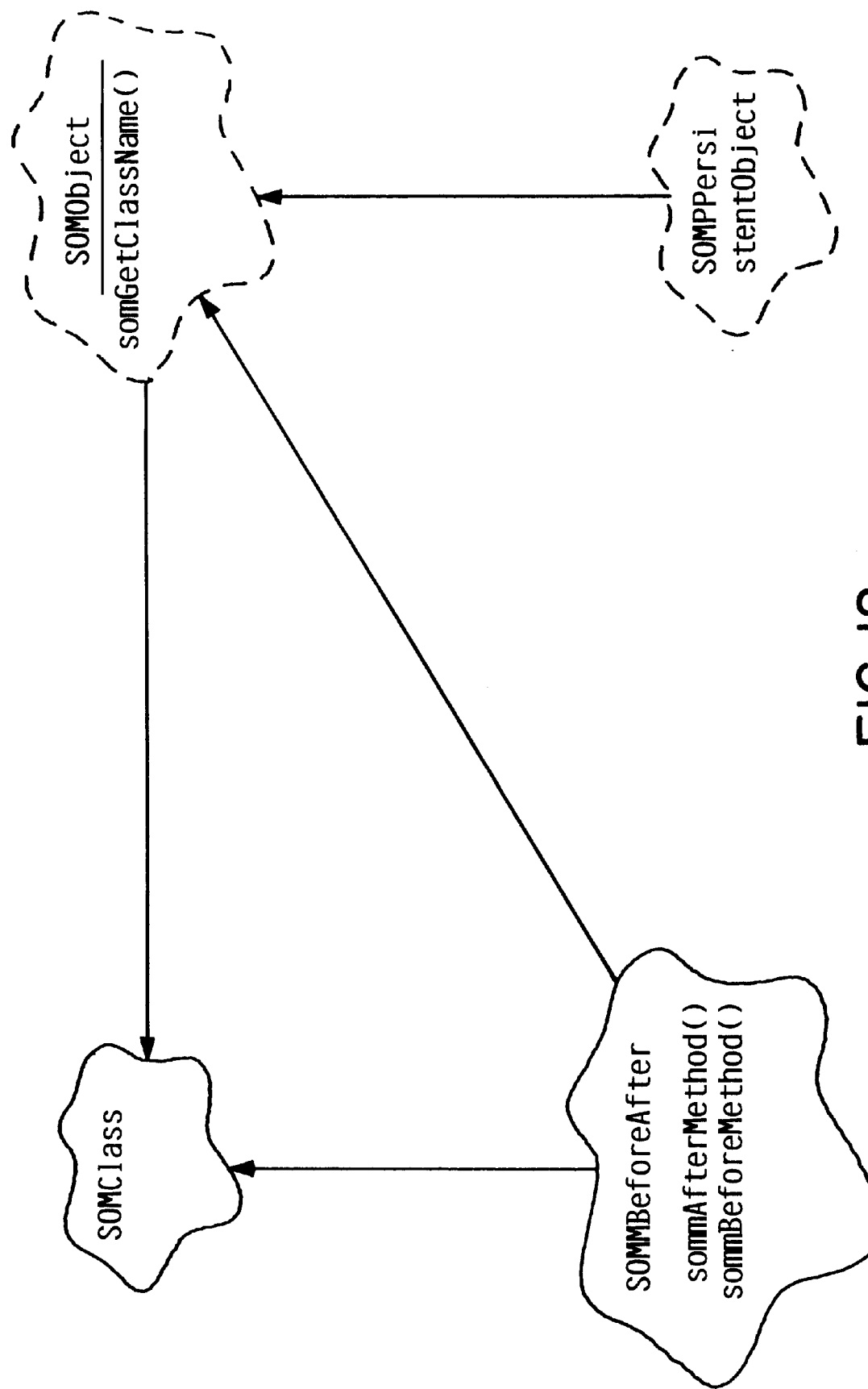

A class diagram of the classes in the SOM Toolkit category are shown in FIG. 12 for the preferred embodiment. The classes in the SOM Toolkit are a portion of IBM's System Object Model (SOM) Toolkit version 2.1. The SOM toolkit is used merely for illustrating an example of one specific implementation of the object metering framework. Note that the SOM Toolkit of FIG. 12 provides a SOMMBeforeAfter metaclass and a SOMPPersistentObject class that correspond to the BeforeAfter metaclass and PersistentObject class of FIG. 11. While the SOM Toolkit is not strictly necessary to implement the object metering framework, it provides a very useful mechanism for defining many classes of the object metering framework through appropriate subclassing. The SOMPPersistentObject class is a subclass of the SOMObject class, whose metaclass is the SOMClass metaclass. SOMMBeforeAfter is a metaclass that is defined by subclassing from the SOMClass metaclass and the SOMObject class. The SOMObject class is the root class for all SOM classes. All SOM objects must be subclasses of SOMObject or one of its subclasses. SOMObject defines the set of methods that provide the behavior required for all SOM objects. For example, the somGetClassName( ) method is used to get the name of the class that defines the object being called.

The SOMMBeforeAfter metaclass provides two methods for invoking methods before and after each invocation of an instance. The sommBeforeMethod( ) is invoked before the invocation of an instance, and the sommAfterMethod( ) is invoked after the invocation of an instance Other methods for the SOM classes are also defined in the SOM Toolkit, but are not described here. The reader may refer to the appropriate SOM documentation for further details. The details of the SOM methods used in the object metering framework 870 are best understood with reference to the subclasses of FIG. 13.

Figure 13:
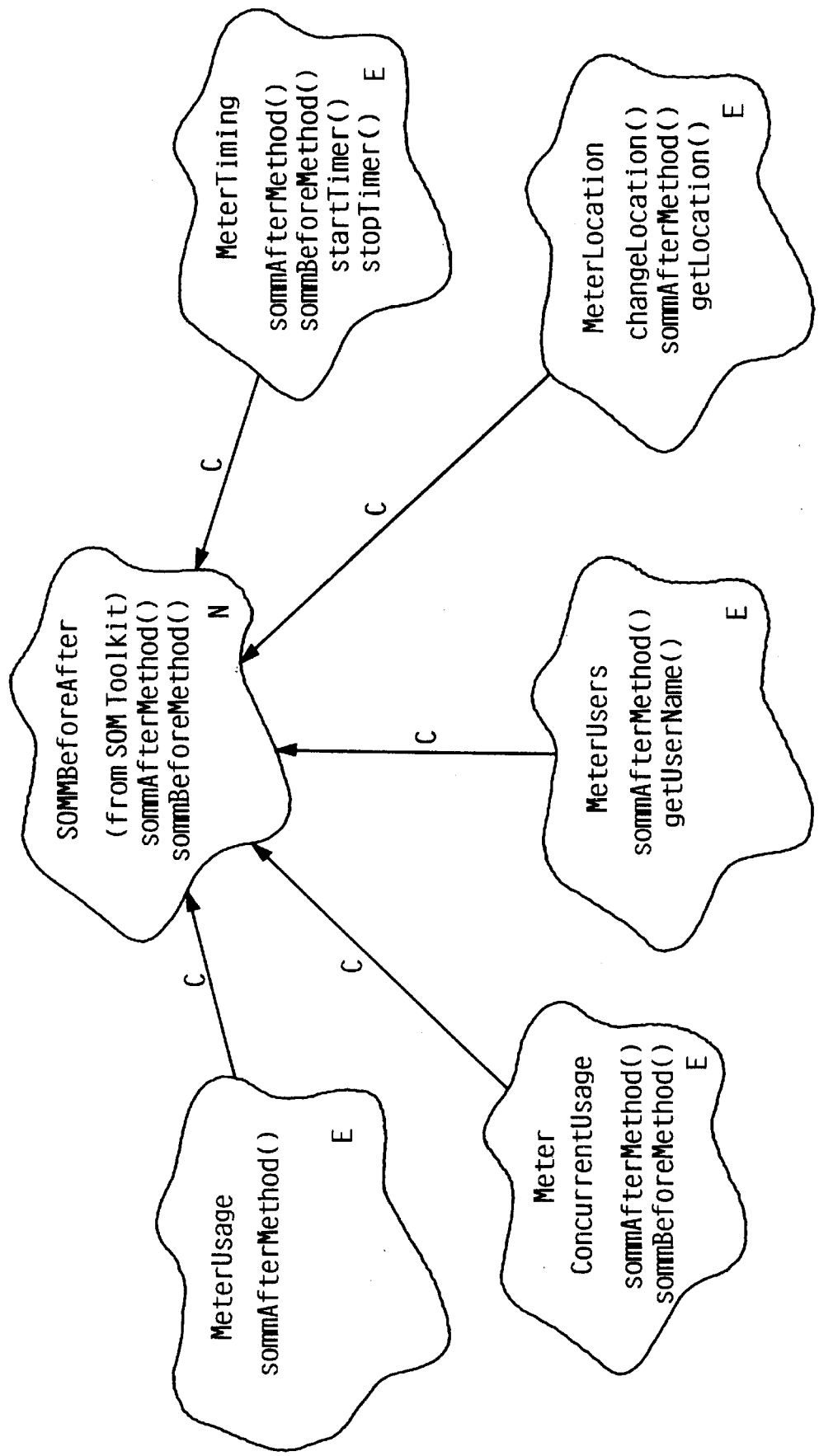

Referring to FIG. 13, the MeterUsage class, the MeterConcurrentUsage class, the MeterUsers class, the MeterLocation class, and the MeterTiming class are all members of the Metering category, and represent suitable subclasses that define different types of metering. Each of these metaclasses correspond to a different BeforeAfter metaclass of FIG. 11. Each have methods that are used by the objects within the framework mechanism to perform the defined metering functions. For example, the MeterUsage metaclass is defined to meter basic usage of an object such as instantiation or general method usage. It uses the sommAfterMethod( ) method to meter the usage of the object after the invoked method on the object has already been executed. The MeterConcurrentUsage metaclass provides a mechanism to meter concurrent usage of an object. Invoking the sommBeforeMethod( ) method increments the concurrent usage of the object before the method is executed. In similar fashion, invoking the sommAfterMethod( ) method decrements the concurrent usage of the object after the method is executed.

The MeterUsers metaclass is defined to meter the User class, which is a subclass of the Principal class. The MeterUsers metaclass defines two methods. The first, getUserName( ), is an internal method that determines which user (i.e., human) to associate with the object being metered, and returns a User instance corresponding to the human user. The second is sommAfterMethod( ), which performs the metering function for the User after the client method is executed.

The MeterLocation metaclass is defined to meter the location of the metered entity in conjunction with the Location object, which is a subclass of the Principal class. MeterLocation defines a getLocation( ) method, a changeLocation( ) method, and a sommAfterMethod( ) method. The getLocation( ) method is an internal method that returns the Location object associated with a metered object for location. The changeLocation( ) method changes the Location object associated with a metered object. The sommAfterMethod( ) method performs the location metering function after the client method is executed.

The MeterTiming metaclass is defined to meter the amount of time needed to execute a metered method. Meter- Timing defines the following methods: sommBeforeMethod( ); sommAfterMethod( ); startTimer( ); and stopTimer( ). The sommBeforeMethod( ) method is called before the execution of the client method, and calls the startTimer( ) internal method to start the timer. The method is then executed, and the sommAfterMethod( ) is called, which calls the stopTimer( ) internal method to stop the timer. The timer then contains the valid time that was required to execute the client method.

The metaclasses and methods illustrated in FIG. 13 represent suitable BeforeAfter metaclasses (of FIG. 11). One skilled in the art will recognize that these metaclasses that are defined in the preferred embodiment are merely examples of many different types of metering functions that may be implemented using the framework. Additional metaclasses may be defined as needed to define other types of metering that needs to be performed.

Figure 14A:
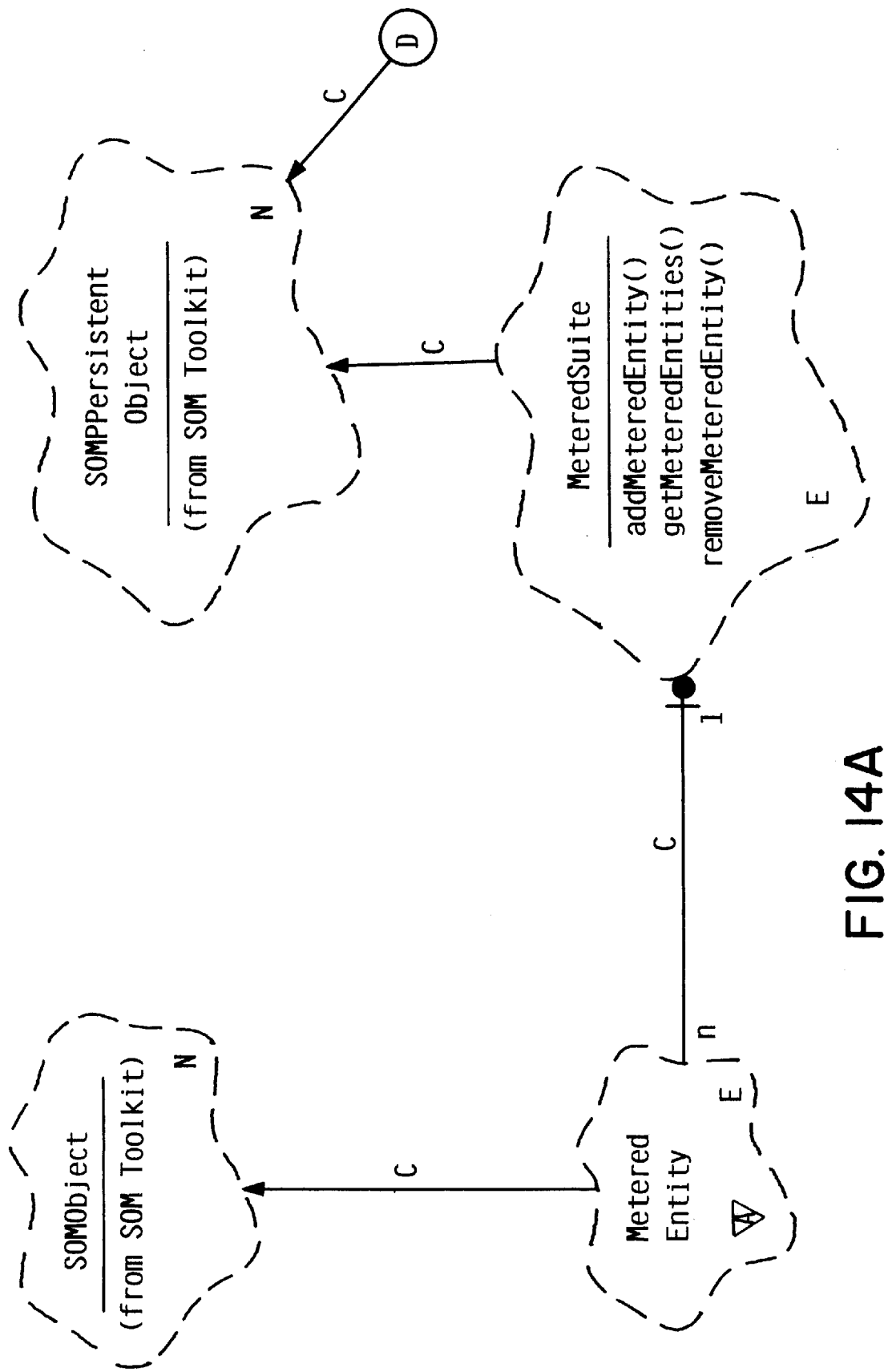
Figure 14B:
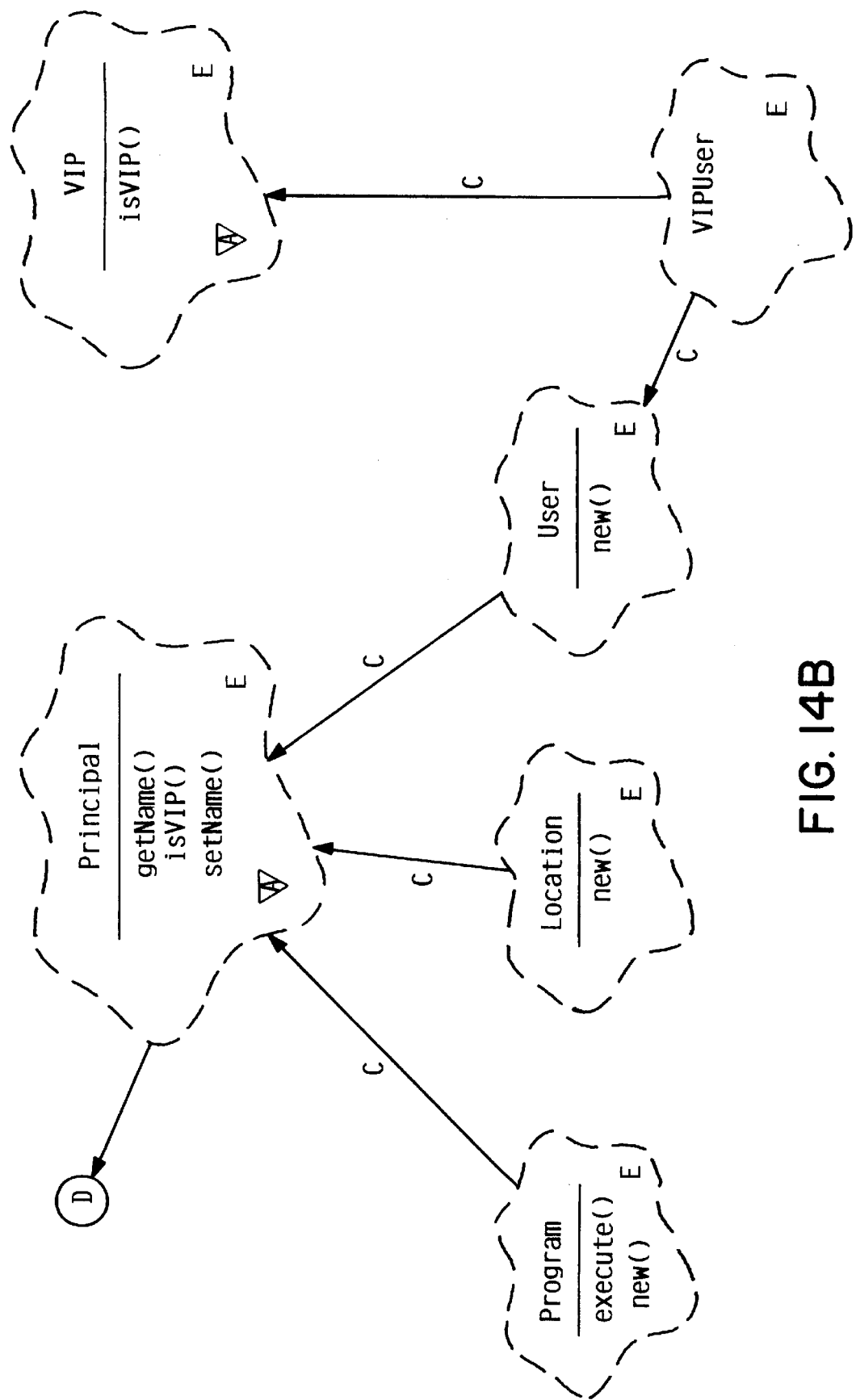

FIG. 14 illustrates suitable classes that belong to the Principals category in the preferred embodiment (with the exception of the two SOM classes from the SOM Toolkit category). MeteredEntity is an extensible abstract class. An object to be metered must be subclassed from the MeteredEntity class. MeteredSuite is a class that represents a group of MeteredEntity objects, as represented by the MeteredSuite class having a "has by value" relationship with the MeteredEntity class, with the "n" on the class relationship indicating that MeteredSuite may contain many different metered entities. A MeteredSuite's metered data is the sum of the metered Entities that it contains. The suite concept makes it easy to meter the usage of a group of objects, such as when a framework mechanism is invoked. MeteredSuite defines an addMeteredEntity( ) method, a getMeteredEntities( ) method, and a removeMeteredEntity( ) method. The addMeteredEntity( ) method adds a MeteredEntity to this MeteredSuite. The getMeteredEntities( ) method returns the collection of Metered Entities for this MeteredSuite. And the removeMeteredEntity( ) method removes a specified MeteredEntity from this MeteredSuite.

Principal is an abstract class that defines the behavior for principals in the framework. Principals are those objects that either use or are associated with the Metered Entities. Specific types of principals are subclasses of the Principals class, such as the Program class, Location class, and User class of the preferred embodiment illustrate in FIG. 14. Principal defines a setName( ) method, an is VIP( ) method, and a getName( ) method. The setName( ) method sets the name of the principal to the input string that is passed as a parameter. The is VIP( ) method is used to determine whether the object is a VIP (Very Important Principal), and returns a true if the object is a VIP and a false if not. The getName( ) method is used to determine and return the name of the Principal object. Note that the MeteredSuite class and the Principal class are both subclassed from the SOMPPersistentObject class to take advantage of its predefined methods, which provides persistence.

The Program, Location, User, and VIPUser classes are examples of SpecificPrincipals classes (from FIG. 11) that are defined in the preferred embodiment by appropriate subclassing from the Principal class. The Program class is a Principal that represents an executable program. The Program class defines a method execute( ) and a method new( ). The execute( ) method executes a computer program associated with the Principal object. The new( ) method is invoked by passing the name of a program, which causes the Program object corresponding to this name to be instantiated.

The Location class represents a location where metered data can physically exist, such as on a computer workstation (i.e., node) on a network. Location defines a new( ) method, which is used to create a new object with the name passed as an argument in the new( ) method invocation.

The User class represents a human user who will use or interact with a MeteredEntity. User objects are created for users that need to be monitored. The User class defines a new( ) method that creates a new User object with a name that is passed as a parameter when the new( ) method is invoked.

The preferred embodiment as illustrated in FIG. 14 also includes a VIPUser class, which is a subclass of the User class and a VIP class. The VIP class defines a single method is VIP( ), which returns true if the User is a VIP and a false if not. Since the VIP class is a VIP, is VIP( ) always returns true for this class. A VIP is a very important principal. The VIP class is defined so that objects of this class can enjoy special privileges. For example, an object that has VIP status may not be prevented from accessing an object if some limit had already been reached on that object. Subclasses of VIP must use correct class precedence to ensure that the subclass's is VIP( ) method is called. Otherwise, the object will not enjoy VIP status.

Figure 15A:
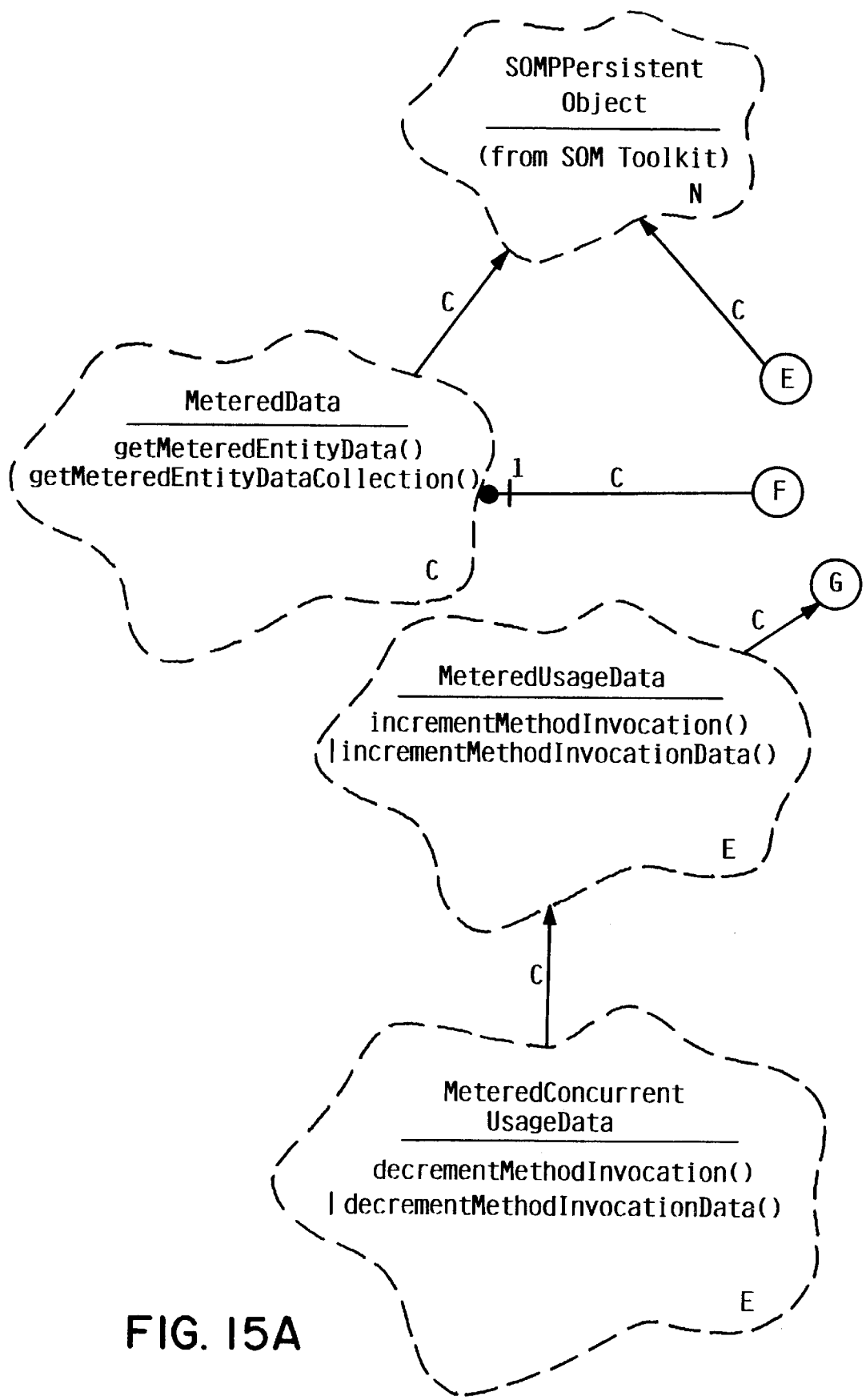
Figure 15B:
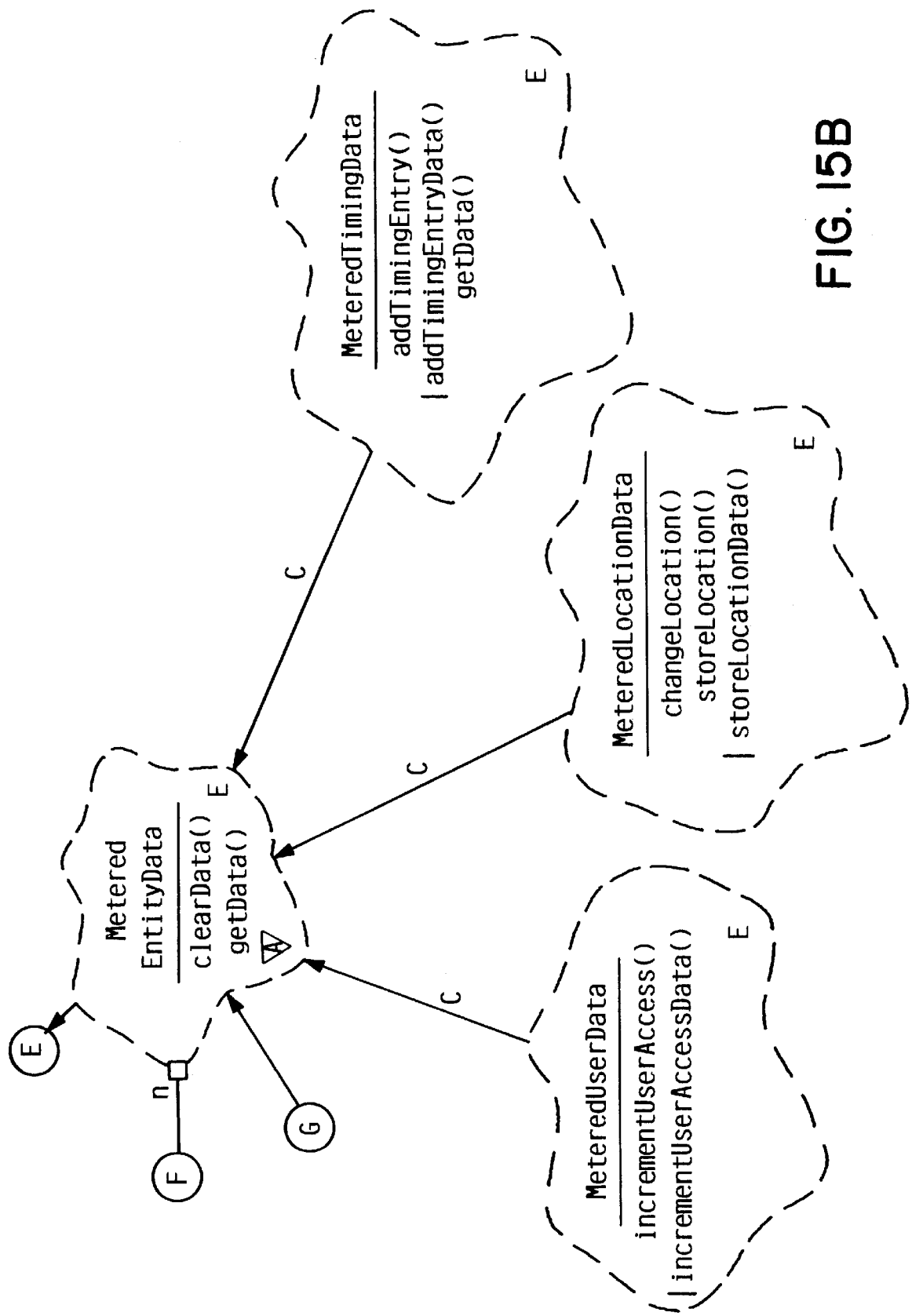

Classes in the Metered Data category are shown in the class diagram of FIG. 15, and include a MeteredData class, a MeteredEntityData class, a MeteredUsageData class, a MeteredConcurrentUsageData class, a MeteredUserData class, a MeteredLocationData class, and a MeteredTimingData class. Both MeteredData and MeteredEntityData are subclasses from the SOMPPersistentObject class to take advantage of its predefined methods which provide persistence. The MeteredData class is a collection of one or more MeteredEntityData objects, as represented by the "has by reference" relationship from MeteredData to MeteredEntityData. MeteredData defines two methods. The first is getMeteredEntityDataCollection( ), which returns the collection of MeteredEntityData objects. The second is getMeteredEntityData( ), which is used to access the MeteredEntityData for the object name that is passed as a parameter.

The MeteredEntityData class contains all the metered data for that class. MeteredEntityData defines two methods, clearData( ) and getData( ). The clearData( ) method removes all the collected data for a metered object. The getData( ) method is used to return the data associated with the class specified by the input parameter. Different types of MeteredEntityData are defined by appropriate subclassing. In the preferred embodiment as illustrated in FIG. 15, a MeteredUsageData class, a MeteredConcurrentUsageData class, a MeteredUserData class, a MeteredLocationData class, and a MeteredTimingData class define different types of metered data that may need to be stored. Each of these represent a SpecificMeteredEntityData class as shown in FIG. 11.

The MeteredUsageData class collects usage data for Metered Entities, and includes two methods, incrementMethodInvocation( ) and incrementMethodInvocationData( ). The incrementMethodInvocation( ) method is invoked to increment the usage for a metered object. The incrementMethodInvocation( ) method in turn invokes the incrementMethodInvocationData( ) internal method, which actually increments the usage count for the method specified by the class and method names that are passed as parameters. The MeteredConcurrentUsageData collects concurrent usage data for Metered Entities. This is a specialization of standard usage metering. Instead of simply incrementing the usage data for each access, the data must be incremented at the beginning of each access and must be decremented when the method has completed execution. In addition to the methods defined through subclassing, MeteredConcurrentUsageData also defines a decrementMethodInvocation( ) method and a decrementMethodInvocationData( ) method. The decrementMethodInvocation( ) method is called to decrement the data when a method has completed execution, and calls the internal method decrementMethodInvocationData( ) to perform this operation.

The MeteredUserData class collects data on human users who are associated with a MeteredEntity. Two methods on this class are defined. When the incrementUserAccess( ) method is called, the internal method incrementUserAccessData( ) is invoked to increment the access of the user corresponding to the class of the client method.

The MeteredLocationData class stores a location that is associated with a specified MeteredEntity, and defines three methods: changeLocation( ), storeLocation( ) and storeLocationData( ). The changeLocation( ) method is invoked to change the existing Location associated with a specified metered entity. Two parameters are passed with changeLocation( ) is invoked: the Class name, and the Location object. The Location of the class is then changed to the new location. The storeLocation( ) method assigns a Location object to a particular class name, where the Location and Class are passed as parameters. Both of these methods invoke the storeLocationData( ) internal method to store the Location associated with metered entities.

The last class to discuss in FIG. 15 is the MeteredTimingData class, which stores timing information for Metered Entities as a collection of individual time entries. The methods defined by the MeteredTimingData class include: addTimingEntry( ), addTimingEntryData( ), and getData( ). The addTimingEntry( ) method adds a timing entry for a class and method name passed as parameters by invoking the addTimingEntryData( ) internal method. The getData( ) method returns the collection of time entries for a class passed as an input parameter.

Note that the number of subclasses to MeteredEntityData in the preferred embodiment is the same as the number of metaclasses in the Metering category (FIG. 13), and that each metaclass has a corresponding MeteredEntityData class. This makes sense because metering data must be defined for each type of metering to be performed.

Figure 16A:
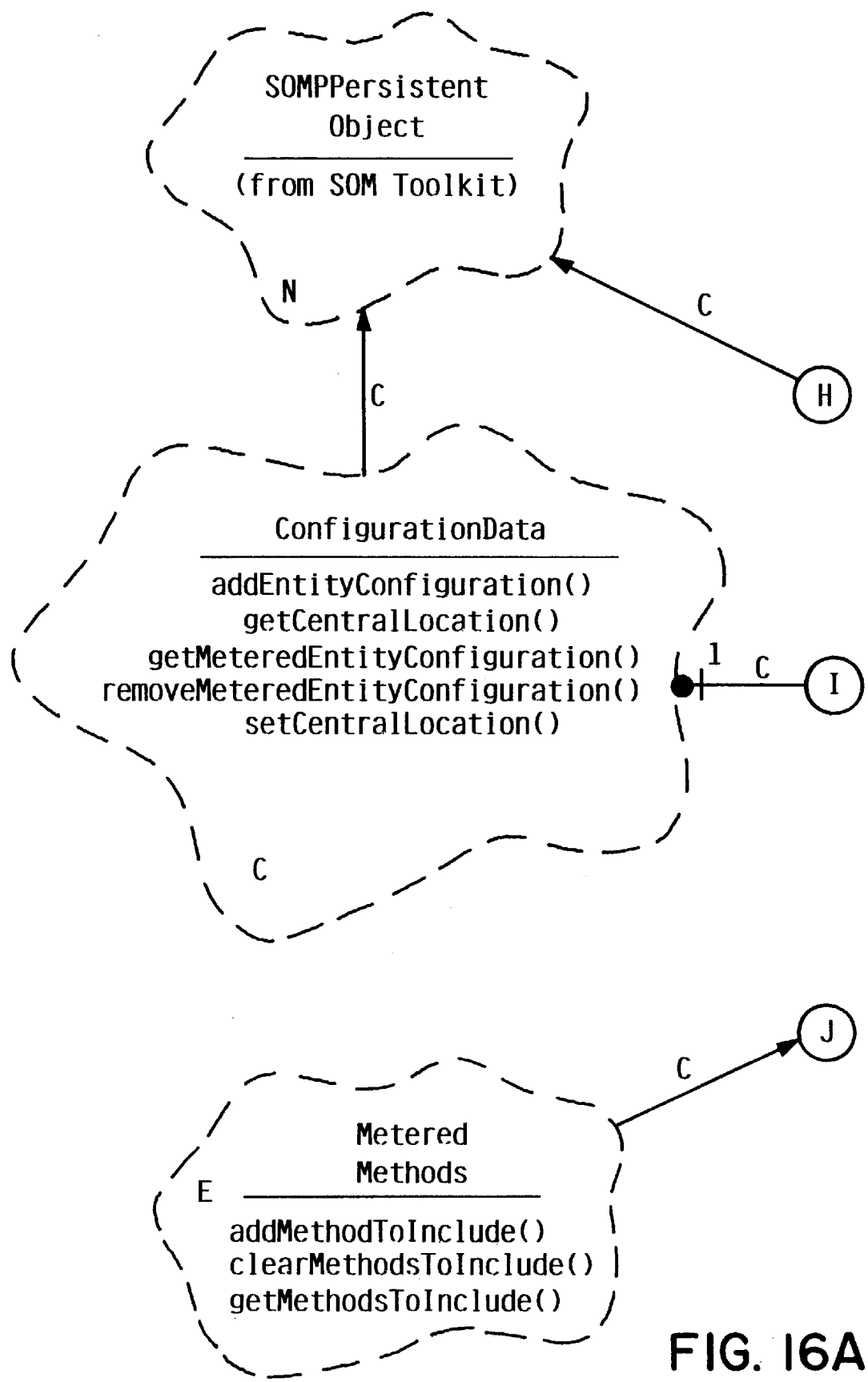
Figure 16B:
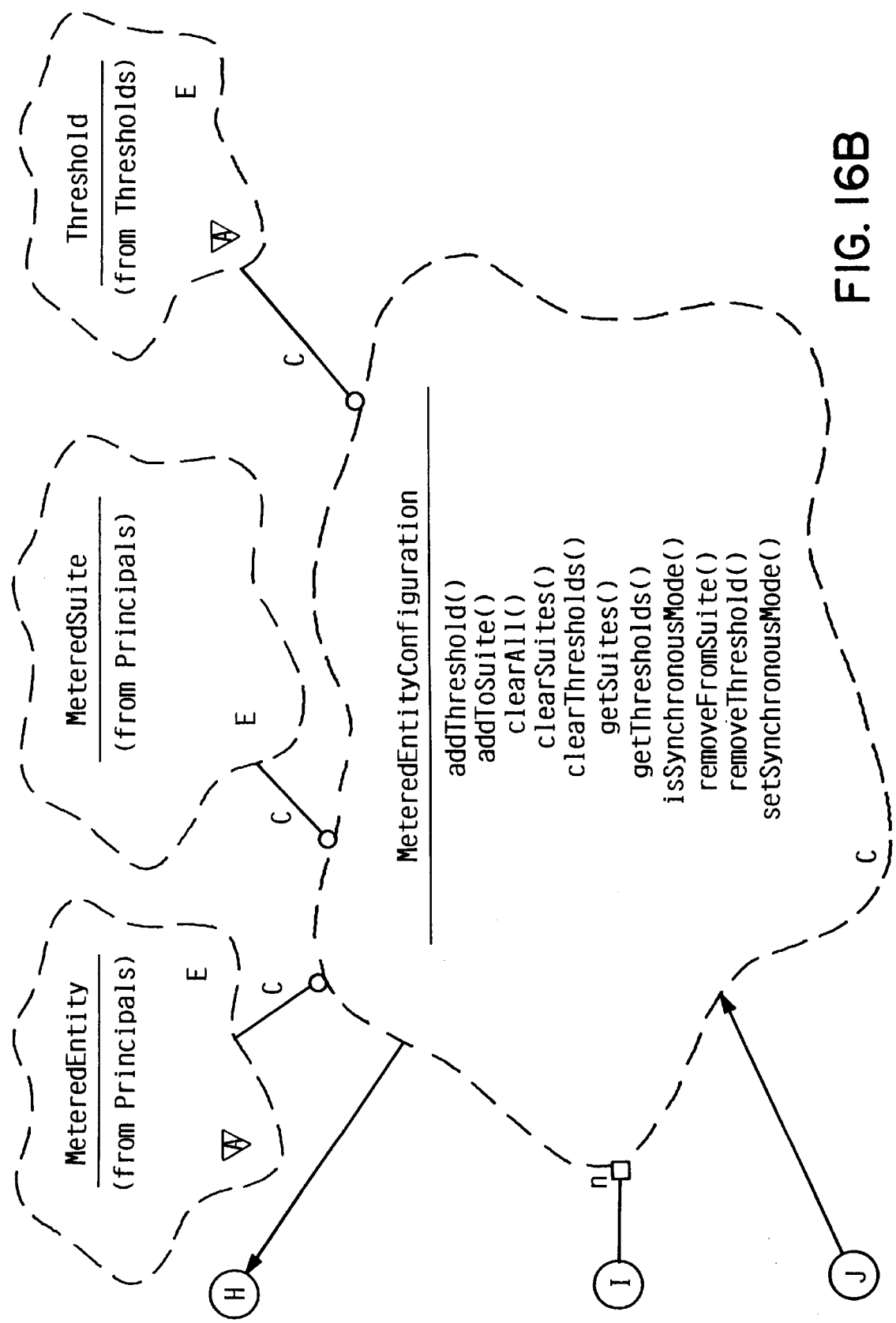

Referring now to FIG. 16, the classes that are members of the Configurations category include a ConfigurationData class, a MeteredEntityConfiguration class, and a MeteredMethods class. The other classes in FIG. 16 come from other categories, as indicated. The ConfigurationData class is a collection of MeteredEntityConfiguration objects for each metered object, as indicated by the "has by reference" relationship with the MeteredEntityConfiguration class. The ConfigurationData class defines several methods, including: addEntityConfiguration( ), getMeteredEntityConfiguration( ), removeMeteredEntityConfiguration( ), getCentralLocation( ), and setCentralLocation( ). The addEntityConfiguration( ) method is used to add a configuration for a new object to be metered. An input parameter defines the name of the metered class. The getMeteredEntityConfiguration( ) method returns the MeteredEntityConfiguration object for a class that is passed as a parameter. The removeMeteredEntityConfiguration( ) method removes configuration information for the class name passed as an input parameter. This method and addEntityConfiguration( ) are complementary methods, with one adding configuration data for a class and the other removing configuration data for a class. The getCentralLocation( ) method returns the location of the node on the network that has the metered data for all metered objects. Knowing the central location of all metered data is necessary in order to synchronously update metered data in the network. The setCentralLocation( ) method takes the node identifier that is passed as a parameter and sets the central location for metered data to that node.

The MeteredEntityConfiguration class defines a configuration object for each object to be metered. Each MeteredEntityConfiguration object contains all configuration data for the corresponding metered object, including whether the object belongs to a suite; any applicable thresholds that are needed to perform certain functions when certain metering conditions occur; and whether or not the object is in synchronous mode. These configuration options are discussed in more detail below.

The first type of configuration data we will consider for the preferred embodiment illustrated in FIG. 16 involves whether or not the object is included in a suite. A suite of objects is defined if the objects are all related in a particular way. One example of a suite is an object-oriented framework mechanism. All the objects in a framework could be listed as members of a suite so that access to one object in the suite is metered as an access to all objects that are members of the suite. Several methods are defined in the preferred embodiment that relate to suites. The first is addToSuite( ), which adds the client object to the suite that is passed as a parameter. Another method is clearSuites( ), which is used to remove all suites from the configuration data for this object. The getSuites( ) method is used to return the collection of all the suites that include the metered object corresponding to the configuration data. And the removeFromSuites( ) method is used to remove the suite that is passed as a parameter from the configuration data.

The second type of configuration data relates to appropriate thresholds that require the framework to take certain action. An example of a suitable threshold relates to the number of concurrent users, and if the number exceeds the threshold (corresponding to the number of concurrent users allowed by the license agreement), the framework takes appropriate actions, such as notifying a user or system administrator that the user limit has been exceeded. Several methods are defined that relate to thresholds. The addThreshold( ) method adds the threshold object that is passed as a parameter to the configuration data. The clearThresholds( ) method is used to remove all thresholds from the configuration data. The getThresholds( ) method returns a collection of threshold objects for the object to be metered that corresponds to this configuration data. And the removeThreshold( ) method is used to remove a threshold that is passed as a parameter from the configuration data.

Another type of configuration data relates to whether or not the metered object corresponding to the MeteredEntityConfiguration object is in synchronous mode or not. If the metered data needs to be collected from one central location, it is in synchronous mode. If the metered data may be collected at various locations and collated later, it is in asynchronous mode. The isSynchronousMode( ) method is used to determine whether the metered data is in synchronous mode or not. If this method returns true, the metered data is in synchronous mode. If false, it is in asynchronous mode. The setSynchronousMode( ) method is used to set the collection mode for this configuration, with a true indicating synchronous and a false asynchronous.

The MeteredEntityConfiguration class also defines a method clearAll( ), which is used to clear all configuration data from the MeteredEntityConfiguration object corresponding to a metered object. Note that the MeteredEntityConfiguration class has a using relationship with the MeteredEntity class, and MeteredSuite class, and the Threshold class, since the methods within MeteredEntityConfiguration may need to call methods on these other classes.

The MeteredMethods class is a subclass of MeteredEntityConfiguration, and corresponds to one suitable SpecificMeteredEntityConfiguration class as shown in FIG. 11. Specifically, MeteredMethods is used to store configuration information for those classes that are being metered at a method level. One example of such a class is Metered Usage. In addition to the methods defined in MeteredEntityConfiguration, MeteredMethods also defines other methods that relate to which methods are being metered. The addMethodToInclude( ) method adds a method that is input as a parameter as a method to meter in this configuration. The clearMethodsToInclude( ) method removes all configuration information for methods to meter. And the getMethodsToInclude( ) method returns a collection of methods that are metered in this configuration.

Figure 17:
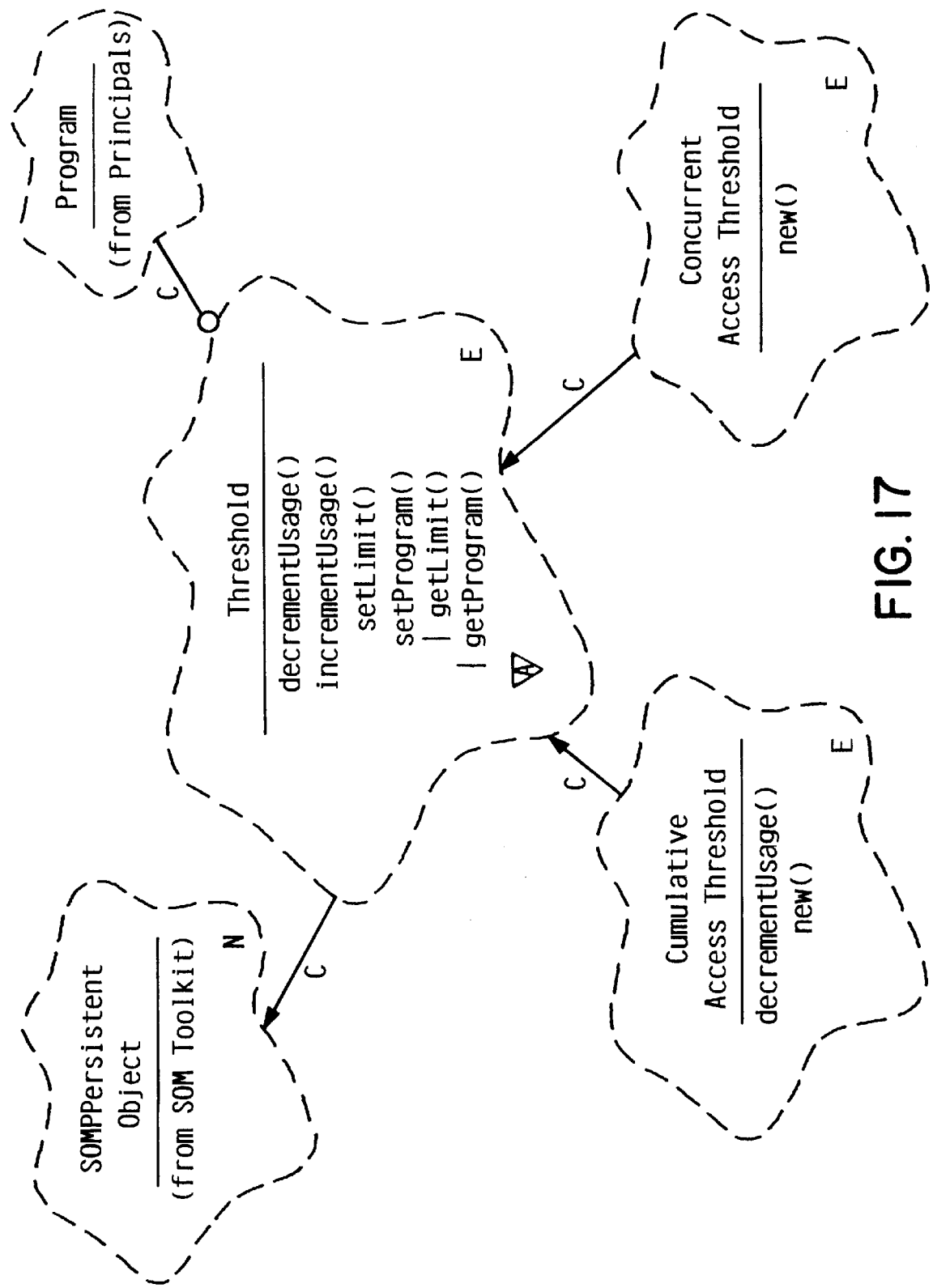

Referring now to FIG. 17, classes that belong to the Thresholds category include a Threshold class, a CumulativeAccessThreshold class, and a ConcurrentAccessThreshold class. Threshold is a subclass of SOMPPersistentObject, and uses the Program class. The Threshold class defines the event to monitor, the applicable limit, and the program to notify if the limit is exceeded. The Threshold class provides methods that relate to the functions listed above. For example, the decrementUsage( ) method decrements the current limit setting by one, while the incrementUsage( ) method increments the current limit setting by one. The getLimit( ) internal method returns the current limit associated with this threshold. The getProgram( ) internal method returns the Program Principal associated with this threshold which is expected to run when the limit is exceeded for this threshold. The setLimit( ) method sets the threshold limit for this threshold. And the setProgram( ) method sets the program to call to the program passed as a parameter if the limit is exceeded.

The CumulativeAccessThreshold class and the ConcurrentAccessThreshold class are subclasses of the Threshold class, and define additional methods needed for their specific functions. For example, the CumulativeAccessThreshold class, which sets a threshold for total cumulative accesses, includes a decrementUsage( ) method and a new( ) method. Since the cumulative access threshold for a class will increase over time, the decrementUsage( ) method in this subclass is overridden to do nothing so that the incrementUsage( ) method adds to the limit but the decrementUsage( ) method does not perform the typical decrementing, resulting in a cumulative access threshold value. The new( ) method returns a new CumulativeAccessThreshold object that is instantiated when new( ) is invoked. In similar fashion, the new( ) method on the ConcurrentAccessThreshold class returns a new ConcurrentAccessThreshold object that is instantiated when new( ) is invoked. In this manner thresholds may be defined as needed.

Core Functions

FIG. 11 best distinguishes between core and extensible functions in the object metering framework of the present invention. Specifically, as noted above, the MeteredData class, the ConfigurationData class, and the MeteredEntityConfiguration class are core classes, while the remaining classes are extensible. All class relationships shown in FIG. 11 are core relationships, and may not be modified by the user of the framework. In fact, it is the fixed character of these relationships between classes that characterizes a framework and makes it useful and powerful. The core function of the object metering framework is defined by the core classes, the core class relationships, and the functional requirements that cause the framework to behave in the desired manner. As described above with respect to FIG. 9, the overall core function of the object metering framework includes the steps of method 900. The specific steps that make up any metering environment depend on how the user of the framework extends the classes and defines (or overrides) the appropriate methods.

Examples of Extending the Object Metering Framework

Figure 18A:
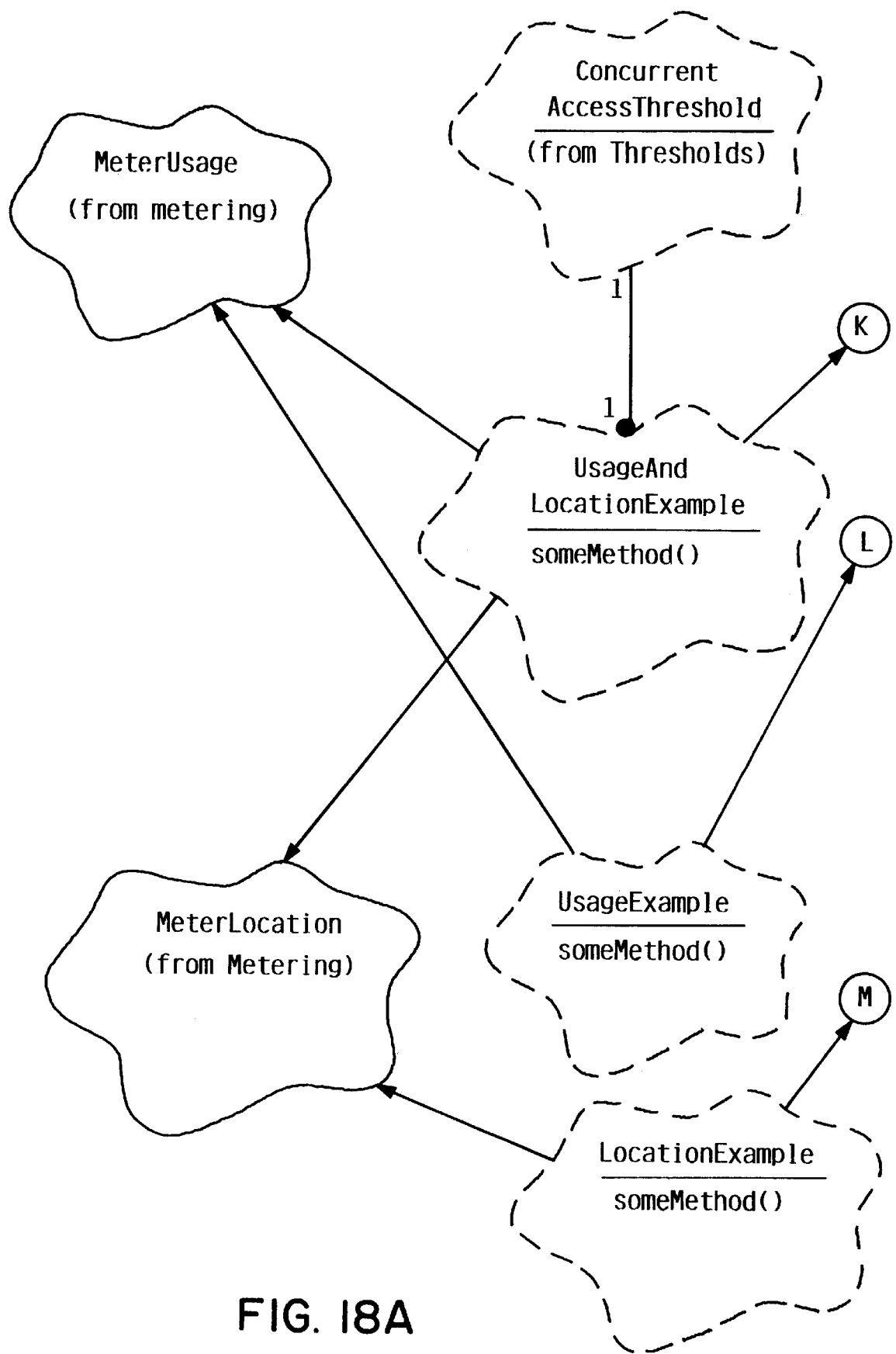
FIG. 18 is a class diagram showing examples of extending the framework of FIGS. 10–17 to implement four specific metering functions.
Figure 18B:
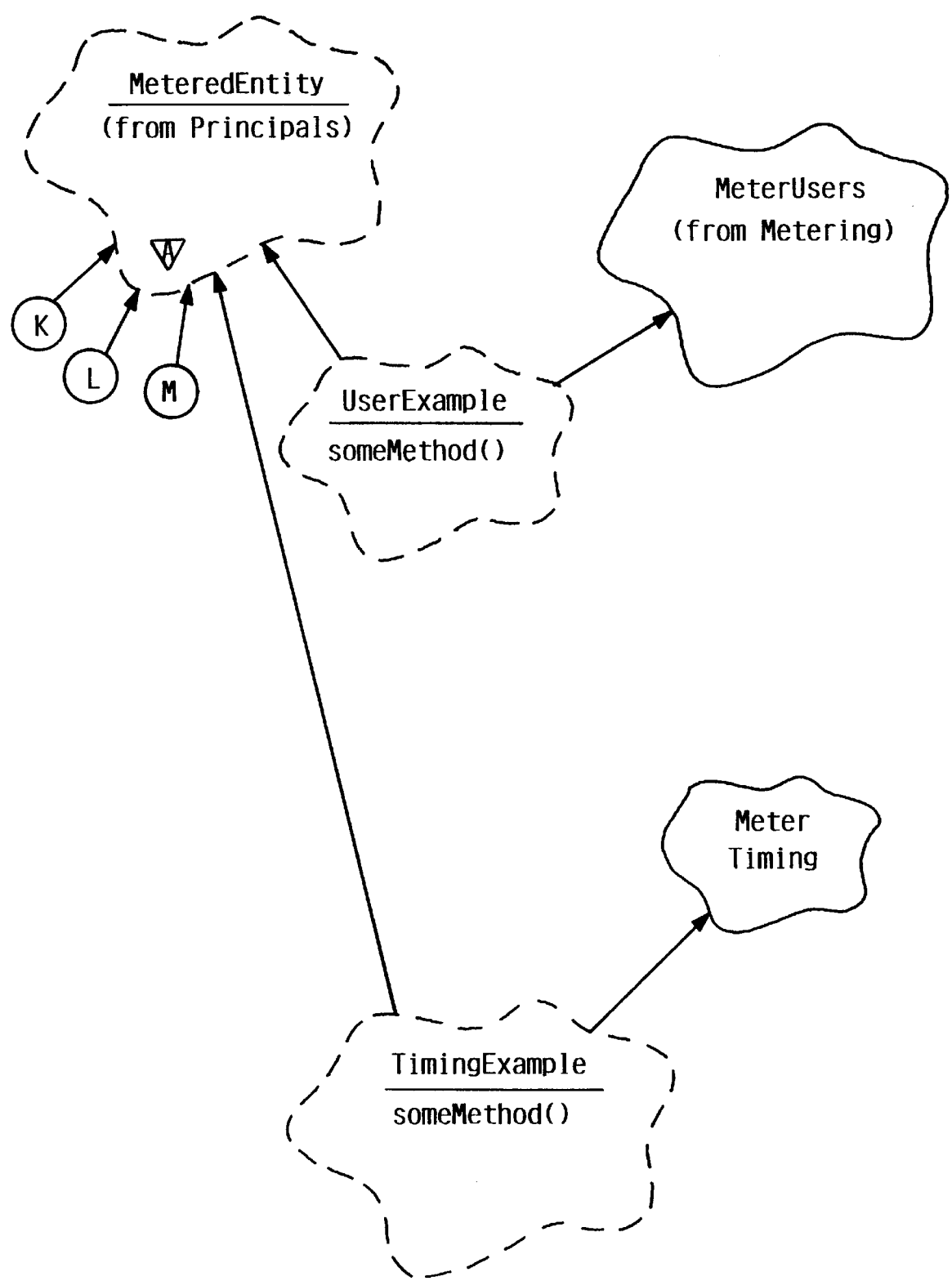

To understand how a programmer may use the object metering framework of the invention, several examples are described below. FIG. 11 illustrates how a programmer may subclass an Object to be Metered from the MeteredEntity class and assign it to an appropriate BeforeAfter metaclass to perform desired metering functions. For the preferred embodiment, specific examples of appropriate subclassing and assignments to metaclasses are shown in FIG. 18. If a programmer wants to meter Users of metered objects, a UserExample class could be subclassed from the MeteredEntity class and its metaclass is the MeterUsers metaclass. If the programmer wants to meter the time it takes to executed metered methods, a TimingExample class could be subclassed from the MeteredEntity class and its metaclass is the MeterTiming metaclass. If the programmer wants to meter the location where metered objects are stored, a LocationExample class could be subclassed from the MeteredEntity class and its metaclass is the MeterLocation metaclass. If the programmer wants to meter the usage of objects, a UsageExample class could be subclassed from the MeteredEntity class and its metaclass is the MeterUsage metaclass. In addition, if more complex metering is desired that will meter both usage and location of metered objects, the programmer could define a UsageAndLocationExample class as a subclass of the MeteredEntity class, and its metaclasses are the MeterUsage metaclass and the MeterLocation metaclass. From the examples above, we see that if a programmer wants to meter a particular attribute, he must define a suitable metaclass in the Metering category, then must subclass the metered object from the MeteredEntity class and select the corresponding metaclass. The operation of the object metering framework for the examples of FIG. 18 is discussed below with reference to the object diagrams of FIGS. 19–24.

Object Interaction

Figure 19A:
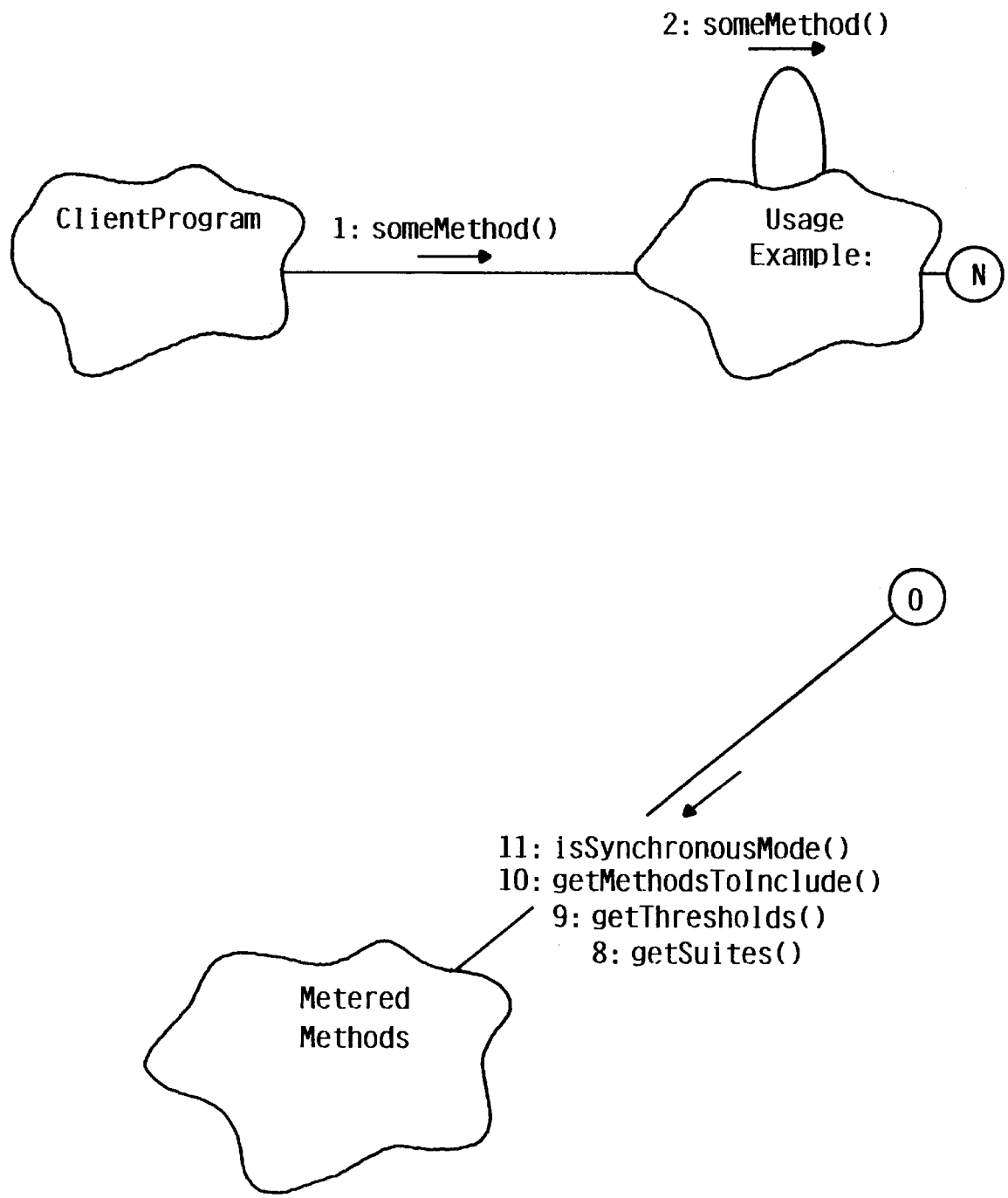
FIGS. 19–24 are object diagrams of the metering examples of FIG. 18.
Figure 19B:
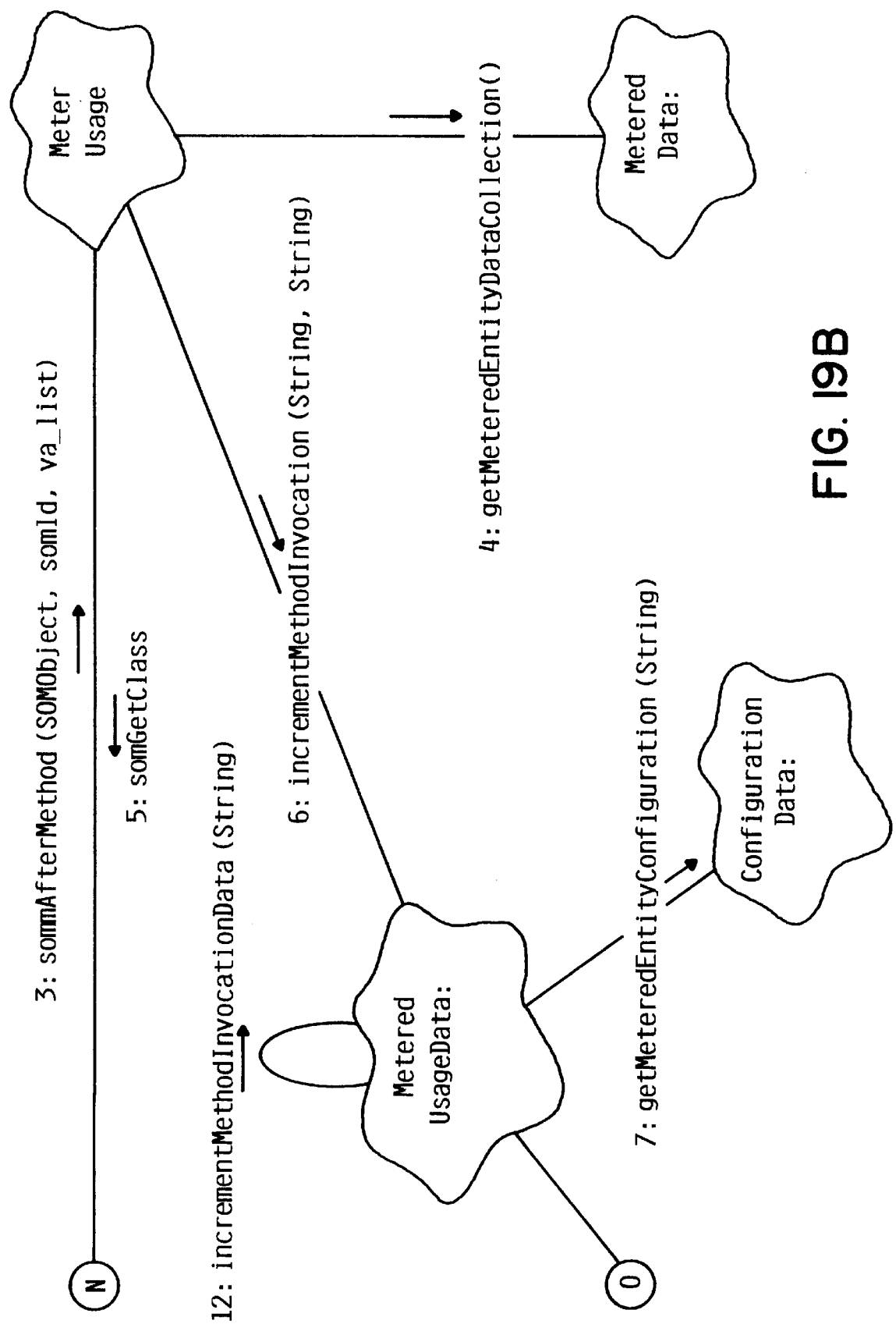

An object diagram for the UsageExample in FIG. 18 is shown in FIG. 19. A ClientProgram object invokes the object metering framework by invoking a someMethod( ) (step 1) on UsageExample, which is a metered object. This method is executed (step 2). Following the execution of the method, or in parallel to it, the metering functions are performed, which are included in steps 3–12. The sommAfterMethod( ) on a MeterUsage object is invoked (step 3) to kick off all the functions that must be performed after the method is executed (in step 2) to perform the desired usage metering. The MeterUsage object invokes the getMeteredEntityCollection( ) method on the MeteredData object (step 4), which returns the collection of objects that correspond to Metered Entities (in this case, metered objects and/or methods). Once the MeterUsage object has the collection of Metered Entities, it invokes the somGetClassName( ) method on the UsageExample object (step 5), which returns the name of the class on which the client method was invoked in step 1. Next, the incrementMethodInvocation( ) method is invoked (step 6), with the class name and method name of the method invoked in step 1 passed as parameters. In order to know how to increment the method invocation, the configuration must first be determined by invoking the getMeteredEntityConfiguration( ) method (step 7), passing the name of the class for which the metered entity configuration is desired. This method identifies the MeteredMethods as the applicable configuration class. Next, the MeteredUsageData object invokes the getSuites( ) method (step 8), the getThresholds( ) method (step 9), the getMethodsToInclude( ) method (step 10), and the isSynchronousMode( ) method (step 11) on the MeteredMethods object to determine the configuration that pertains to the method invoked in step 1. Once the configuration is known, MeteredUsageData invokes its own incrementMethodInvocationData( ) method to appropriately increment the method invocation data. For example, if the UsageExample object is part of a suite, this method would increment the method invocation data for all objects in the suite, not just for the object that contains the client method called in step 1.

Figure 20A:
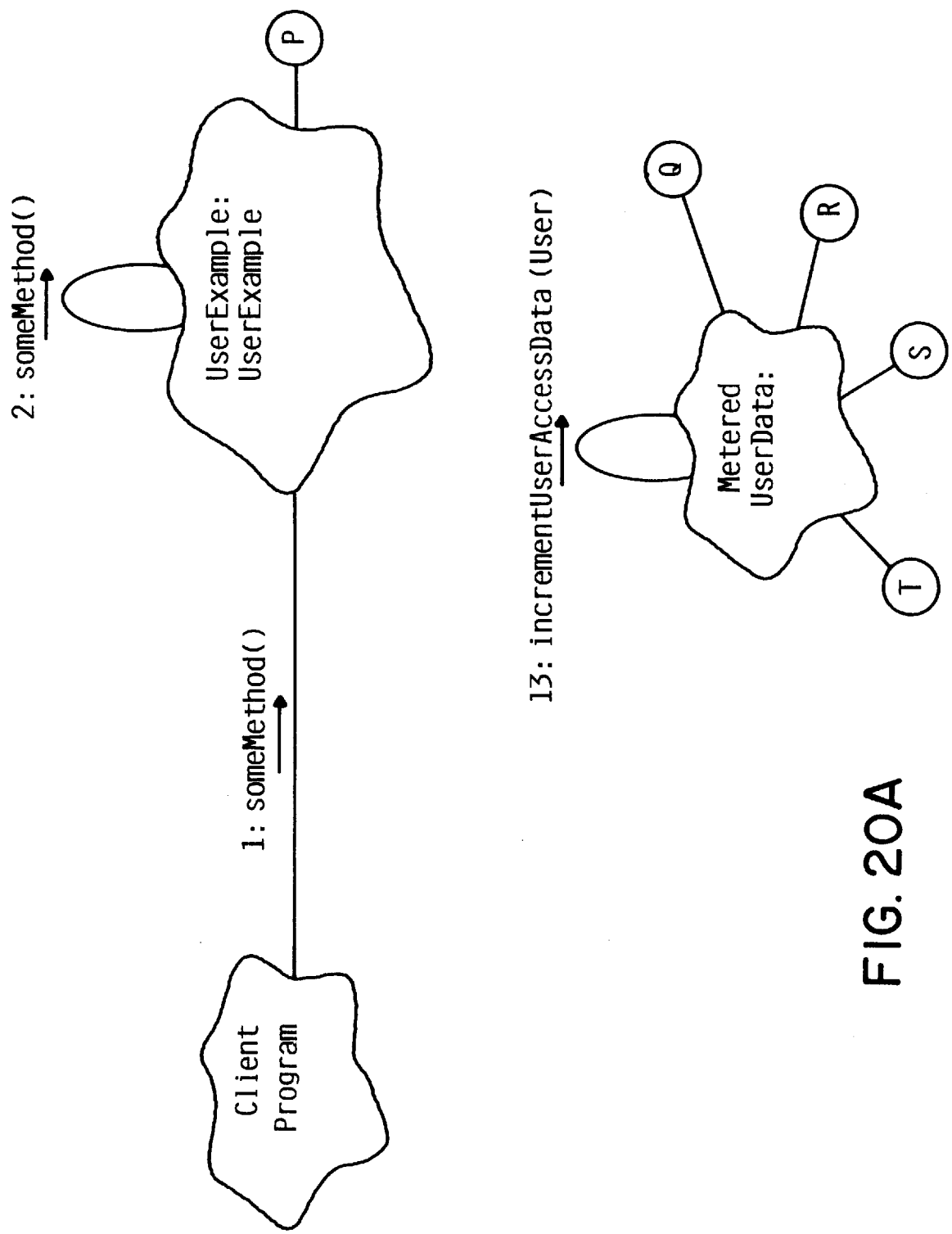
Figure 20B:
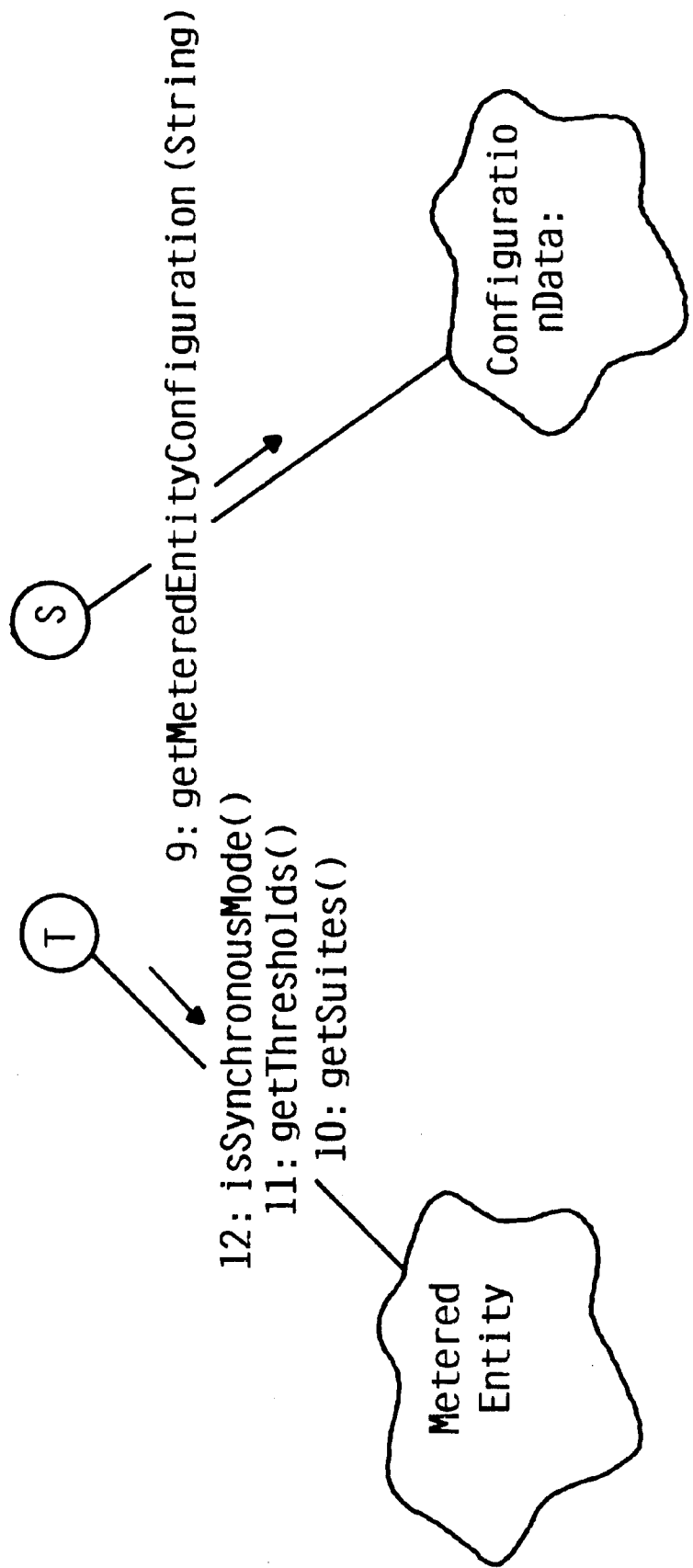
Figure 20C:
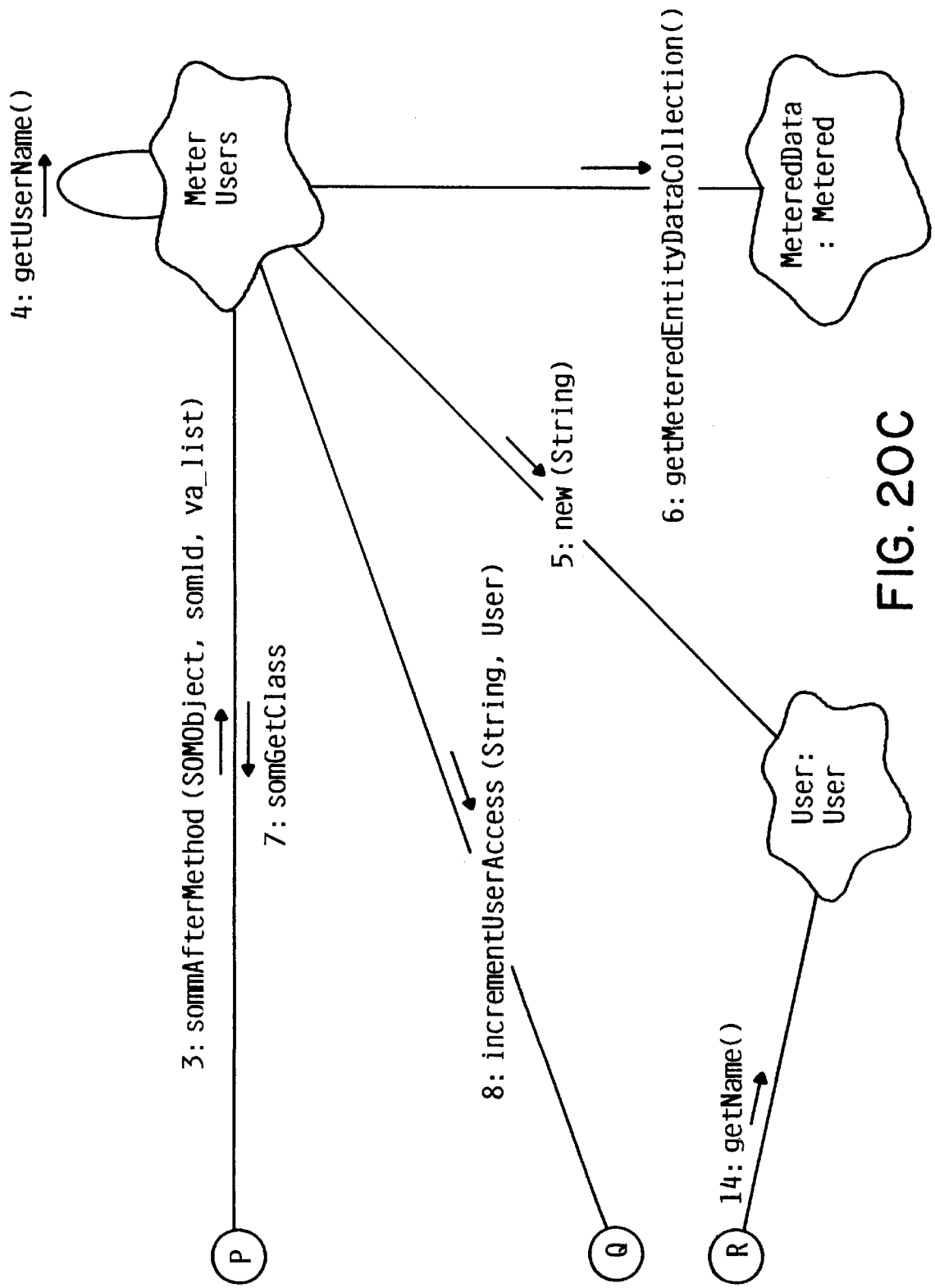

FIG. 20 shows the object diagram for the UserExample of FIG. 18. Again, the framework is invoked by a ClientProgram calling someMethod( ) (step 1), which is a method on UserExample, which is an object that has been selected for metering by appropriate subclassing. The UserExample object invokes the someMethod( ) method, which executes the method requested by the client program. Either after someMethod( ) executes (in single threaded systems), or in parallel (in multi-threaded systems), the framework may perform the metering functions represented by steps 3–14. UserExample invokes the sommAfterMethod( ) on the MeterUsers object (step 3) to commence the metering function. The MeterUsers object then invokes its own getUserName( ) method, which returns the name of the human user that invoked someMethod( ) in step 1. A User object for this user is then created by invoking the new( ) constructor method (step 5). Next, invoking the getMeteredEntityDataCollection( ) method on the MeteredData object returns the collection of metered entity data (step 6). MeterUsers then invokes the somGetClassName( ) method on the UserExample object (step 7), which returns the name of the class on which the client method was invoked in step 1. Next, the incrementUserAccess( ) method is invoked (step 8) to instruct the MeteredUserData object that it needs to update its count of how many times the user has accessed the method. The class pertaining to the method (from step 7) and the User are passed as parameters. But before the MeteredUserData can update the configuration data to reflect the new access to the method, it must first determine which configuration data pertains to the invoked method in step 1 by invoking the getMeteredEntityCollection( ) method on the ConfigurationData object (step 9). This method returns the object MeteredEntityConfiguration that corresponds to the client method called in step 1. The MeteredUserData object then determines the configuration by invoking the getSuites method (step 10), the getThresholds( ) method (step 11), and the isSynchronousMode( ) method (step 12) on the MeteredEntityConfiguration object, and appropriately increments the user access count by invoking its own incrementUserAccessData( ) method (step 13).

Figure 21A:
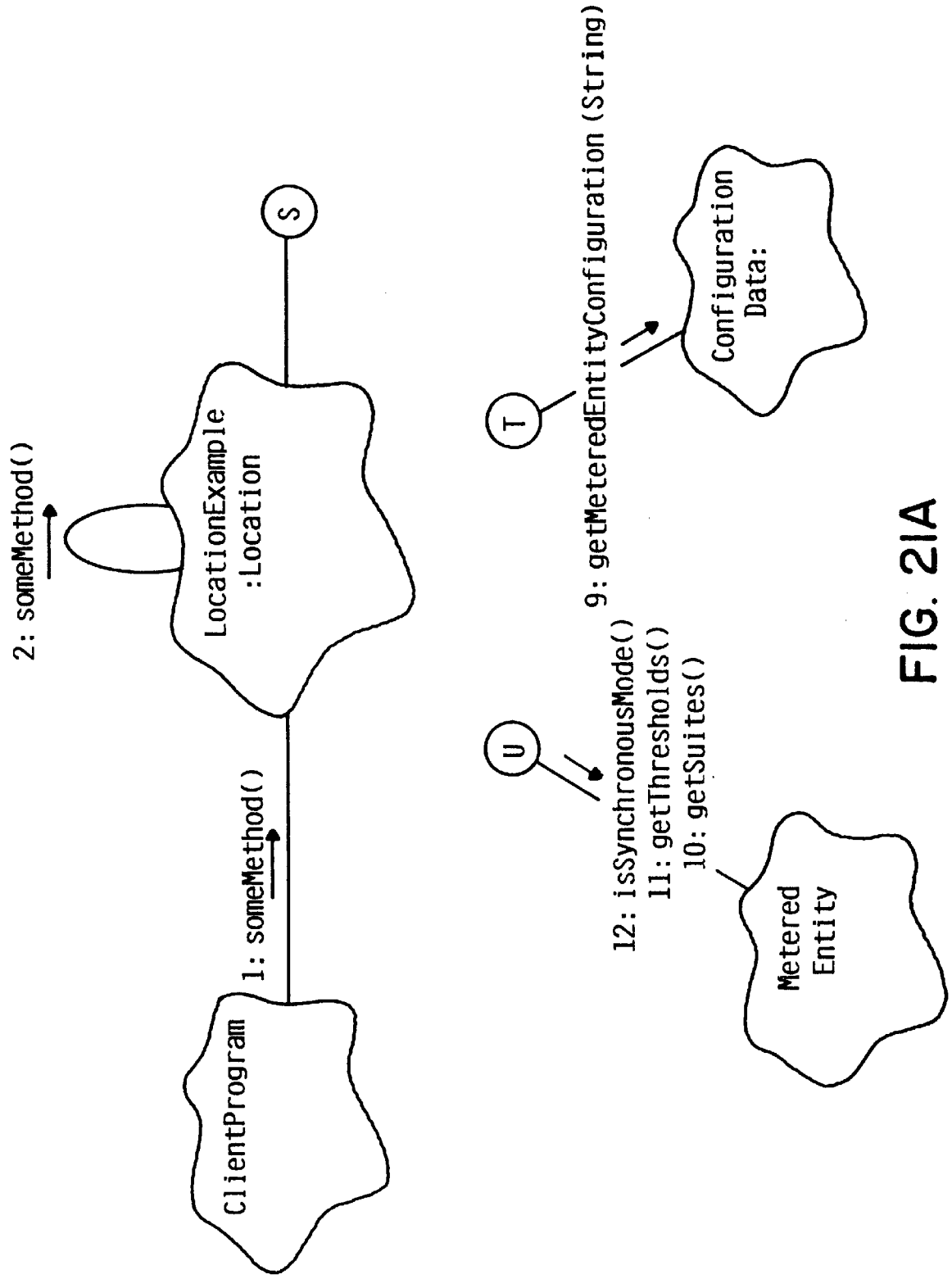
Figure 21B:
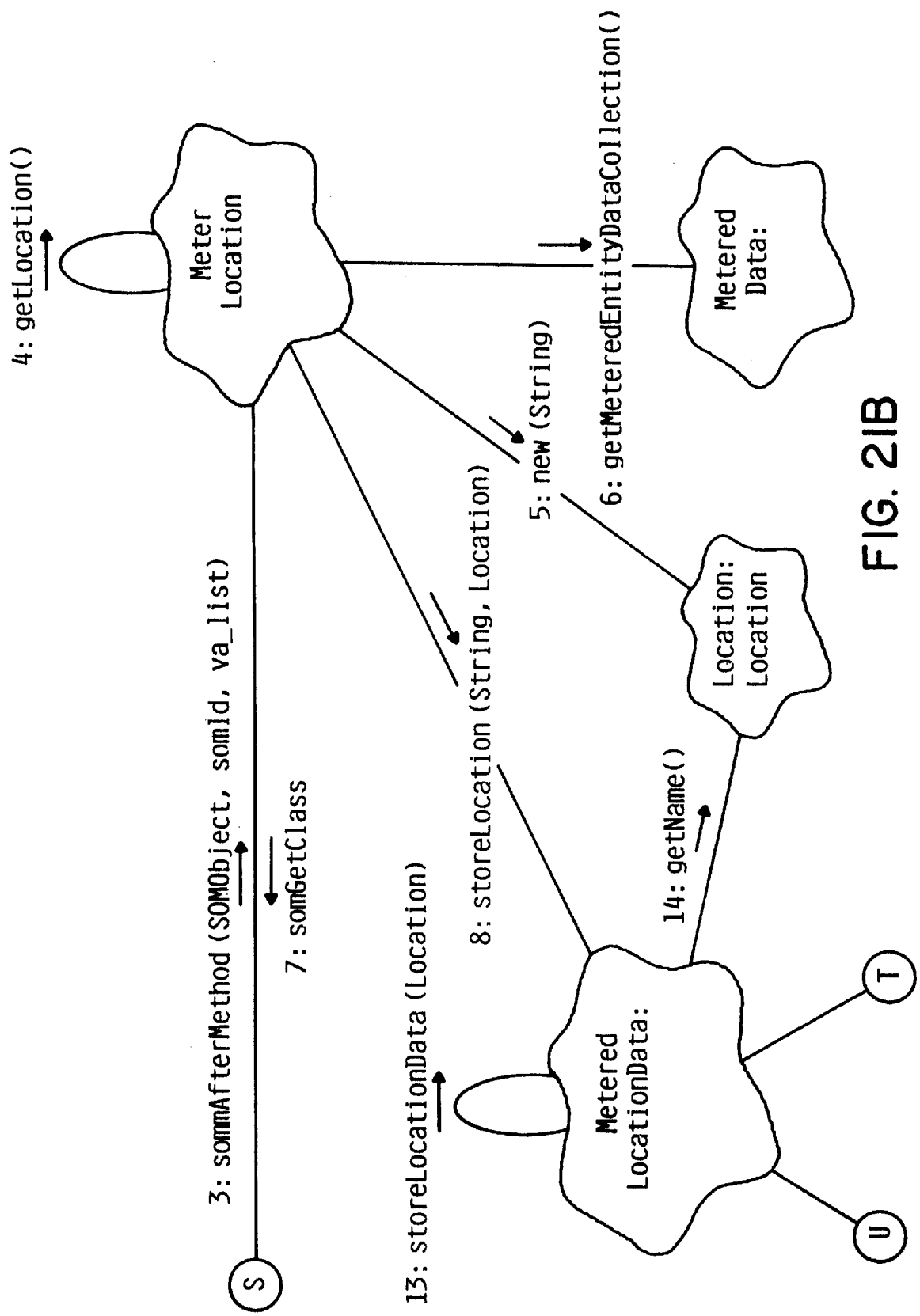

In reviewing the object diagrams of FIGS. 19 and 20, it seems that a pattern is developing in how the framework performs the needed metering in different metering environments. The object diagram of FIG. 21 shows the object interaction for the LocationExample in FIG. 18. Again, the framework is invoked by a ClientProgram invoking someMethod( ) (step 1) on LocationExample, which executes that method (step 2). Step 3 commences the metering function, step 4 determines the location of the LocationExample (the metered object), and step 5 creates a new Location object. Step 6 gets the data collection for all the metered entities, and step 7 gets the class name that the LocationExample was instantiated under. Step 8 passes the class name from step 7 and the Location to tell MeteredLocationData where to store the data. Step 9 returns the MeteredEntityConfiguration object that pertains to the method invoked in step 1, and MeteredLocationData then determines the configuration by performing steps 10–12. The MeteredLocationData is then updated in step 13, and step 14 gets the name of the Location object.

Figure 22B:
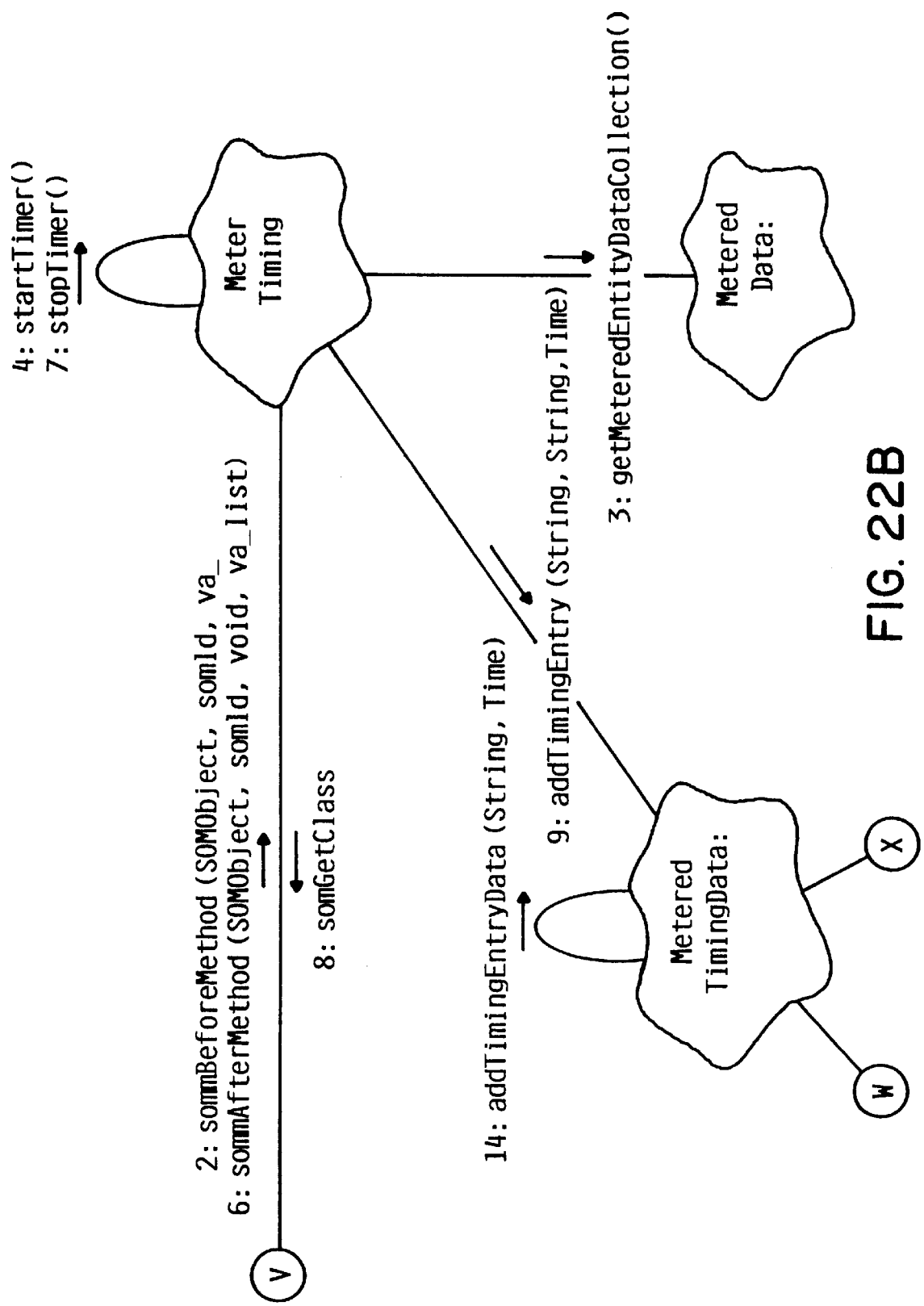

An object diagram for the TimingExample of FIG. 18 is shown in FIG. 22. Here, the object interaction is somewhat different than those examples previously discussed because the framework must start a timer before allowing the method to execute, and must stop the timer after the method executes. A ClientProgram invokes someMethod( ) in step 1. Step 2 invokes the sommBeforeMethod( ) method on the MeterTiming object, which causes it to invoke the getMeteredEntityDataCollection( ) in step 3, which returns the collection of metered entity data. Next, MeterTiming invokes startTimer( ) in step 4, and TimingExample then performs step 5 which executes the method invoked in step 1. After the method has executed, the sommAfterMethod( ) method is invoked in step 6, resulting in invoking the stopTimer( ) method in step 7. The class of the TimingExample object is then discovered in step 8 using the somGetClassName( ) method. In step 9, the time for executing someMethod( ) in step 5 is added to MeteredTimingData by invoking the addTimingEntry( ) method and passing the class discovered in step 8, and method invoked in step 1, and the time stored in MeterTiming as parameters. MeteredTimingData must first determine which MeteredEntityConfiguration applies to the method invoked in step 1 by performing step 10. MeteredTimingData then performs steps 11–13 on MeteredEntityConfiguration, and performs step 14 to appropriately add the timing entry.

Figure 23A:
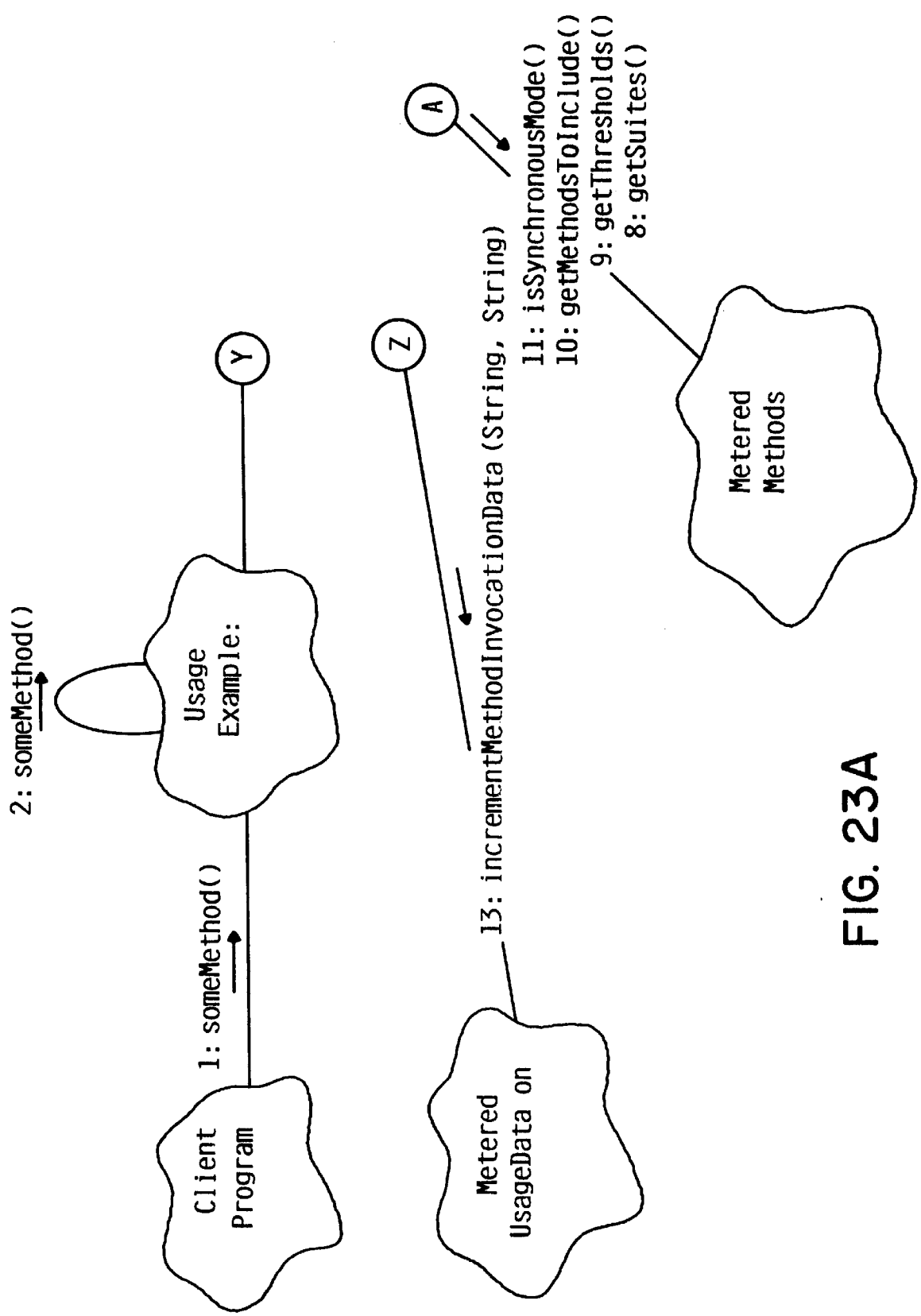
Figure 23B:
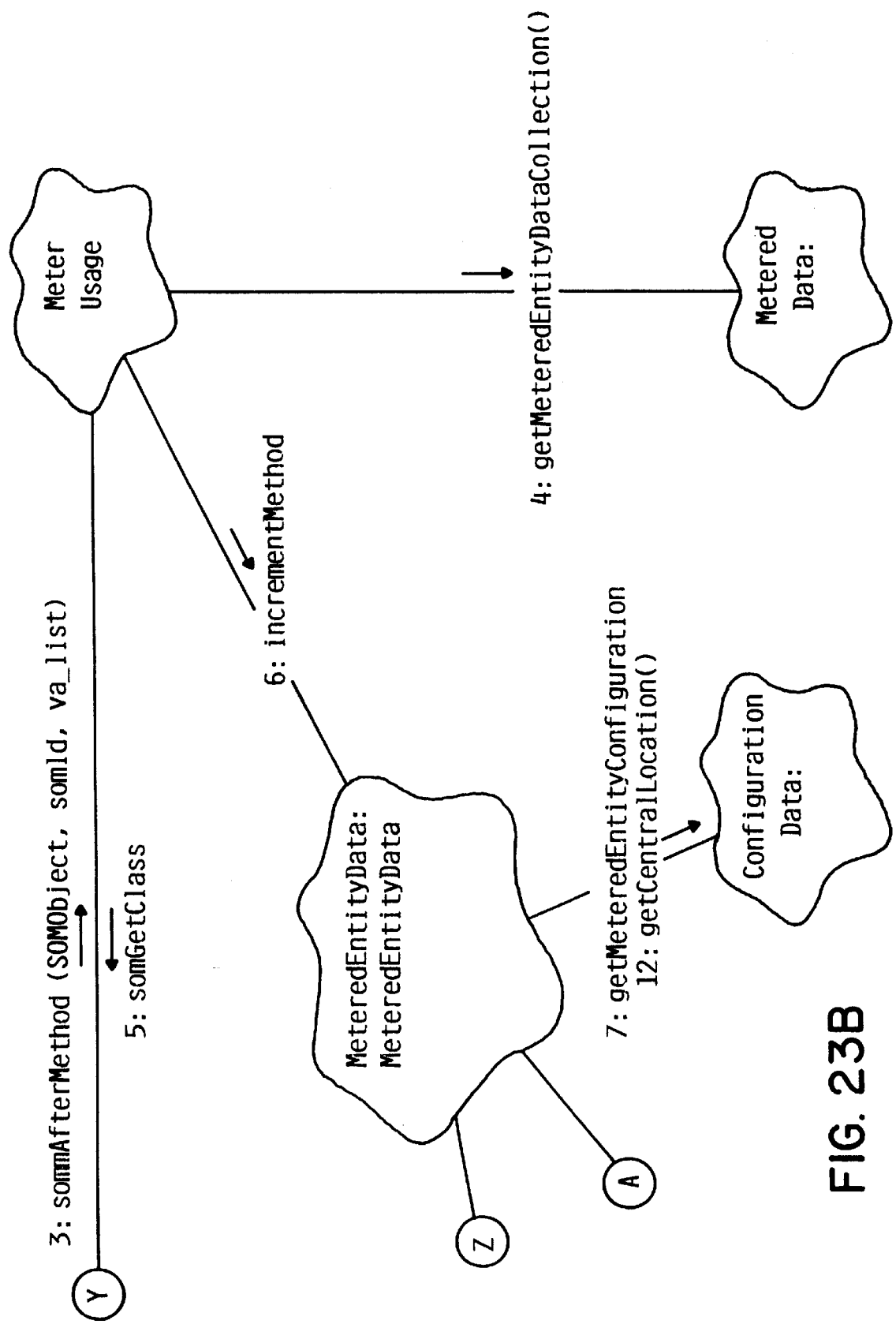
Figure 24A:
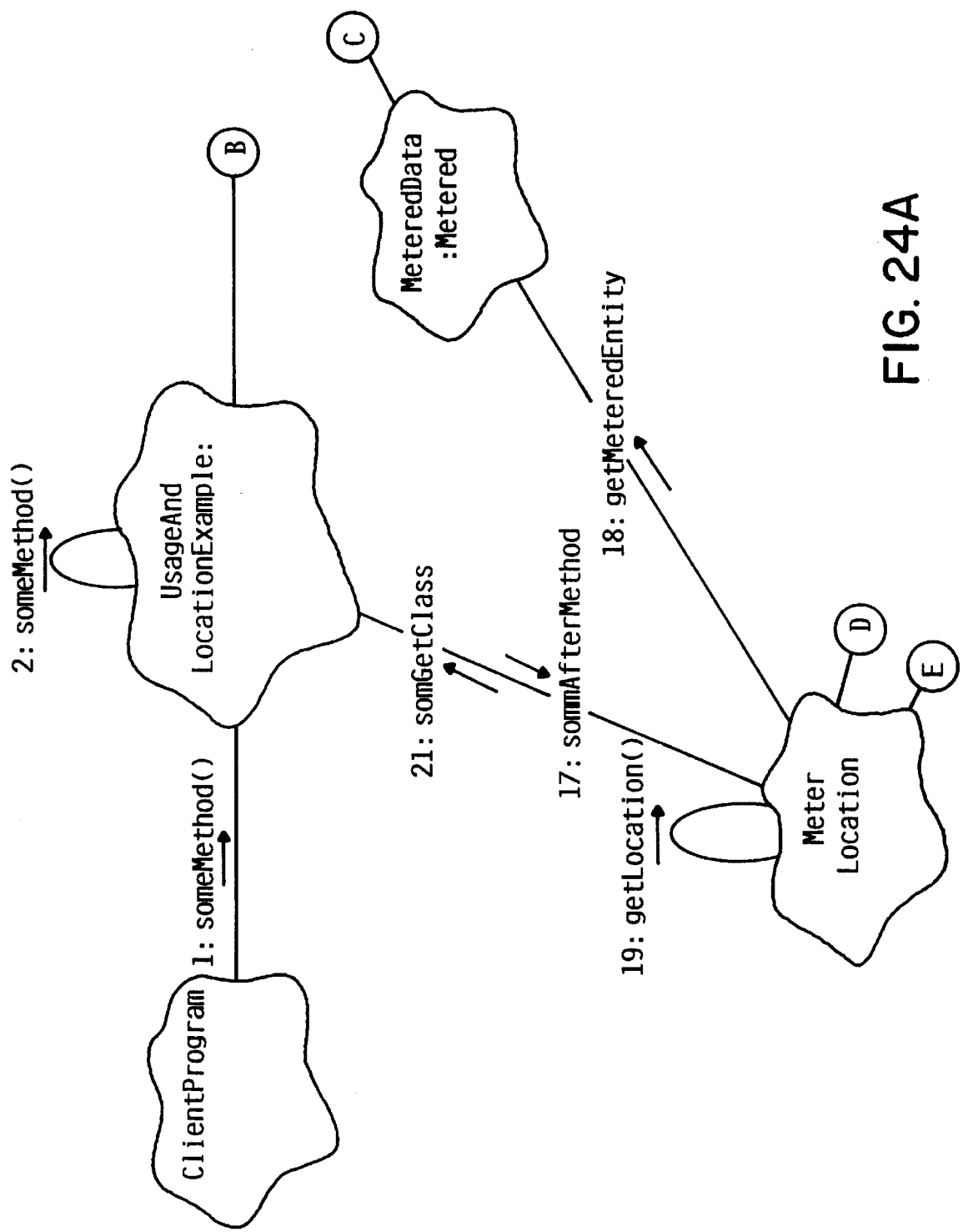
Figure 24B:
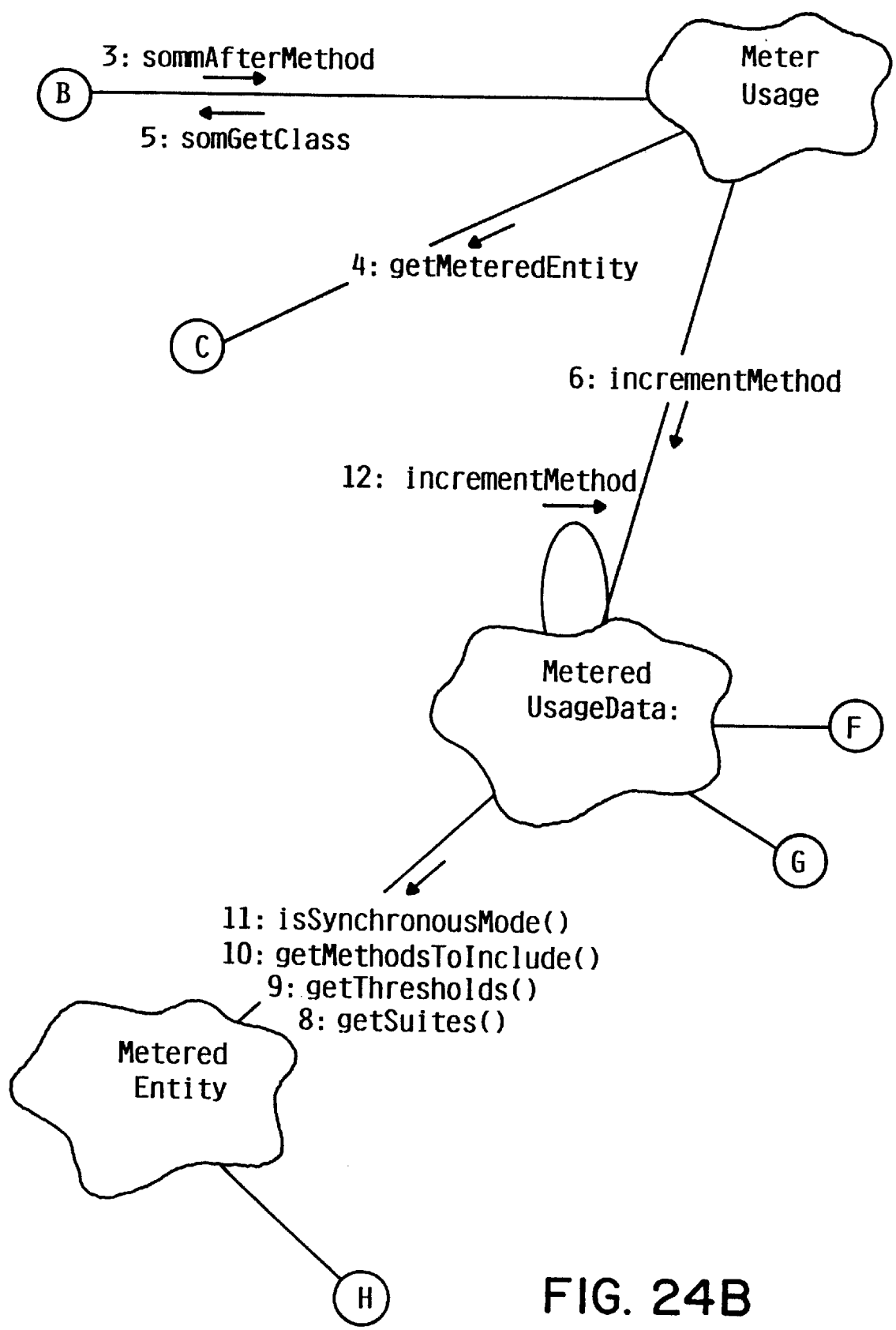
Figure 24C:
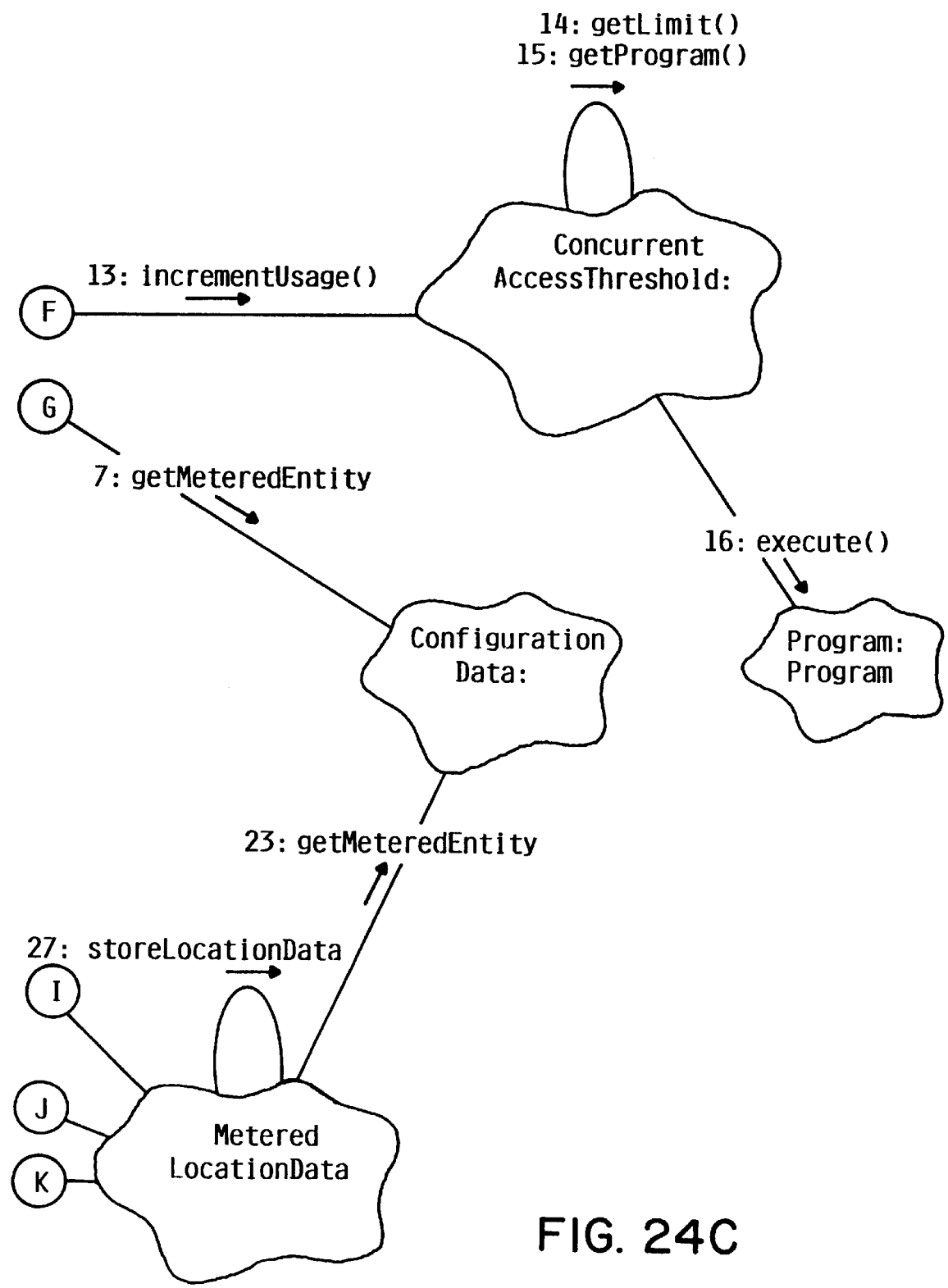
Figure 24D:
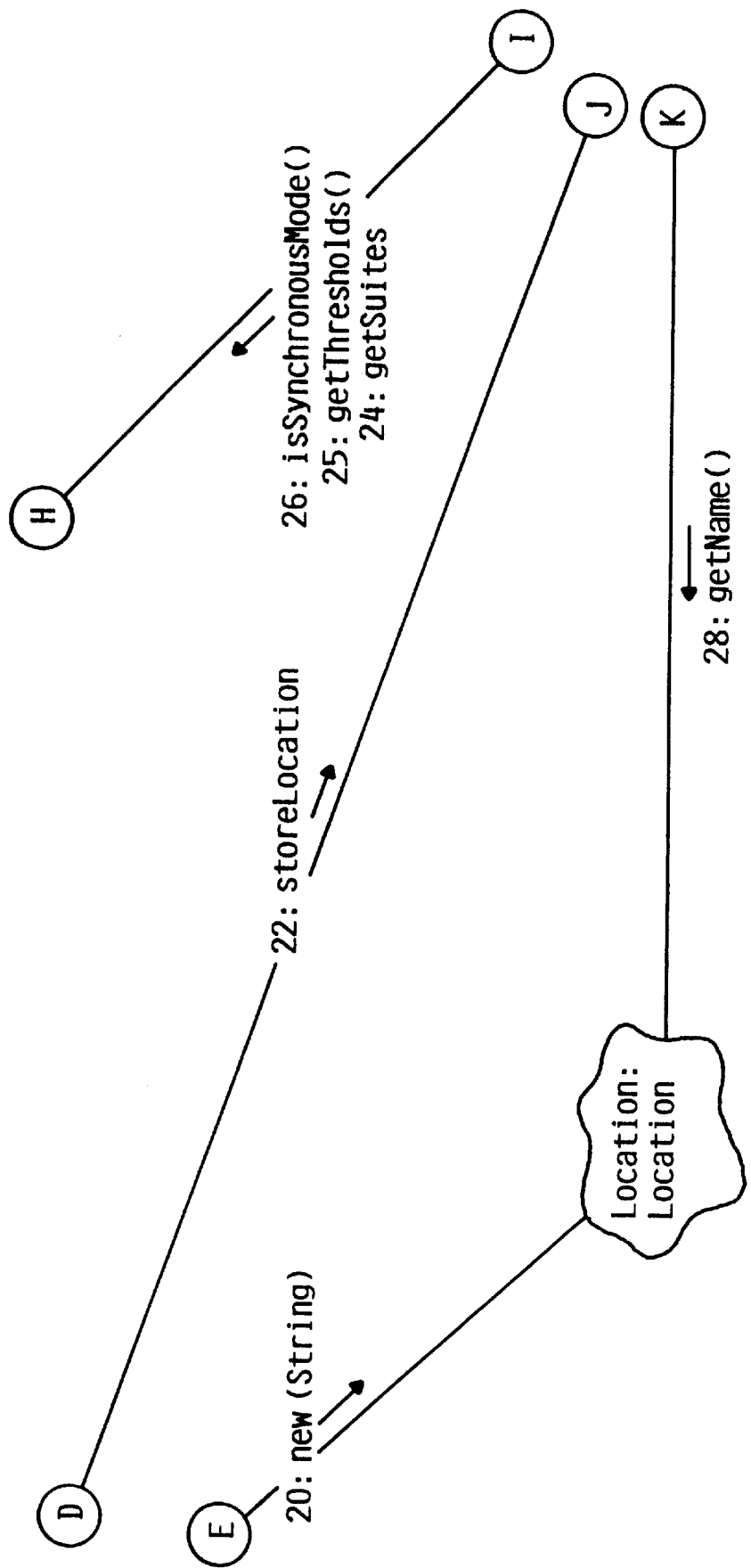

An object diagram for the UsageExample of FIG. 18 is shown in FIG. 23. A ClientProgram invokes someMethod( ) in step 1, which is executed in step 2. Step 3 kicks off the metering function of the framework. Step 4 returns the collection of MeteredEntityData. Step 5 returns the class that UsageExample belongs to. Step 6 instructs MeteredEntityData to increment the method invocation for the method called in step 1, but MeteredEntityData must first determine in step 7 which MeteredMethods object applies to the client method invoked in step 1. This method returns the MeteredMethods object in FIG. 23. MeteredEntityData then determines the configuration in steps 8–11. We assume here that isSynchronousMode( ) in step 11 returned true, which requires that MeteredEntityData determine the central location in step 12, and change the MeteredUsageData at the central location (i.e., MeteredUsageData on Central) in step 13.

An object diagram corresponding to the UsageAndLocationExample of FIG. 18 is shown in FIG. 24. This object diagram traces through all steps (1–27) for metering both Usage and Location at the same time. The details of each step will be evident from a close examination of the object diagrams pertaining to the UsageExample (FIG. 19) and the LocationExample (FIG. 21). The object diagram of FIG. 24 illustrates that the framework may be used to monitor multiple features at once.

As the preferred embodiment illustrates, the framework provides an extremely flexible and powerful tool for implementing many different object metering environments by simply defining objects that implement the features specific to a particular metering environment. While the preferred embodiment is described in relation to FIGS. 12–17, with specific subclassing provided, the framework in its broadest sense is represented in FIG. 11. It should also be noted that not all of the features in FIG. 11 are strictly required, depending on the type and sophistication of the metering that is desired. For example, if the metering is for the purpose of simply logging and reporting usage of objects in a computer program, the framework of FIG. 11 with the Thresholds classes deleted would adequately perform the job. Many modifications to the object metering framework of the invention are possible and are anticipated within the scope of the invention.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr.

Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labeled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 3.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams convey the same information from that conveyed by object diagrams, but simply present the same information in a different format. The present specification makes use of object diagrams, and those skilled in the art will recognize that object diagrams and interaction diagrams are equivalent and also will understand how to convert from one to the other without further explanation.

In FIG. 7, for example, the object called Zelda 705 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

We claim:

1. A computer system, the computer system metering at least one metered object in a computer program executing on the computer system, the computer system comprising:

a central processing unit; and a main memory coupled to the central processing unit, the main memory containing an object-oriented framework mechanism that provides at least one object metering environment for metering the number of times the at least one metered object is accessed, the framework mechanism executing on the central processing unit.

2. The computer system of claim 1 wherein the computer system includes multiple threads of control, and wherein one thread of control performs the metered client method and another thread of control performs the metering of the at least one object.

3. The computer system of claim 1 wherein the framework mechanism comprises at least one before after metaclass, the before after metaclass defining:
   a first set of object methods to perform a plurality of predetermined functions to implement the object metering environment.

4. The computer system of claim 3 wherein the first set of object methods includes at least one before object method that is executed before the execution of a metered client method.

5. The computer system of claim 3 wherein the first set of object methods includes at least one after object method that is executed after the execution of the metered client method is commenced.

6. The computer system of claim 3 wherein the before after metaclass is an extensible class of the framework mechanism that is defined by the framework mechanism to implement the at least one object metering environment.

7. The computer system of claim 3 wherein a meter usage metaclass, a meter concurrent usage metaclass, a meter users metaclass, a meter location metaclass, and a meter timing metaclass are all subclasses of the before after metaclass.

8. The computer system of claim 1 wherein the framework mechanism comprises a metered entity configuration class, the metered entity configuration class defining:
   at least one metered entity configuration object containing configuration data for at least one metered entity; and
   a second set of object methods to determine the configuration data for the at least one metered entity.

9. The computer system of claim 8 wherein the metered entity configuration class is a core class of the framework mechanism.

10. The computer system of claim 1 wherein the framework mechanism comprises a metered entity class and a metered suite class,
the metered entity class defining:
   at least one metered entity object corresponding to a parameter to be metered;
the metered suite class defining:
   at least one metered suite object containing at least one metered entity object; and
   a third set of object methods to determine which of the metered entity objects are contained in the metered suite object.

11. The computer system of claim 10 wherein the metered entity class and the metered suite class are extensible classes of the framework mechanism.

12. The computer system of claim 1 wherein the framework mechanism comprises a metered entity configuration class, a configuration data class, and a metered data class, the metered entity configuration class defining:
   at least one metered entity configuration object containing configuration data for at least one metered entity; and
   a second set of object methods to determine the configuration data for the at least one metered entity;
the configuration data class defining:
   at least one configuration data object identifying the plurality of metered entity configuration objects; and
   a fourth set of object methods to determine the configuration for the at least one metered entity;
the metered data class defining:
   at least one metered data object containing a plurality of metered entity data objects;
   a fifth set of object methods to determine the metered data for the plurality of metered entity data objects.

13. The computer system of claim 12 wherein the metered entity configuration class, the configuration data class, and the metered data class are core classes of the framework mechanism that are defined by the framework mechanism to implement the at least one object metering environment.

14. The computer system of claim 1 wherein the framework mechanism further comprises a metered entity data class and a threshold class, the metered entity data class defining:
   at least one metered entity data object containing metering data corresponding to at least one metered entity;
the threshold class defining:
   at least one threshold object containing threshold data for the at least one metered entity; and
   a sixth set of object methods to determine the threshold data for the at least one metered entity.

15. The computer system of claim 14 wherein the metered entity data class and the threshold class are extensible classes of the framework mechanism.

16. The computer system of claim 14 wherein a metered usage data class, a metered concurrent usage data class, a metered user data class, a metered location data class, and a metered timing data class are all subclasses of the metered entity data class.

17. The computer system of claim 14 wherein a cumulative access threshold class and a concurrent access threshold class are subclasses of the threshold class.

18. The computer system of claim 1 wherein the framework mechanism comprises a principal class, the principal class defining:
   at least one principal object corresponding to a type of item to be metered; and
   a seventh set of object methods for determining the names of the principal objects.

19. The computer system of claim 18 wherein a program class, a location class, a user class, and a VIP user class are all subclasses of the principal class.

20. The computer system of claim 18 wherein the principal class is an extensible class of the framework mechanism.

21. The computer system of claim 4 wherein the first set of object methods includes at least one after object method that is executed after the execution of the metered client method is commenced.

22. The computer system of claim 21 wherein the framework mechanism further comprises a metered entity class and a metered suite class, the metered entity class defining:
   at least one metered entity object corresponding to a parameter to be metered;
the metered suite class defining:
   at least one metered suite object containing at least one metered entity object; and
   a third set of object methods to determine which of the metered entity objects are contained in the metered suite object.

23. The computer system of claim 22 wherein the framework mechanism further comprises a metered entity configuration class, a configuration data class, and a metered data class, the metered entity configuration class defining:
   at least one metered entity configuration object containing configuration data for at least one metered entity; and a second set of object methods to determine the configuration data for the at least one metered entity;

the configuration data class defining:

at least one configuration data object identifying the plurality of metered entity configuration objects; and a fourth set of object methods to determine the configuration for the at least one metered entity;

the metered data class defining:

at least one metered data object containing a plurality of metered entity data objects;

a fifth set of object methods to determine the metered data for the plurality of metered entity data objects.

24. The computer system of claim 23 wherein the framework mechanism further comprises a metered entity data class and a threshold class, the metered entity data class defining:

at least one metered entity data object containing metering data corresponding to the at least one metered entity object;

the threshold class defining:

at least one threshold object containing threshold data for at least one metered entity object; and a sixth set of object methods to determine the threshold data for the at least one metered entity object.

25. The computer system of claim 24 wherein the framework mechanism further comprises a principal class, the principal class defining:

at least one principal object corresponding to a type of item to be metered; and a seventh set of object methods for determining the names of the principal objects.

26. The computer system of claim 25 wherein the metered data class has a "has by reference" relationship with the metered entity data class.

27. The computer system of claim 25 wherein the configuration data class has a "has by reference" relationship with the metered entity configuration class.

28. The computer system of claim 25 wherein the metered entity configuration class has a "using" relationship with the metered entity class, the metered suite class, and the threshold class.

29. The computer system of claim 1 wherein the main memory contains an application program that supports an object oriented programming environment containing the framework mechanism, and wherein the framework mechanism is extended by providing information that implements the at least one object metering environment.

30. The computer system of claim 1 wherein the framework mechanism comprises:

at least one core function defined by at least one core class and by the relationships between a plurality of classes within the framework mechanism, wherein the implementation of the at least one core function is defined by the framework mechanism and cannot be modified by a user of the framework mechanism; and at least one extensible function defined by at least one extensible class, wherein the implementation of the at least one extensible function is defined by the user of the framework mechanism by extending the at least one extensible class.

31. A computer-implemented method for metering at least one metered object in a computer program, the method comprising the steps of:

providing an extensible object oriented framework mechanism that meters the objects according to extended portions of the framework mechanism that are customized to provide a desired object metering environment for metering the number of times the at least one metered object is accessed; and executing the object oriented framework mechanism on a computer system.

32. The method of claim 31 further including the step of:

extending the framework mechanism to define the desired object metering environment.

33. The method of claim 31 further including the steps of:

(a) invoking a client object method on a selected metered object;

(b) executing the client object method;

(c) retrieving metered data for the selected metered object;

(d) determining the configuration of the selected metered object; and (e) updating the metered data for the selected metered object.

34. The method of claim 33 wherein step (b) is performed by one thread of control and steps (c)–(e) are performed by another thread of control in a multi-threaded system.

35. The method of claim 34 wherein the step of determining the configuration of the selected metered object includes the steps of:

determining whether the selected metered object belongs to a suite;

determining applicable thresholds for the selected metered object;

determining which methods of the selected metered object to meter; and determining whether the selected metered object is in a synchronous mode.

36. A program product comprising:

an object-oriented framework mechanism for metering at least one metered object in a computer program, the framework mechanism including an extensible object metering mechanism that meters the number of times the at least one metered object is accessed according to extended portions of the framework mechanism; and computer-readable signal bearing media bearing the framework mechanism.

37. The program product of claim 36 wherein the computer-readable signal bearing media comprises recordable media.

38. The program product of claim 36 wherein the computer-readable signal bearing media comprises transmission media.

39. The program product of claim 36 wherein the framework mechanism comprises a first set of object methods to perform a plurality of predetermined functions to implement the object metering environment.

40. The program product of claim 36 wherein the first set of object methods includes at least one before object method that is executed before the execution of a metered client method.

41. The program product of claim 36 wherein the first set of object methods includes at least one after object method that is executed after the execution of the metered client method is commenced.

42. The program product of claim 36 wherein the framework mechanism comprises:

at least one metered entity configuration object containing configuration data for at least one metered entity; and a second set of object methods to determine the configuration data for the at least one metered entity.

43. The program product of claim 36 wherein the framework mechanism comprises:
at least one metered entity object corresponding to a parameter to be metered;
the metered suite class defining:
at least one metered suite object containing at least one metered entity object; and
a third set of object methods to determine which of the metered entity objects are contained in the metered suite object.

44. The program product of claim 36 wherein the framework mechanism comprises:
at least one metered entity configuration object containing configuration data for at least one metered entity; and
a second set of object methods to determine the configuration data for the at least one metered entity;
at least one configuration data object identifying the plurality of metered entity configuration objects; and
a fourth set of object methods to determine the configuration for the at least one metered entity;
at least one metered data object containing a plurality of metered entity data objects;
a fifth set of object methods to determine the metered data for the plurality of metered entity data objects.

45. The program product of claim 36 wherein the framework mechanism further comprises:
at least one metered entity data object containing metering data corresponding to at least one metered entity;
at least one threshold object containing threshold data for the at least one metered entity; and
a sixth set of object methods to determine the threshold data for the at least one metered entity.

46. The program product of claim 36 wherein the framework mechanism further comprises:
at least one principal object corresponding to a type of item to be metered; and
a seventh set of object methods for determining the names of the principal objects.

47. The program product of claim 36 wherein the framework mechanism further comprises:
at least one metered entity object corresponding to a parameter to be metered;
at least one metered suite object containing at least one metered entity object; and
a third set of object methods to determine which of the metered entity objects are contained in the metered suite object.

48. The program product of claim 47 wherein the framework mechanism further comprises:
at least one metered entity configuration object containing configuration data for at least one metered entity; and
a second set of object methods to determine the configuration data for the at least one metered entity;
at least one configuration data object identifying the plurality of metered entity configuration objects; and
a fourth set of object methods to determine the configuration for the at least one metered entity;
at least one metered data object containing a plurality of metered entity data objects;
a fifth set of object methods to determine the metered data for the plurality of metered entity data objects.

49. The program product of claim 48 wherein the framework mechanism further comprises:
at least one metered entity data object containing metering data corresponding to the at least one metered entity object;
at least one threshold object containing threshold data for at least one metered entity object; and
a sixth set of object methods to determine the threshold data for the at least one metered entity object.

50. The program product of claim 49 wherein the framework mechanism further comprises:
at least one principal object corresponding to a type of item to be metered; and
a seventh set of object methods for determining the names of the principal objects.

51. An object oriented framework mechanism for use in a computer system that supports an object oriented programming environment, the framework mechanism comprising:
at least one metered entity object corresponding to a parameter to be metered;
at least one metered entity configuration object containing configuration data for at least one metered entity;
a second set of object methods to determine the configuration data for the at least one metered entity;
at least one metered suite object containing at least one metered entity object;
a third set of object methods to determine which of the metered entity objects are contained in the metered suite object;
at least one configuration data object identifying the plurality of metered entity configuration objects;
a fourth set of object methods to determine the configuration for the at least one metered entity;
at least one metered data object containing a plurality of metered entity data objects;
a fifth set of object methods to determine the metered data for the plurality of metered entity data objects;
at least one metered entity data object containing metering data corresponding to at least one metered entity;
at least one threshold object containing threshold data for the at least one metered entity;
a sixth set of object methods to determine the threshold data for the at least one metered entity;
at least one principal object corresponding to a type of item to be metered; and
a seventh set of object methods for determining the names of the principal objects.

52. The object oriented framework mechanism of claim 51 wherein the framework mechanism comprises:
at least one core function defined by at least one core class and by the relationships between a plurality of classes within the framework mechanism, wherein the implementation of the at least one core function is defined by the framework mechanism and cannot be modified by a user of the framework mechanism; and
at least one extensible function defined by at least one extensible class, wherein the implementation of the at least one extensible function is defined by the user of the framework mechanism by extending the at least one extensible class.

53. A computer-implemented method for metering at least one metered object in a computer program, the method comprising the steps of:
(a) invoking a client object method on a selected metered object;

(b) determining whether any operations are required before executing the client object method;

(c) performing any required operations before executing the client object method;

(d) executing the client object method;

(e) retrieving metered data for the selected metered object;

(f) determining the configuration of the selected metered object;

(g) updating the metered data for the selected metered object;

(h) determining whether any operations are required after executing the client object method; and (i) performing any required operations after executing the client object method.

54. The method of claim 53 wherein step (d) is performed by one thread of control and steps (e)–(g) are performed by another thread of control in a multi-threaded system.

55. The method of claim 53 wherein the step of determining the configuration of the selected metered object includes the steps of:

determining whether the selected metered object belongs to a suite;

determining applicable thresholds for the selected metered object;

determining which methods of the selected metered object to meter; and determining whether the selected metered object is in a synchronous mode.

56. A program product comprising:

(A) an object oriented framework mechanism for metering at least one metered object in a computer program, the framework mechanism including at least one metered entity object corresponding to a parameter to be metered, at least one metered entity configuration object containing configuration data for at least one metered entity, a second set of object methods to determine the configuration data for the at least one metered entity, at least one metered suite object containing at least one metered entity object, a third set of object methods to determine which of the metered entity objects are contained in the metered suite object, at least one configuration data object identifying the plurality of metered entity configuration objects, a fourth set of object methods to determine the configuration for the at least one metered entity, at least one metered data object containing a plurality of metered entity data objects, a fifth set of object methods to determine the metered data for the plurality of metered entity data objects, at least one metered entity data object containing metering data corresponding to at least one metered entity, at least one threshold object containing threshold data for the at least one metered entity, a sixth set of object methods to determine the threshold data for the at least one metered entity, at least one principal object corresponding to a type of item to be metered, and a seventh set of object methods for determining the names of the principal objects; and (B) computer-readable signal bearing media bearing the object oriented framework mechanism.

57. A program product comprising:

an object oriented framework mechanism for metering at least one metered object in a computer program, the framework mechanism including at least one core function defined by at least one core class and by relationships between a plurality of classes within the framework mechanism, wherein the implementation of the at least one core function is defined by the framework mechanism and cannot be modified by a user of the framework mechanism, the framework mechanism further including at least one extensible function defined by at least one extensible class, wherein the implementation of the at least one extensible class is defined by the user of the framework mechanism by extending the at least one extensible class, thereby defining an object metering environment for metering the number of times the at least one metered object is accessed; and computer-readable signal bearing media bearing the object oriented framework mechanism.

58. The program product of claim 56 wherein the computer-readable signal bearing media comprises recordable media.

59. The program product of claim 56 wherein the computer-readable signal bearing media comprises transmission media.

60. The program product of claim 56 wherein the metered data object, the configuration data object, and the metered entity configuration object with their associated methods comprise a core function of the framework mechanism.

61. The program product of claim 60 wherein the principal object, the metered entity data object, the metered suite object, the metered entity object, and the threshold object with their associated methods comprise an extensible function of the framework mechanism, the implementation of which by a user defines at least one object metering environment for metering the number of times the at least one metered object is accessed.

62. The program product of claim 61 wherein the extensible function further includes a program object, a location object, and a user object.

63. The program product of claim 61 wherein the extensible function further includes a metered usage data object, a metered user data object, a metered location data object, and a metered timing data object.

64. The program product of claim 61 wherein the extensible function further includes a cumulative access threshold object, and a concurrent access threshold object.

65. The program product of claim 57 wherein the computer-readable signal bearing media comprises transmission media.

66. The program product of claim 57 wherein the framework mechanism comprises:

at least one metered entity object corresponding to a parameter to be metered;

at least one metered entity configuration object containing configuration data for at least one metered entity;

a second set of object methods to determine the configuration data for the at least one metered entity;

at least one metered suite object containing at least one metered entity object;

a third set of object methods to determine which of the metered entity objects are contained in the metered suite object;

at least one configuration data object identifying the plurality of metered entity configuration objects;

a fourth set of object methods to determine the configuration for the at least one metered entity;

at least one metered data object containing a plurality of metered entity data objects;

a fifth set of object methods to determine the metered data for the plurality of metered entity data objects;

at least one metered entity data object containing metering data corresponding to at least one metered entity;

at least one threshold object containing threshold data for the at least one metered entity;

a sixth set of object methods to determine the threshold data for the at least one metered entity;

at least one principal object corresponding to a type of item to be metered; and a seventh set of object methods for determining the names of the principal objects;

wherein the object oriented framework mechanism meters the at least one object according to extended portions of the framework mechanism that are customized to provide the desired object metering environment.

67. A method for metering at least one object in a computer program using a computer system having a central processing unit and a main memory, the main memory having an application program that provides an object oriented programming environment, the method comprising the steps of:

(A) providing in the program an object oriented framework mechanism that meters the at least one object according to extended portions of the framework mechanism that are customized to provide a desired object metering environment, the framework mechanism including:

a set of core functions wherein the implementation of the core functions is defined by the framework mechanism and cannot be modified by a user of the framework mechanism; and a set of extensible functions wherein the implementation of the extensible functions is defined by the user of the framework mechanism;

(B) extending the extensible functions in the framework mechanism to define particular classes having predetermined protocols and defining particular object methods that meter the plurality of objects, the extensible functions defining the desired object metering environment;

(C) generating an executable object metering system by integrating together the extensible functions and the core functions; and (D) executing the executable object metering system on the computer system to meter the plurality of objects.

68. The method of claim 67 further including the steps of:

(E) invoking a client object method on a selected metered object;

(F) executing the client object method;

(G) retrieving metered data for the selected metered object;

(H) determining the configuration of the selected metered object; and (I) updating the metered data for the selected metered object.

69. The method of claim 68 wherein step (F) is performed by one thread of control and steps (G)–(I) are performed by another thread of control in a multi-threaded system.

70. The method of claim 68 wherein the step of determining the configuration of the selected metered object includes the steps of:

determining whether the selected metered object belongs to a suite;

determining applicable thresholds for the selected metered object;

determining which methods of the selected metered object to meter; and determining whether the selected metered object is in a synchronous mode.

71. The program product of claim 57 wherein the computer-readable signal bearing media comprises recordable media.

* * * * *